US012639399B1

(12) United States Patent
Jeong

(10) Patent No.: US 12,639,399 B1
(45) Date of Patent: May 26, 2026

(54) NEURAL PROCESSING UNIT WITH DEDICATED CIRCUITRY FOR APPLYING ACTIVATION FUNCTION

(71) Applicant: DEEPX CO., LTD., Seongnam-si (KR)

(72) Inventor: Jin Ung Jeong, Seoul (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 19/303,999

(22) Filed: Aug. 19, 2025

(30) Foreign Application Priority Data

Jul. 1, 2025 (KR) ......................... 10-2025-0088185

(51) Int. Cl.
*G06F 17/17* (2006.01)
*G06N 3/048* (2023.01)

(52) U.S. Cl.
CPC ............. *G06F 17/17* (2013.01); *G06N 3/048* (2023.01)

(58) Field of Classification Search
CPC ... G06N 3/048; G06F 1/02; G06F 1/03–0307; G06F 1/035; G06F 7/552–556; G06F 2101/02–04; G06F 2101/08–12; G06F 2207/5521–5523; G06F 2207/5526; G06F 17/17
See application file for complete search history.

(56) References Cited

U.S. PATENT DOCUMENTS 12,412,078 B1 * 9/2025 Jeong ...................... G06N 3/048
2017/0004111 A1 * 1/2017 Ng ........................... G06F 7/544

2024/0005138 A1 * 1/2024 Boonstra ................ G06N 3/063
2024/0403616 A1 * 12/2024 Cheema ................. G06N 3/048
2026/0030492 A1 * 1/2026 Kim ........................ G06N 3/063

FOREIGN PATENT DOCUMENTS

| | | | | |
|---|---|---|---|---|
| CN | 117391164 A | * | 1/2024 | ............. G06N 3/063 |
| KR | 10-1999-0072273 A | | 9/1999 | |
| KR | 10-0948559 B1 | | 3/2010 | |
| KR | 10-2016-0120249 A | | 10/2016 | |
| KR | 10-2020-0002607 A | | 1/2020 | |
| KR | 10-2023-0100755 A | | 7/2023 | |
| KR | 10-2670314 B1 | | 5/2024 | |
| KR | 10-2025-0067393 A | | 5/2025 | |

OTHER PUBLICATIONS

Office Action of the corresponding KR Application No. 10-2025-0088185 mailed on Nov. 3, 2025.

* cited by examiner

*Primary Examiner* — Matthew D Sandifer

(57) ABSTRACT

A function approximation unit includes a programmable function approximation circuit configured to directly compute a piecewise function according to a pre-stored coefficient; one or more dedicated function circuits configured to process at least one specific function among a reciprocal, a reciprocal square root, and a negative exponential function through a fixed hard-wired operation pipeline; and control logic configured to selectively activate either the programmable function approximation circuit or the dedicated function circuit according to the type of the nonlinear function to be processed.

20 Claims, 33 Drawing Sheets

FuncApx

1 npu is an AI accelerator ⟶ NPU (100) ⟶ yes, I am the AI accelerator

| Operation | Energy(pj) |
|---|---|
| 8b Add | 0.03 |
| 16b Add | 0.05 |
| 32b Add | 0.1 |
| 16b FP Add | 0.4 |
| 32b FP Add | 0.9 |
| 8b Mult | 0.2 |
| 32b Mult | 3.1 |
| 16b FP Mult | 1.1 |
| 32b FP Mult | 3.7 |
| 32b SRAM Read | 5 |
| 32b DRAM Read | 640 |

S110 — Perform integer operation

S120 — Perform floating-point based special operation

S130 — Control processing core or special function unit according to operation state FuncApx

NEURAL PROCESSING UNIT WITH DEDICATED CIRCUITRY FOR APPLYING ACTIVATION FUNCTION

CROSS-REFERENCE TO RELATED APPLICATIONS

This application claims priority to Korean Patent Application No. 10-2025-0088185 filed on Jul. 1, 2025, in the Korean Intellectual Property Office, the disclosure of which is incorporated herein by reference.

BACKGROUND OF THE DISCLOSURE

Technical Field

The present disclosure relates to a neural processing unit including dedicated circuitry for activation function computation.

Background Art

Humans possess intelligence that allows for functions such as recognition, generation, classification, inference, prediction, and control/decision making. Artificial intelligence (AI) refers to the artificial imitation of human intelligence.

The human brain is composed of numerous nerve cells called neurons, and each neuron is connected to hundreds or thousands of other neurons through connections called synapses. A model that simulates the operating principles of biological neurons and the connections between them to imitate human intelligence is called a neural network (ANN) model. That is, a neural network is a system in which nodes imitating neurons are connected in a layer structure.

As neural network technology has advanced, the application of neural network inference services utilizing big data-based training has become increasingly diverse. These inference services can infer various and complex data through a model learned by training a neural network on a vast dataset. However, as the functionality and accuracy for neural network inference services continue to increase, the parameter size, computational complexity, and memory bandwidth demands of neural network models are growing exponentially. Consequently, the performance requirements for processors and memory capable of supporting these inference tasks are also increasing. To address these demands, neural network inference services are increasingly being deployed on cloud computing-based servers that provide efficient processing capabilities for large-scale data operations.

Generative artificial intelligence models are increasingly being developed to operate in various environments. These models include various neural network models, including language models for conversational systems, stable diffusion models that generate images from text input, and transformer models that predict and determine future actions based on a series of events in a specific situation. The computational cost of generating a response to an input query based on these generative artificial intelligence models is very high. As one example, the commercialization of large language models (LLMs) among generative artificial intelligence models has become widespread.

Generative artificial intelligence models are very diverse, and new models are continuously being introduced to the market. Representative generative artificial intelligence models include, for example, GPT, LLaMA, DeepSeek, Mistral, DBRX, Qwen, Nova, Jamba, PaLM, PanGu, OPT, Gemini, Falcon, BLOOM, CLIP, RoBERTa, ALBERT, ELECTRA, LXNet, BERT, BART, CTRL, DALL-E, Stable Diffusion, Midjourney, Imagen, DeepFloyd, Runway Gen, DreamBooth, StyleGAN, BigGAN, Sora, Pika Labs, Stable Video Diffusion, Imagen Video, Make-A-Video, Phenaki, Dreamix, VideoPoet, Text2Video-Zero, and CogVideo.

However, providing generative artificial intelligence services requires a high-performance general-purpose graphics processing unit (GPGPU). The total power consumption of GPGPUs operated worldwide to process these LLMs has reached a level comparable to the power consumption of an entire country, and this excessive energy demand poses a serious problem for the commercialization of LLMs. Building a GPGPU-based data center to provide LLM services requires careful assessment of power plant capacity to determine whether the necessary energy can be supplied, and the difficulty of meeting the energy demands of these data centers in many urban areas can be a major barrier to the widespread deployment of large-scale AI models.

SUMMARY OF THE DISCLOSURE

Embodiments relate to an approximation circuit for approximating a nonlinear function in a neural processing unit. The approximation circuit includes a first circuit, one or more second circuits, and a control logic circuit. The first circuit applies a piecewise function of a segmented approximation of the nonlinear function according to one or more pre-stored coefficients. The one or more second circuits include a plurality of hardware stages pipelined to process at least one a reciprocal, a reciprocal square root, or a negative exponential function. The control logic circuit is coupled to the first circuit and the one or more second circuits. the control logic circuit selectively activates the first circuit or the one or more second circuits according to the type of the nonlinear function to be processed.

In one or more embodiments, the first circuit performs a piecewise linear function or a piecewise polynomial function having a degree higher than the piecewise linear function.

In one or more embodiments, the one or more second circuits process a floating-point representation of an input value by decomposing the input value into an exponent part and a mantissa part. The first circuit approximates the decomposed mantissa part for a specific normalized range in a share manner.

In one or more embodiments, the one or more coefficients of the first circuit are constant values pre-optimized through artificial neural network training to approximate a specific function within the specific normalized range.

In one or more embodiments, the control logic circuit performs power gating or clock gating to cut off power consumption of the unselected one of the first circuit or the one or more second circuits.

In one or more embodiments, the one or more coefficients are loaded from an on-chip shared memory of the neural processing unit.

In one or more embodiments, the approximation circuit is part of a special function unit in the neural processing unit, the special function unit configured to perform nonlinear and number-conversion operations.

Embodiments also relate to a circuit for approximating a programmable function. The circuit includes a plurality of comparators, a selector and an arithmetic circuit. The comparators receive an input value in a floating-point format comprising a sign bit, an exponent, and a mantissa, and

US 12,639,399 B1

3 compare the received input value with a plurality of segment boundary values to determine a segment corresponding to the received input value. The selector selects a set of programmable operation coefficients corresponding to the determined segment from a plurality sets of programmable operation coefficients. The arithmetic circuit performs a predefined arithmetic operation on the received input value using the selected set of operation coefficients.

In one or more embodiments, the arithmetic circuit includes a multiplier and an adder. The arithmetic operation is a piecewise linear function or a piecewise polynomial function of a degree higher than the piecewise linear function.

In one or more embodiments, the approximation circuit dynamically changes the degree of the polynomial function by deactivating a part of the approximation circuit through an enable signal.

In one or more embodiments, the floating-point format is one of Brain Floating-Point 16 (BF16), TensorFloat-32 (TF32), 8-bit floating point (FP8), or Block floating point (BFP).

In one or more embodiments, the plurality sets of programmable operation coefficients are pre-optimized through an artificial neural network training to approximate a specific section of a target function, and remains unchanged during runtime.

In one or more embodiments, the artificial neural network training performs hardware-software co-optimization considering the number of comparators included in the circuit.

Embodiments also relate to a neural processing unit (NPU) that approximates a nonlinear function. The NPU includes a control circuit, and a function approximation circuit. The control circuit controls the operation of the NPU. The function approximation circuit is coupled to the control circuit and is configured to operate in response to receiving a single instruction from the control unit. the function approximation circuit is pipelined with a plurality of hardware stages including a preprocessing circuit, an approximation operation circuit and a post-processing circuit. The preprocessing circuit preprocesses an input value. The approximation operation circuit performs an approximation operation on the preprocessed input value to generate an intermediate approximation value. The post-processing circuit performs post-processing on the intermediate approximation value to generate a final approximation value. The function approximation circuit autonomously operates the plurality of hardware stages in response to receiving the single instruction.

In one or more embodiments, the function approximation circuit is configured to autonomously operate the plurality of hardware stages to generate the final approximation value without receiving one or more additional instructions from the control unit.

In one or more embodiments, the approximation operation circuit is programmable. The function approximation circuit includes comparators, a selector and an arithmetic circuit. The comparators receive an input value in a floating-point format comprising a sign bit, an exponent, and a mantissa. The comparators further compares the received input value with a plurality of segment boundary values to determine a segment corresponding to the received input value. The selector selects a set of programmable operation coefficients corresponding to the determined segment from a plurality sets of coefficients. The arithmetic circuit performs a predefined arithmetic operation on the received input value using the selected set of operation coefficients.

In one or more embodiments, the function approximation circuit selectively activates one of the function approximation circuit or a dedicated function circuit according to a target function specified by the single instruction, and the dedicated function circuit processes at least one of a reciprocal, a reciprocal square root, and a negative exponential function.

In one or more embodiments, the preprocessing circuit decomposes a floating-point representation of an input value into an exponent part and a mantissa part, and combines the intermediate approximation from the approximation operation circuit with the exponent part.

In one or more embodiments, the function approximation circuit is included in a vector core and the single instruction is configured to simultaneously trigger an autonomous pipeline operation for each element of vector data, or the function approximation unit is included in a scalar core and the single instruction is configured to trigger an autonomous pipeline operation for scalar data.

In one or more embodiments, the NPU further includes a memory circuit that store operation coefficients generated by offline training for executing the single instruction.

DETAILED DESCRIPTION OF THE INVENTION

Figure 1:
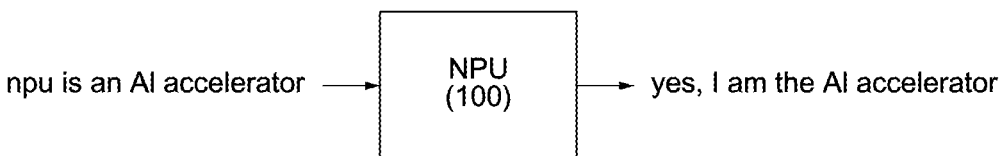
FIG. 1 is a block diagram illustrating a computing system for processing a language model, according to one embodiment.

Specific structural or functional descriptions for the examples according to the concepts of the present disclosure disclosed herein are merely illustrated for the purpose of explaining the examples according to the concepts of the present disclosure.

Embodiments according to the concepts of the present disclosure may be implemented in various forms. The present disclosure should not be construed as being limited to the embodiments described herein.

Embodiments according to the concepts of the present disclosure may be subject to various modifications. The present disclosure may have various forms. Therefore, specific examples are illustrated in the drawings and will be described in detail in the present disclosure. However, this is not intended to limit the examples according to the concepts of the present disclosure to specific disclosed forms. Therefore, it should be understood that all changes, equivalents, or substitutes included in the spirit and technical scope of the present disclosure are included in the present disclosure.

Terms such as first and/or second may be used to describe various components. However, the present disclosure should not be limited by these terms.

These terms are only used for the purpose of distinguishing one component from another. For example, without departing from the scope of the rights according to the concepts of the present disclosure, a first component may be named a second component, and similarly, a second component may also be named a first component.

When a component is referred to as being "connected" or "coupled" to another component, it should be understood that it may be directly connected or coupled to the other component, but an intervening component may also be present. On the other hand, when a component is referred to as being "directly connected" or "directly coupled" to another component, it should be understood that no intervening component is present.

Other expressions describing relationships between components, such as "between" and "immediately between" or "adjacent to" and "directly adjacent to," should be interpreted in the same way.

In this document, expressions such as "A or B," "at least one of A or/and B," or "one or more of A or/and B" may include all possible combinations of the items listed together. For example, "A or B," "at least one of A and B," or "at least one of A or B" may refer to all cases including (1) at least one A, (2) at least one B, or (3) both at least one A and at least one B.

Expressions such as "first," "second," "primary," or "secondary" used in the present disclosure may modify various components, regardless of order and/or importance. These expressions are used only to distinguish one component from another and do not limit the corresponding components. For example, a first user device and a second user device may represent different user devices, regardless of order or importance. For example, without departing from the scope of the rights described in this document, a first component may be named a second component, and similarly, a second component may also be renamed a first component.

The terminology used in the present disclosure is for the purpose of describing particular embodiments only and is not intended to be limiting the scope of other examples.

A singular expression may include a plural expression unless the context clearly indicates otherwise. The terms used herein, including technical or scientific terms, may have the same meaning as commonly understood by one of ordinary skill in the art to which this document pertains.

Terms defined in general dictionaries among the terms used in the present disclosure may be interpreted as having the same or similar meaning as in the context of the relevant art. The terms used in the present disclosure are not interpreted in an idealistic or excessively formal sense unless explicitly defined in this document. In some cases, even terms defined in this document cannot be interpreted to exclude the embodiments of this document.

The terminology used herein is for the purpose of describing particular embodiments only and is not intended to be limiting of the present disclosure.

A singular expression includes a plural expression unless the context clearly indicates otherwise. In the present disclosure, terms such as "comprise" or "have" are intended to specify the presence of described features, numbers, steps, operations, components, parts, or combinations thereof. Therefore, it should be understood that they do not preclude the presence or addition of one or more other features, numbers, steps, operations, components, parts, or combinations thereof.

Unless otherwise defined, all terms used herein, including technical or scientific terms, have the same meaning as commonly understood by one of ordinary skill in the art to which the present disclosure belongs. Terms such as those defined in commonly used dictionaries should be interpreted as having a meaning consistent with their meaning in the context of the relevant art. Unless explicitly defined in the present disclosure, they should not be interpreted in an idealistic or excessively formal sense.

The respective features of the various examples of the present disclosure may be partially or wholly combined or coupled with each other. The various examples of the present disclosure can be technically interlocked and driven in various ways, as can be fully understood by those skilled in the art. Each example of the present disclosure may be implemented independently of each other or may be implemented together in an associated relationship.

In describing each example, descriptions of technical content that are well known in the technical field to which the present disclosure belongs and are not directly related to the present disclosure are omitted. This is to more clearly convey the gist of the present disclosure by omitting unnecessary explanations.

In the present disclosure, a 'unit' may refer to a hardware module or a hardware circuit. For example, a 'unit' may be a hardware circuit for performing a specific function. However, a 'unit' does not necessarily mean a dedicated circuit physically separated from other circuits to perform only that function. A 'unit' may be configured based on a plurality of circuits, and these circuits may exist in different locations and perform a specific function by interlocking under a control signal. For example, 'unit A' and 'unit B' may include at least some common electronic circuits.

Neural networks are classified into single-layer neural networks and multi-layer neural networks according to the number of layers. A general multi-layer neural network comprises an input layer, a hidden layer, and an output layer. The input layer is the layer that accepts input values. The number of input layers is the same as the number of input variables. The hidden layer is located between the input layer and the output layer and is a layer that receives signals from the input layer, extracts features, and transmits them to the output layer. The output layer is a layer that receives signals from the hidden layer and outputs them to the outside.

To implement higher artificial intelligence, a deep neural network (DNN), which increases the number of hidden layers, has been disclosed. Among DNNs, a transformer artificial neural network is a DNN based on attention technology. The transformer utilizes numerous matrix multiplication operations. The transformer may obtain an operation value, the attention score (Q, K, V), using input values and parameters such as query Q, key K, and value V. The transformer may process various inference operations based on the operation value (e.g., the attention score (Q, K, V)).

The transformer shows excellent performance in the field of generative artificial intelligence. The transformer is utilized in various large language models. For example, a language model receives a query in text form and generates a response. The response generated by the language model may be generated by re-entering tokens generated as part of the response from the language model back into the language model. The cost of generating such a language model response is proportional to the number of parameters in the language model. Therefore, using a language model with a large number of parameters results in a high computational cost to generate a response. Conversely, reducing the number of parameters can lower the computational cost and improve response speed, but it may cause a problem of degrading the quality of the generated response.

Furthermore, the inference accuracy of a neural network model may vary depending on the characteristics of the activation function implemented in a neural processing unit. That is, the performance and efficiency of a neural network model are determined by the hardware implementation characteristics of the processing circuit for the activation function of the neural processing unit. Moreover, a neural network model that processes an activation function with a complex formula can be processed by a hardware accelerator. When implementing a dedicated processor for a neural network model with hardware, the dedicated processor may use a significant chip area (i.e., a large number of logic gates). Also, such a chip may consume considerable power.

Most of the complex functions that neural network models aim to solve have nonlinearity. To solve these problems, most activation functions are nonlinear functions. The performance and efficiency of a neural network model processed in hardware may vary depending on the nonlinear characteristics of the activation function applied to at least one neural network model processed by the neural processing unit.

Activation functions used in neural network models, especially nonlinear functions including log or exponential operations, have the problem of significantly increasing the complexity of digital logic design when implemented in hardware. This is a direct cause of complicating the structure of the hardware operator, thereby increasing the chip's power consumption, and reducing the operation processing speed. To solve this problem, there is an approach of implementing a specific activation function with a hard-wired dedicated circuit, but this faces the following fundamental limitations.

First, the absence of flexibility. The hard-wired method can only process a predefined, fixed function, so independent processing of newly emerging or modified activation functions according to the advancement of AI technology is impossible without hardware changes. Ultimately, these functions are replaced by inefficient software processing or act as a serious constraint that makes the application of new AI models themselves difficult.

Second, the inefficiency of resources. Depending on the operational complexity of the activation function to be processed, the number of gates in the dedicated circuit increases exponentially, which has the disadvantage of increasing the chip area and manufacturing cost.

A neural processing structure may increase the efficiency of hardware resources and reduce power consumption by hard-wiring the functionality to selectively perform integer-based operations for certain sections and floating-point-based vector operations for other sections, according to the characteristics of the neural network operation. The new neural processing unit structure may overcome the limitations of existing ASICs and dramatically improve the power, performance, and area (PPA) ratio. However, neural processing units to which conventional activation function approximation techniques, including the above approach, are applied still faced the following clear technical limitations.

First is the problem of inference accuracy degradation and hardware resource inefficiency. Conventional polynomial approximation or lookup table (LUT) methods use an excessive amount of calculation or vast hardware resources to secure inference accuracy. In particular, in cases like transformer-based models where the data range of nonlinear operations is wide and dynamically changing, a huge number of LUT entries were needed to handle this with an LUT method. This caused serious area overhead in hardware implementation, becoming a direct cause of increased chip manufacturing costs and degraded power efficiency.

Second is the structural bottleneck phenomenon that degrades operation speed. Conventional transcendental function approximation operations relied on complex pre- and post-processing that mixed floating point (FP) and integer (INT) representations. It is evident that this a series of sequential commands method based on software instructions inevitably increases the operation cycles, which is a fundamental bottleneck point that reduces the function throughput per unit of time and thus degrades the overall operational efficiency of the neural network.

Third is the problem of a lack of flexibility and scalability that prevents adaptation to new models. As mentioned earlier, existing hard-wired processors may only process predefined, fixed activation functions, having a clear limitation of not being able to keep up with the advancement of new AI technology.

In particular, despite attempts to reduce the size of the LUT by decomposing the input data range into a scaling part and an invariant part normalized to a specific range, and approximating only the invariant part with a lookup table (LUT) (e.g., Range-Invariant LUT), such attempts continue to follow the same clear limitations. Such technology still relies on the LUT look-up method, so while it can partially improve memory efficiency by reducing the number of LUT entries, it involves a multi-stage sequential process of input decomposition, LUT look-up, and scaling, which is a fundamental cause of latency. That is, this is merely an incremental improvement on the existing LUT method and is far from achieving high-speed processing in a single pipeline without complex instruction control. To overcome such complex limitations, the following solutions may be provided.

First, to solve the problem of a lack of flexibility, a programmable methodology capable of approximating any form of activation function and an optimized hardware design to drive it may be used.

Furthermore, to achieve both accuracy and efficiency simultaneously, an efficient approach to reduce the overall approximation error while lowering hardware complexity is to divide the function into several regions based on the morphological characteristics of the activation function to be approximated, and to individually program approximation parameters optimized for the characteristics of each region (e.g., linear section, nonlinear section).

To better solve the problem of operation speed degradation, instead of relying on software instructions, a neural processing unit equipped with a function approximation unit may be used. The neural processing unit may process functions at high speed without complex instruction control, by implementing each stage of function approximation (e.g., input value preprocessing, approximation operation, result post-processing) as independent dedicated circuits and connecting them in a pipeline structure.

In the present disclosure, an artificial intelligence model may include not only a generative AI model but also a traditional AI model that performs judgment, classification, prediction, etc. An artificial intelligence model may include a language model, a model that reads images or videos, etc., and any model that generates output data from input data using an artificial neural network may correspond to an artificial intelligence model. For example, an artificial intelligence model may generate output text from input text. An artificial intelligence model may classify input data or generate prediction data from input data. An artificial intelligence model may search for or track an object of interest from an image or video. An artificial intelligence model may perform situation judgment by analyzing an image or video. An artificial intelligence model may generate an image/video corresponding to input text based on the input text. An artificial intelligence model may generate output text describing an input image/video from the input image/video. The input data and output data may each be text, a voice signal, an image, a video, etc., and are not limited in kind.

An artificial intelligence model may be implemented as an artificial neural network. Therefore, as a representative embodiment, processing, or operation for an 'artificial intelligence model' means the processing or operation of an artificial neural network, and the parameters of the artificial intelligence model may include the weights of the artificial neural network, but are not limited thereto. For example, it should be understood that the processing or operation of an artificial intelligence model may include mathematical operations not included in the neural network structure, such as softmax.

A transformer is an artificial intelligence model implemented based on an attention mechanism, and may be used in a large language model (LLM) and a small LLM. Language models include Bidirectional Encoder Representations from Transformers (BERT), Generative Pre-trained Transformer (GPT), Robustly Optimized BERT Pretraining Approach (RoBERTa), A Lite BERT (ALBERT), Efficiently Learning an Encoder that Classifies Token Replacements Accurately (ELECTRA), Transformer with Extra Long Context (Transformer-XL), a model combining the advantages of GPT and BERT (XLNet), Bidirectional and Auto-Regressive Transformers (BART). Conditional Transformer Language (CTRL), Text-to-Text Transfer Transformer (T5), Language Model for Dialogue Applications (LaMDA), DeepMind's LLM (Gopher), a fine-tuned model based on GPT-3 (InstructGPT), Huawei's Chinese model (PanGu), Pathways Language Model (PaLM), Open Pretrained Transformer 175B (OPT 175B), BigScience Large Open-science Open-access Multilingual Model (BLOOM), Naver's Korean super-giant model (HyperCLOVA), etc., and may also include new language models that will appear in the future.

A transformer may be utilized not only in natural language processing (NLP) but also in computer vision, and representative transformer-based vision models include Vision Transformer (ViT), Sliding Window-based Transformer for Vision (Swin Transformer), etc.

Therefore, a transformer is one of the core techniques of various artificial intelligence models that utilize an attention mechanism. A transformer-based language model can, for example, output 'yes you are an expert' when 'npu is an ai accelerator' is input.

According to examples of the present disclosure, a device, method, system, and computer-readable medium, etc., that enable a generative artificial intelligence service to operate on the device itself (also referred to as on-device) may be provided.

Generally, a transformer-based generative artificial intelligence model receives a query and generates a response. For example, a language model receives a query in text form and generates a token. Then, the query and the generated token are input back into the language model to generate the next token. This token generation operation may be repeated several times until the response to the query is complete. A token may correspond to a word or part of a word. The response generated by the language model may include a series of tokens that are further generated by passing the tokens generated as part of the response from the language model back through the language model.

Figure 2:
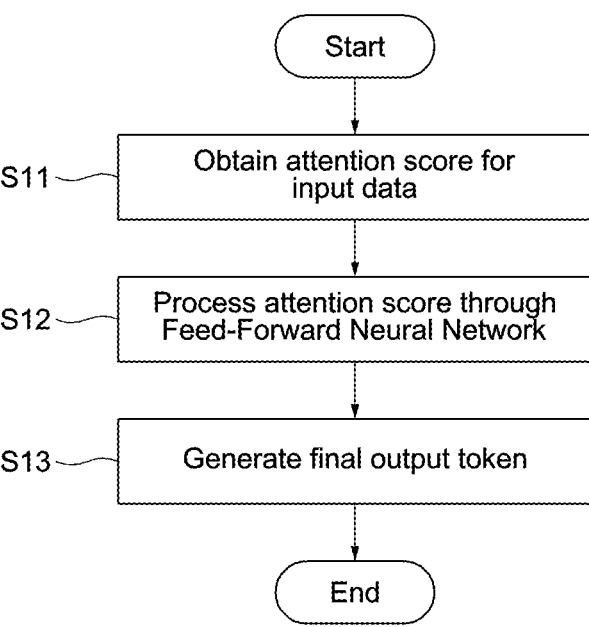
FIG. 2 is a flowchart illustrating generating output data from input data using an artificial intelligence model, according to one embodiment.

FIG. 1 and FIG. 2 illustrate a process of inferring a transformer-based generative artificial intelligence language model on an NPU, according to one embodiment. A computing system according to the present disclosure may operate on an edge device and perform inference on input text data through embedding, attention, feedforward, softmax, etc., to generate output tokens. This process involves numerous matrix multiplications and nonlinear operations, and the disclosed NPU enables high-speed inference through the efficient performance of these operations.

FIG. 1 is a block diagram illustrating a computing system for processing a language model that may be applied to examples of the present disclosure. Referring to FIG. 1, a computing system 1 may receive input data and generate output data. The computing system 1 may comprise a neural processing unit (NPU) 100. In addition, the computing system 1 may further comprise an operation unit such as a central processing unit (CPU), a graphics processing unit (GPU), and memory, in addition to the neural processing unit 100, and the embedding transformation for input text may be performed by the central processing unit or the graphics processing unit. The transformed embedding vector is delivered to the neural processing unit 100 and may be utilized for subsequent inference operations by the neural processing unit 100. The neural processing unit 100 may perform the inference operation of a transformer-based generative artificial intelligence model. The neural processing unit 100 may be referred to as an AI accelerator, an AI hardware accelerator, etc., but is not limited thereto. Here, the computing system 1 may be an example of a device 10000, and may include a smartphone, a robot, an ADAS system, etc.

The neural processing unit 100 may generate output data from input data. According to an embodiment, the input data may be text data. The output data may be text data or image/video data. The text data is composed of at least one token. For example, if text comprising five tokens, 'npu', 'is', 'an', 'AI', 'accelerator', is input to the NPU, the neural processing unit 100 may perform a transformer-based artificial neural network operation to output text comprising six tokens, 'yes', 'i', 'am', 'the', 'AI', 'accelerator'.

The transformer-based artificial neural network operation may be performed in an on-device manner. That is, the computing system 1 may be included and driven on an edge device such as a smartphone, camera, CCTV, robot, drone, etc., and does not involve wired or wireless communication with the outside of the computing system 1 for the artificial neural network operation.

The transformer-based artificial neural network operation may be performed based on an attention mechanism. Under the attention mechanism, input data in text form is converted into an embedding vector through an embedding process, and the embedding vector may be converted into a query, key, and value vector using a vector-matrix multiplication (MatMul) with a query weight matrix, a key weight matrix, and a value weight matrix. The query weight matrix, the key weight matrix, and the value weight matrix are each pre-learned value. Thereafter, the similarity of the query Q with the key K is calculated, and an attention score may be obtained by assigning a value V to the calculated similarity.

FIG. 2 is a flowchart illustrating a method for generating output data by a neural processing unit, according to one embodiment. The neural processing unit generates output data from input data using an artificial intelligence model, which may be applied to examples of the present disclosure. Referring to FIG. 2, the neural processing unit 100 may obtain S11 an attention score for the input data.

The input data may include a plurality of tokens, and each token may be represented by an embedding vector of a predetermined dimension ($d_{model}$). The number of dimensions of the embedding vector ($d_{model}$) may be, for example, 128, 256, 1024, 2048, or 4096. For convenience of explanation, $d_{model}$ is assumed to be 4096 hereinafter. In this embodiment, one token in the computing system 1 may be represented by a 1×4096 dimensional embedding vector.

For example, if a user inputs "npu is an AI accelerator" composed of 5 tokens to the computing system 1, the computing system 1 may convert the corresponding input text into a 5×4096 (i.e., five 1×4096) size embedding vector, and the neural processing unit 100 may receive the embedding vector. The neural processing unit 100 may obtain a query vector Q by vector-matrix multiplying the embedding vector with a query weight matrix. The neural processing unit 100 may obtain a key vector K by vector-matrix multiplying the embedding vector with a key weight matrix. Then, the neural processing unit 100 may obtain the similarity through the dot product between the query vector Q and the key vector K. By dot-multiplying the query vector Q and the key vector K, a scalar value is obtained, and as a result, a vector $QK^T$ of a size (1×5) equal to the number of tokens in the input data is obtained. $QK^T$ represents the similarity of the current token with the key k (each of the 5 tokens). However, since the elements of the obtained vector $QK^T$ can be numerically very large, for numerical stability, the final normalized similarity can be obtained by dividing $QK^T$ by the square root of the size of the key vector K ($\sqrt{d_k}$) and then applying a softmax operation. The following Equation 1 mathematically represents the similarity calculation based on softmax. k can be one of 1, 2, . . . , N (where N is the number of tokens included in the input data, in this embodiment N=5).

$$\text{Similarity with key } K \text{ of current token } QK = softmax\left(\frac{QK^T}{\sqrt{d_k}}\right) \quad \text{Equation 1}$$

The softmax operation is an operation that converts several numbers into probabilities between 0 and 1. The following Equation 2 represents a formula for performing a softmax operation on a vector $[z_1, z_2, \ldots, z_n]$.

$$\sigma(zi) = \frac{e^{z_i}}{\sum_{j=1}^{n} e^{z_i}}$$ 
Equation 2

However, if a very large value exists in zi, a numerical instability problem may occur. To solve this, a numerically more stable calculation can be made possible by using a method of subtracting the maximum value $z_{max}$ (negative exponential trick). The following Equation 3 is a softmax operation formula that modifies Equation 2 using $z_{max}$.

$$o(zi) = \frac{e^{z_i - z_{max}}}{\sum_{j=1}^{n} e^{z_i - z_{max}}}$$
Equation 3

Through Equation 1, the similarity can be obtained, for example, as a 1×5 size vector of [0.007, 0.993, 0, 0, 0]. The similarity is a value in which the similarity of the current query (e.g., 'npu') to other tokens is expressed as a probability.

According to an embodiment, the neural processing unit 100 may assign a value to the similarity. The value vector is similar to the method of calculating the key vector. The embedding vector may be converted into a value vector through a vector-matrix multiplication with a pre-learned value weight matrix. An attention score may be obtained by vector-matrix multiplying the similarity obtained through Equation 1 with the value vector V. As a result, an attention score of 5×4096 size, which is the same dimension as the input data, may be obtained by performing an operation such as the following Equation 4.

$$\text{Attention Score} = softmax\left(\frac{QK^T}{\sqrt{d_k}}\right) \times V$$
Equation 4

That is, the neural processing unit 100 repeatedly performs the attention operation of Equation 4 to generate output data. In this process, it can be seen that the neural processing unit 100 repeatedly performs high-dimensional calculations including vector-matrix multiplication, division, and multiplication operations. According to an embodiment, the neural processing unit 100 may additionally perform residual connection and layer normalization. Residual connection and layer normalization are for compensating for the possibility of gradient vanishing that can occur in the differentiation-based learning method of deep learning, and may reduce information loss by adding the input value to the output value that has passed through the layer of the artificial neural network. For residual connection, after the attention score is calculated, the embedding vector of the input data may be added to the corresponding attention score. Layer normalization can alleviate the covariant shift by adjusting the value based on the mean and variance of the output value (i.e., the result of the residual connection) in natural language processing.

Next, the neural processing unit 100 may process S12 the attention score through a feed-forward neural network. The feed-forward neural network is for predicting nonlinear phenomena, and may infer the contextual meaning of phrases or clauses by recombining the relationship information of the tokens for which the attention score was calculated. The feed-forward neural network can, for example, use a fully connected hidden layer where two layers with 2,048 nodes are all connected, and the output may be a vector of the same 4,096 dimensions as the input. The feed-forward neural network is pre-learned, and a vector-matrix multiplication operation may be repeatedly performed for inference. Here, the input is represented as a 4,096-dimensional vector as the result of passing through the residual connection and normalization in step S11, and the residual connection and normalization of step S11 may also be additionally performed on the output of the hidden layer composed of two layers.

Next, the neural processing unit 100 may generate S13 the final output token. For this purpose, the output vector calculated in step S12 is expanded to the number of the entire token set that may be processed by the language model (e.g., 30,000). For example, the output vector of step S12 may be expanded to a 1×30000 size logit vector by being matrix-multiplied with a final output weight matrix (e.g., 4,096×30,000). The size of the final output weight matrix for the final output is $d_{model} \times SIZE\_DIC$, where SIZE_DIC represents the total number of tokens that may be output from the language model being inferred in the neural processing unit 100 (in this embodiment, 30,000). A softmax operation is applied to the calculated 1×30,000 size logit vector, so that all 30,000 tokens are normalized to probability values between 0 and 1, and the token with the highest probability value among the 30,000 probability values may be selected as the next output token to be generated. For example, if the input to the neural processing unit 100 is 'npu is an AI accelerator', the output token may be determined as 'yes, I am the AI accelerator'.

As described above with reference to FIG. 1 and FIG. 2, the neural processing unit repeatedly performs numerous matrix multiplication operations (MatMul), vector operations, and scalar operations for the inference operation of a transformer-based artificial neural network model, and the neural processing unit needs to be optimized for these operations. Hereinafter, the structure and operation of the neural processing unit 100 will be described.

Figure 3:
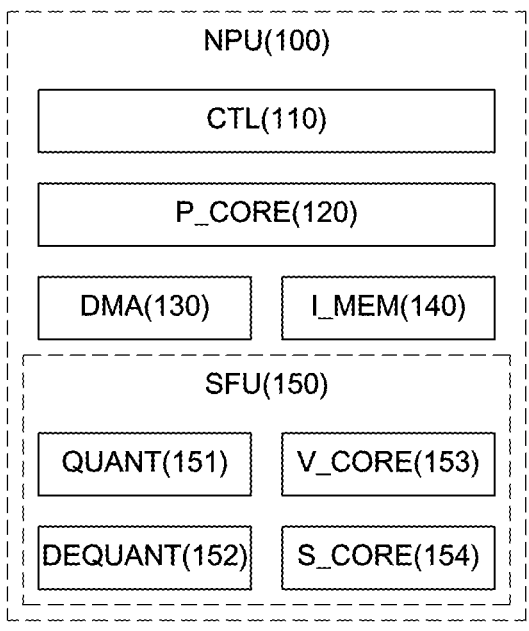
FIG. 3 is a block diagram illustrating a neural processing unit, according to one embodiment.

FIG. 3 is a block diagram illustrating a neural processing unit that may be applied to examples of the present disclosure. The neural processing unit 100 will be described in detail with reference to FIG. 3. The neural processing unit 100 is a dedicated processor specialized for deep neural network (DNN) operations, separate from a processor such as a central processing unit or a graphics processing unit. The neural processing unit 100 may be referred to as a tensor processing unit (TPU), an AI accelerator, a neural signal processor (NSP), a neural network processor (NNP), etc.

The neural processing unit 100 may be a semiconductor implemented with electrical/electronic circuits. That is, each component of the neural processing unit 100 may be a semiconductor circuit composed of numerous electronic devices (e.g., transistors, capacitors, electrical wiring, etc.). Therefore, some of them may be difficult to identify and distinguish with the naked eye and can only be identified by their operation.

This neural processing unit 100 is for accelerating artificial neural network operations and is also called an AI hardware accelerator. The artificial neural network may output the operations of a transformer-based language model. However, it is not limited to this and may also process vision-based models such as YOLO or ResNet. It may be mounted on a device 10000 and output various information based on artificial intelligence. The device 10000 may include a central processing unit, a graphics processing unit, an application processor (AP), a microcontroller unit (MCU), etc., in addition to the neural processing unit 100. The device 10000 may include a microphone, camera, touch pad, keyboard, etc., to receive input data, and may include a monitor, speaker, etc., to output output data. The device 10000 may include a smartphone, a secretary terminal located in a home or office, a home appliance, a vehicle's VCU or ADAS system, a camera such as a CCTV, a robot, a smart mobility, etc., but is not limited thereto.

The neural processing unit 100 according to examples of the present disclosure is specially designed to accelerate the attention algorithm of a transformer-based neural network model with low power, which will be described in detail later. However, the neural processing unit 100 of the present disclosure is not limited to a transformer neural network and may process various neural network models such as a convolutional neural network (CNN).

The neural processing unit 100 that may be applied to examples of the present disclosure may comprise a controller (CTL) 110, a processing core (P_CORE) 120, a direct memory access (DMA) 130, an internal memory (I_MEM) 140, and a special function unit (SFU) 150.

The processing core 120, vector core (V_CORE) 153, and scalar core (S_CORE) 154 of the neural processing unit 100 may be operation circuits configured to efficiently process the attention layer of a neural network model. The attention layer may obtain an attention score (Q, K, V), which is an operation value, using an input value and parameters such as a query Q, a key K, and a value V.

The processing core 120, vector core 153, and scalar core 154 are designed to process operations such as matrix multiplication, root mean square normalization, and softmax for the attention operation. The tensor data form for the above operations may be one of a multi-dimensional matrix form, a 2D matrix form, a 1D array form, or a scalar value, and one of the processing core 120, vector core 153, and scalar core 154 may be selected for the operation according to the data form. Therefore, the neural processing unit 100 can rapidly accelerate the operation of a generative artificial intelligence model with low power by appropriately adopting a suitable hardware module according to the operation. That is, the processing core 120 may process the mathematical operations for artificial neural network inference operations, and may include an arithmetic logic unit (ALU), a multiply-accumulate unit (MAC), an adder tree, etc.

The controller 110 may be electrically connected to the processing core 120, the direct memory access 130, the internal memory 140, and the special function unit 150. The controller 110 may control operations related to the neural network operations of the neural processing unit 100. The controller 110 may control each circuit included in the neural processing unit 100 to process the inference operation of the neural network model by an execution code generated by a compiler (not shown). The compiler (not shown) may be a semiconductor circuit, or may be a software module that operates on a separate device from the neural processing unit 100.

The compiler (not shown) may obtain an executable code that can be executed in the neural processing unit 100 by compiling a specific neural network model. That is, the compiler (not shown) may generate an executable code that can be exclusively executed in a specific neural processing unit having a specific performance. The executable code may also be referred to as machine code or binary code.

The controller 110 may control the processing core 120, the direct memory access 130, the internal memory 140, and the special function unit 150, etc., based on various commands and operation schedules included in the execution code. The compiler (not shown) may be provided with the hardware characteristics of the neural processing unit 100 (e.g., the operation performance of the processing core 120, the operation performance of the vector core 153, the operation performance of the scalar core 154, the processing performance of the number system conversion units (quantization unit (QUANT) 151, dequantization unit (DEQUANT) 152), the capacity of the internal memory 140, and the main memory (not shown) bandwidth of the corresponding bus (not shown), etc.). In addition, the compiler (not shown) may be provided with the structure information (e.g. a directed acyclic graph) of the neural network model to be processed by the neural processing unit 100, information on the algorithms included in the neural network model, and the size information of the parameters. Then, the compiler (not shown) may generate an execution code for controlling the read/write order of data for the neural network operation, the neural network operation processing order, the operation status of each component of the neural processing unit 100, etc. The controller 110 may be provided with the execution code from the compiler and control the neural processing unit 100 based on the execution code. Each execution code can be generated corresponding to each neural network model, and the neural processing unit 100 may be configured to process at least one execution code.

The processing core 120 may include a specialized electronic circuit for matrix multiplication, which accounts for the largest amount of computation in neural network operations. For example, the processing core 120 may be composed of a plurality of processing elements. For example, the processing core 120 may be designed with an M×N (where M and N are integers) processing element array structure or an adder tree structure, but is not limited thereto. The processing core 120 may be configured to process the matrix multiplication operation of input data and corresponding parameters (e.g., weights, kernels, query Q, key K, value V, etc.) by processing data in parallel based on a plurality of processing elements (PEs) (not shown).

For this, the processing elements (not shown) may each include a multiply and accumulate (MAC) operator. Therefore, the processing core 120 may efficiently process matrix multiplication or convolution operations. To elaborate, the processing core 120 may be a circuit designed to simultaneously process M×N size tensor data. Here, the number of processing cores 120 may be at least one. The processing core 120 may exchange data with the vector core 153, the scalar core 154 of the special function unit 150, the internal memory 140, and the main memory (not shown). The processing core 120 may be configured to receive integer parameters and output integer parameters. The input integer parameters may include input parameters and weights. The input parameter may be configured to have a first bit width, and the weight parameter may be configured to have a second bit width. The output integer parameter may be configured to have a third bit width, and the third bit width may be configured to be larger than the first bit width or the second bit width.

The number of processing elements (not shown) included in the processing core 120 increases, the number of transistors in the application specific integrated circuit (ASIC) increases, and the manufacturing cost may increase. If the circuit of the processing core 120 is designed to process integer parameters instead of floating-point, the number of transistors in the ASIC may be significantly reduced, and the power consumption of the neural processing unit 100 may be significantly reduced.

The bit width of the integer parameters that the processing core 120 can process may be determined based on the hardware design of the processing element (not shown). This will be described later with reference to FIG. 4. The number of processing elements (not shown) may be from several hundred to tens of thousands. To elaborate, the number of transistors included in a processing element designed to process floating-point parameters is about four times greater than the number of transistors included in a processing element designed to process integer parameters. Therefore, if the circuit of the processing core 120 of the neural processing unit 100 according to examples of the present disclosure is designed to exclude floating-point parameter operations and operate only on integer parameters, the number of transistors may be reduced by about 75% compared to a floating-point operation circuit. In this embodiment, the number of processing elements (not shown) included in the processing core 120 may be easily increased in the same chip area compared to floating-point, and there is an effect of being able to improve the operation processing performance with low power while reducing the size of the semiconductor chip.

The special function unit 150 refer to a collection of various circuit units configured to process various neural network operations that are not processed in the processing core 120. That is, the special function unit 150 is a circuit that can accelerate special operations difficult to perform in an ALU. The special function unit 150 may perform exponential operations, log functions (log, ln), square root (sqrt), reciprocal and reciprocal square root (1/sqrt(x)), trigonometric functions (Sin, Cos, Tan, ArcSin, ArcCos), quantization (INT8/FP16 conversion) operations, etc. For example, the special function unit 150 may include a quantization unit 151, a dequantization unit 152, a vector core 153, and a scalar core 154. The quantization unit 151 and the dequantization unit 152 may be collectively referred to as a number system conversion unit, but are not limited thereto.

The quantization unit 151 of the special function unit 150 can convert floating point (FP) data to integer (INT) data, and the dequantization unit 152 can convert integer data back to floating point data.

The vector core 153 of the special function unit 150 refer to a collection of circuits that process at least a part of the remaining operations of the artificial intelligence model, excluding the matrix multiplication processed in the processing core 120. The vector core 153 may be designed to include a plurality of specialized vector operation circuits. For example, the vector core 153 may include a vector maximum value operation unit (V_MAX) 1531, a vector multiplication unit (V_MUL) 1532, a vector addition unit (V_ADD) 1533, a MAC operation unit (V_MAC) 1534, a mask unit (V_MASK) 1535, a rounding and clipping unit (RND_CLIP) 1536, and a vector function approximation unit (V_FuncApx) 1537. The operation of each module of the vector core 153 will be described later with reference to FIG. 5.

The scalar core 154 of the special function unit 150 refer to a collection of circuits that process at least a part of the remaining operations of the artificial intelligence model, excluding the operations processed in the processing core 120 and the vector core 153. The scalar core 154 may be designed to include a plurality of specialized scalar operation circuits. For example, the scalar core 154 may include a scalar maximum value operation unit (S_MAX) 1541, a scalar multiplication unit (S_MUL) 1542, a scalar addition unit (S_ADD) 1543, a scalar summation unit (S_SUM) 1544, and a scalar function approximation unit (S_FuncApx) 1545. The operation of each module of the scalar core 154 will be described later with reference to FIG. 6.

The direct memory access 130 may enable access at least one memory electrically connected to the neural processing unit 100 to perform data read/write operations. The at least one memory may include at least one of a main memory (not shown), a shared memory (not shown), a storage device (not shown), etc. The neural processing unit 100 may transmit various data related to artificial intelligence operations to the at least one memory (not shown) or read data from the at least one memory (not shown) through the direct memory access 130. The direct memory access 130 may be configured to perform operations such as setting the address of the internal memory 140, generating and controlling read/write commands. The direct memory access 130 may be connected to at least one communication bus and configured to control the at least one memory.

The internal memory 140 is a memory placed in the on-chip area of the neural processing unit 100. The internal memory 140 may include a memory for caching or storing data processed in the on-chip area and/or a register file for storing instructions for driving a compiled neural network model. The register file may also be configured to be included in the controller 110. For example, when a memory (not shown) connected to a bus is provided, the internal memory 140 can read and store data for operations from the memory. The internal memory 140 may include SRAM, a register file. DRAM, resistive RAM, magneto-resistive RAM, phase-change RAM, ferroelectric RAM, or flash memory. The internal memory 140 may be composed of at least one memory unit. The internal memory 140 may be composed of a single (homogeneous) memory unit or heterogeneous memory units. The capacity of the internal memory 140 may be from several megabytes to tens of megabytes, but is not limited thereto.

The quantization unit 151 of the special function unit 150 may be configured to include a quantization circuit. The dequantization unit 152 may be configured to include a dequantization circuit. The quantization unit 151 and the dequantization unit 152 may be referred to as a number system conversion unit.

According to an embodiment, the input and output of the processing core 120 may be in integer form. The input and output of the vector core 153 and the scalar core 154 may be in floating point form. The quantization unit 151 and the dequantization unit 152 can convert data into the data form (number system) used by each hardware during data transmission between the processing core 120, the vector core 153, and the scalar core 154. That is, the quantization circuit of the quantization unit 151 can convert floating point parameters to integer parameters. The dequantization circuit of the dequantization unit 152 can convert integer parameters to floating point parameters.

According to examples of the present disclosure, the floating point is not limited to the IEEE standard 754, and for the operation efficiency, memory usage reduction, and power consumption reduction of the neural processing unit 100, brain floating point, dynamic floating-point, variable precision floating-point (VPFP), custom floating-point (CFP), or flexible floating-point (FFP) may be applied. VPFP is a floating-point format that allows dynamic setting or adjustment of the bit width of the exponent and mantissa. Using VPFP may optimize power and performance by allowing flexible precision levels based on specific calculations. Dynamic floating-point formats, used interchangeably with variable precision, allow for on-the-fly adjustment of mantissa and exponent sizes during runtime, enabling response to data characteristics in real time. CFP refers to an application-specific format where the bit allocation for the mantissa and exponent is tailored to the needs of a specific use case. This may be useful for implementing a neural processing unit 100 that selects the exact bit width to increase efficiency of hardware resources and the accuracy of data. FFP refers to a floating-point format that allows for adjustable bit allocation between the exponent and mantissa. FFP may be implemented in the neural processing unit 100 to provide an optimal balance between range and precision. The bit width of the floating point according to examples of the present disclosure may be between 4 bits and 32 bits. The bit width of the integer according to examples of the present disclosure may be between 4 bits and 32 bits.

The neural processing unit 100 disclosed in the present disclosure may provide at least one of a power gating function, a clock gating function, and a register retention function to allow the neural processing unit 100 to operate with low power.

The power gating function is a technique that may eliminate or reduce leakage power by cutting off the power to unused circuit blocks. A power switch is provided to the circuit block to which power gating is applied. Accordingly, a specific circuit block of the neural processing unit 100 may be disconnected from the power source using the power switch. The power gating function may eliminate both dynamic power and leakage power, allowing the device to operate in a low-power mode.

The clock gating function is a technique that reduces dynamic power consumption by cutting off the clock signal to unused circuit blocks. The circuit block to which clock gating is applied may selectively cut off the clock signal input to a specific circuit block using clock control logic. When clock gating is applied, since power is continuously supplied to the NPU, the state of the circuit may be maintained. Since the power is not turned off with clock gating, operation may be resumed immediately upon reactivating the clock, and dynamic power may be saved by reducing unnecessary switching activity.

The register retention function is a technique designed to allow a specific register of the neural processing unit 100 to maintain its state even when the power is turned off. The register to which register retention is applied may maintain the data stored in the register using only low power in sleep mode. Therefore, even if the register enters a power-saving mode, important register values may be maintained, no initialization is performed upon return. Register retention may provide low-power operation, and may maintain data using extremely low power even when the power of the neural processing unit 100 is turned off.

The hardware operation between each component of the neural processing unit 100 of FIG. 3 will be described in detail below based on FIG. 8.

Figure 4:
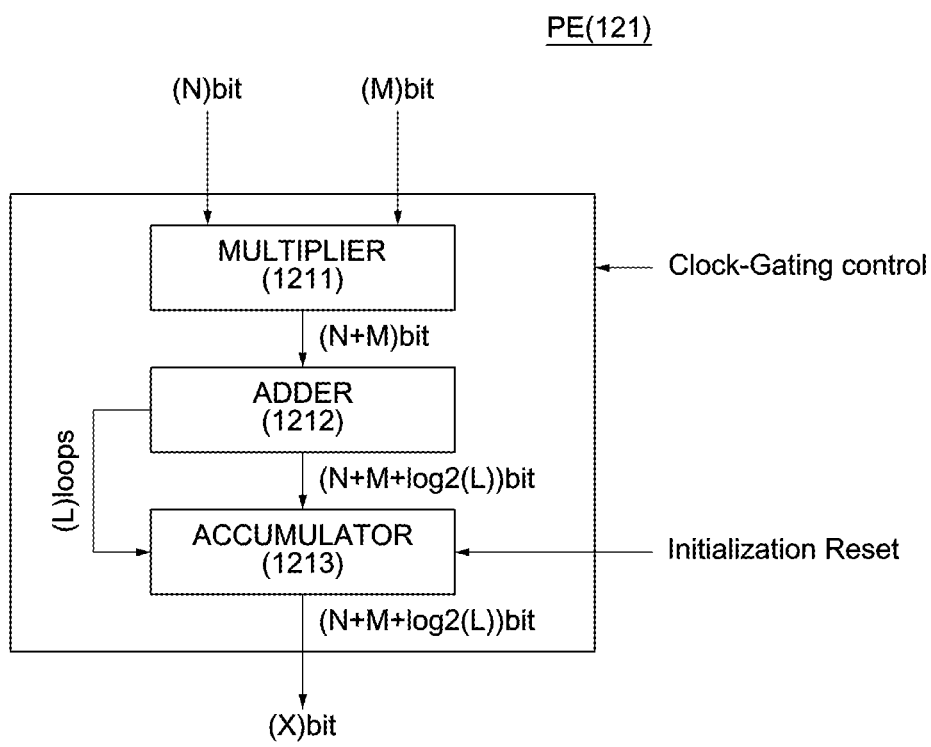
FIG. 4 is a block diagram illustrating a processing element, according to one embodiment.

FIG. 4 is a block diagram illustrating a processing element that may be applied to examples of the present disclosure. Referring to FIG. 4, a processing element 121 may be configured to comprise a multiplier 1211, an adder 1212, and an accumulator 1213. The processing element 121 of FIG. 4 may be one of a plurality of processing elements included in the processing core 120 of FIG. 3, and hereinafter, the processing element 121 may be referred to as representing each processing element.

The multiplier 1211 multiplies the input (N)bit data and (M)bit data. The operation value of the multiplier 1211 is output as (N+M)bit data where N and M are integers greater than 0. The first input unit may be configured to receive (N)bit data. The second input unit may be configured to receive (M)bit data. For example, the first input unit may be configured to receive an input parameter, and the second input unit may be configured to receive a weight parameter.

The bit width of the parameters input to the first input unit and the second input unit of the processing element 121 may be determined when compiling the current neural network model processed by the neural processing unit 100 to obtain an execution code. That is, the bit width of the input parameter and the weight parameter of the neural network model may be determined in the compilation step by the compiler. For example, the bit widths of the input parameter and the weight parameter may be quantized to be the same, and the bit width may be 32 bits, 16 bits, 8 bits, 4 bits, etc., but the present disclosure is not limited thereto. For example, the bit width of the input parameter and the bit width of the weight parameter may be determined to be different from each other, and the parameters may be quantized based on each bit width. For example, the bit width of the input parameter and the bit width of the weight parameter may be quantized to 16 bits and 8 bits, respectively. For example, the bit width of the input parameter and the bit width of the weight parameter may be quantized to 8 bits and 4 bits, respectively. That is, the bit width of the parameters input to each input unit of the processing element 121 may be different from each other. The processing element 121 may include the quantization information of the data input to each input unit in the execution code.

The accumulator 1213 accumulates the operation value of the multiplier 1211 and the operation value of the accumulator 1213 using the adder 1212 for (L) loops. Therefore, the bit width of the data of the output unit and the input unit of the accumulator 1213 may be output as $(N+M+\log 2(L))$ bits where L is an integer greater than 0. When the accumulation is finished, an initialization reset signal (INITIALIZATION RESET) may be input to initialize the data stored inside the accumulator 1213 to 0. The accumulator 1213 of the processing element 121 is configured to maintain the accumulated value when zero skipping is activated. Based on the maximum value that may be accumulated in the accumulator 1213, the output data (X)bit may be set to a bit width that does not cause an overflow of the output data (X)bit. For example, the (X)bit may be from 16 bits to 64 bits.

To elaborate, the quantization unit 151 of the special function unit 150 may convert the integer parameters output from the processing core 120 into floating-point and transmit them to the vector core 153, the scalar core 154, and/or the internal memory 140. The quantization unit 151 may be controlled under the control signal of the controller 110.

The controller 110 may restrict the operation of the multiplier 1211 (e.g., zero skipping operation) so that it does not perform an operation when 0 is received as one of the first input unit and the second input unit of the multiplier 1211, based on the fact that the operation result becomes 0 even if no operation is performed. For example, when 0 is input to one of the first input unit and the second input unit of the multiplier 1211 of the processing element 121, the multiplier 1211 may operate in a zero-skipping manner. For zero skipping, each processing element 121 included in the processing core 120 may be activated or deactivated, respectively. The controller 110 may provide an activation or deactivation signal CLOCK-GATING CONTROL to each processing element 121 in clock units. When the processing element 121 is deactivated, the multiplier 1211 is deactivated. Accordingly, the power consumed for the operation of the multiplier 1211 may be reduced. An example of the power consumption of the multiplier 1211 may be shown in FIG. 7.

The processing element 121 may be designed to receive a control signal CLOCK-GATING CONTROL for zero skipping operation control (i.e., activation or deactivation) from the controller 110. Specifically, the multiplier 1211 of the processing element 121 may be designed to receive each control signal CLOCK-GATING CONTROL for zero skipping operation control from the controller 110. Alternatively, the adder 1212 of the processing element 121 may be modified to be designed to receive a control signal CLOCK-GATING CONTROL for zero skipping operation control from the controller 110. Alternatively, each of the multiplier 1211 and the adder 1212 of the processing element 121 may be modified to simultaneously receive each control signal CLOCK-GATING CONTROL for zero skipping operation control from the controller 110.

The controller 110 may, before a softmax operation is performed, pre-reflect a multiplication operation (FpMul) based on a normalization coefficient included in the weights of the neural network model at compile time to integrate it into the weights, and improve the operation path to omit the corresponding multiplication operation at runtime. This corresponds to a static method for reducing operational efficiency and power consumption by eliminating unnecessary runtime multiplication operations.

In addition, the controller 110 may selectively control whether to execute a multiplication operation between a query vector and a key vector according to the type of operation request (e.g., attention operation, feedforward operation, etc.) or the operation timing (e.g., decoding step, learning step, etc.). This configuration may be implemented by controlling the clock supply of the processing element 121 including the multiplier 1211 or by bypassing the operation path itself to omit the operation.

This control may be processed inside the neural processing unit 100, or may be performed through an integrated controller in a system-on-chip (SoC) architecture that includes a plurality of operation units. In this case, the controller 110 may include clock gating or power control signals for each unit, and may be configured to dynamically adjust whether to activate an operation for each operation unit.

Figure 5:
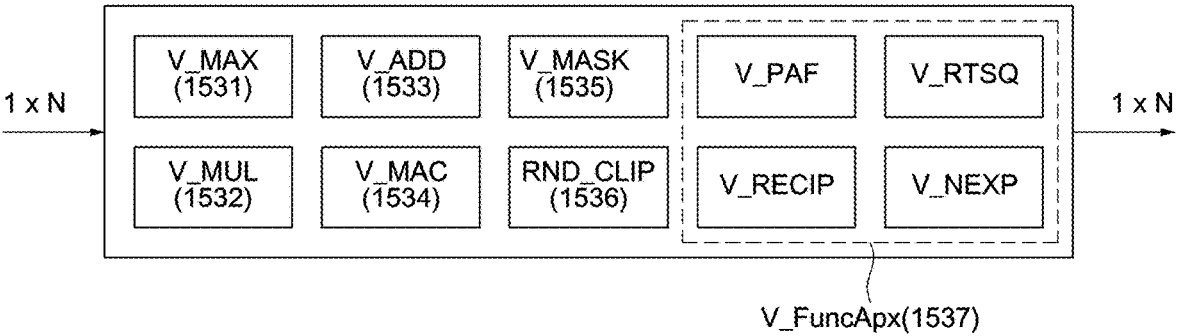
FIG. 5 is a block diagram illustrating a vector come of a special function unit, according to one embodiment.

FIG. 5 is a block diagram illustrating a vector core of a special function unit, according to one embodiment. The vector core 153 refer to a collection of circuits that process a part of the operations of the artificial intelligence model, excluding the matrix multiplication processed in the processing core 120. The vector core 153 is different from the processing core 120 in that it is composed of floating-point operator circuits. That is, the vector core 153 may be configured to receive floating-point parameters and output floating-point parameters. The vector core 153 may be designed to be pipelined with the processing core 120 and the scalar core 154 for operational efficiency with the processing core 120 and the scalar core 154. To elaborate, the vector core 153 is configured to exchange data with the processing core 120, the scalar core 154, the internal memory 140, and the main memory (not shown). The vector core 153 may be specially designed to efficiently process a part of the attention operation of a transformer-based neural network model. That is, the vector core 153 may include a plurality of specialized vector operation circuit units.

For example, the vector core 153 may be designed to include a vector maximum value operation unit (V_MAX) 1531, a vector multiplication unit (V_MUL) 1532, a vector addition unit (V_ADD) 1533, a MAC operation unit (V_MAC) 1534, a mask unit (V_MASK) 1535, a rounding and clipping unit (RND_CLIP) 1536, and a vector function approximation unit (V_FuncApx) 1537. The vector maximum value operation unit 1531 is configured to include a circuit that processes the maximum value operation of the input tensor data. The vector multiplication unit 1532 is configured to include a circuit that processes the multiplication operation of the input tensor data. The vector addition unit 1533 is configured to include a circuit that processes the addition operation of the input tensor data. The MAC operation unit 1534 is configured to include a circuit that processes the Multiply And Accumulate (MAC) operation of the input tensor data. The mask unit 1535 is configured to include a circuit that processes the masking operation of the input tensor data. The rounding and clipping unit 1536 is configured to include a circuit that processes the rounding and clipping operations of the input tensor data. The vector function approximation unit 1537 is configured to include a circuit that processes the approximation operations of various functions, and may be applied to an exponential function operation performed during a softmax operation or a vector-unit weighted sum operation. In particular, the vector core 153 may be configured to generate an input vector for a softmax operation by multiplying the dot product result between a query vector and a key vector by one or more normalization coefficients, create a stabilized softmax distribution by subtracting the maximum value from each element of this generated input vector, and output the final attention result by multiplying the softmax operation result with a value vector. The normalization coefficients may be constant values calculated at compile time and stored in memory. This operation flow may be implemented centered on circuits such as the vector maximum value operation unit 1531, the vector multiplication unit 1532, the vector addition unit 1533, and the vector function approximation unit 1537, and may be configured in a pipelined and parallel processing manner considering operational efficiency. If necessary, a MAC operation unit 1534 for multiply-and-accumulate operations, a mask unit 1535 for masking processing, or a rounding and clipping unit 1536 for output precision correction may be further included to expand the configuration to include auxiliary operation flows before and after the softmax operation.

Hereinafter, the vector function approximation unit 1537 will be described in more detail. The vector core 153 may be a circuit designed to simultaneously process N×1 size tensor data. The vector core 153 may be designed to receive N×1 size tensor data and output N×1 size tensor data where N of the N×1 size tensor data received by the vector core 153 may be the same as the number of columns N of the M×N size tensor data received by the processing core 120. That is, a pipeline circuit design may be implemented by matching the size of a specific dimension of the tensor data of each of the processing core 120 and the vector core 153. To elaborate, the vector core 153 may include a register file for storing 1D array data. Therefore, the vector core 153 may improve the operation processing efficiency by processing the tensor data output from the processing core 120 in specific dimension units. As mentioned above, the vector core 153 is configured to process various function operations with a floating-point operator. Therefore, if the vector core 153 is designed to process the same tensor size as the processing core 120, the semiconductor chip size and power consumption of the neural processing unit 100 may increase. However, since the vector core 153 is designed to process data in a 1D array form, the increase in the semiconductor chip size of the neural processing unit 100 can be reduced, power consumption can be reduced, and the bottleneck phenomenon of neural network operations can be reduced by being pipelined with the processing core 120. In some examples, the vector core 153 may be designed to receive L×1 size tensor data. Here, L may be a power of 2 within a specific range based on the said N. For example, when N is 64, L may be 8, 16, 32, 64, 128, or 256.

Figure 6:
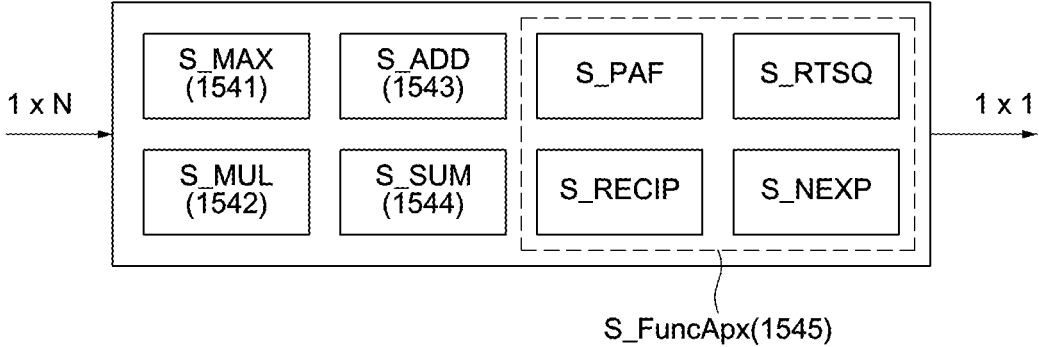
FIG. 6 is a block diagram illustrating a scalar core of a special function unit, according to one embodiment.

FIG. 6 is a block diagram illustrating a scalar core of a special function unit, according to one embodiment. The scalar core 154 refers to a collection of circuits that process a part of the operations of the neural network model, excluding the operations processed in the processing core 120 and the vector core 153. The scalar core 154 is different from the processing core 120 in that it is composed of floating-point operator circuits. That is, the scalar core 154 may be configured to receive floating-point parameters and output floating-point parameters. The scalar core 154 may be designed to be pipelined with the processing core 120 and the vector core 153 for operational efficiency with the processing core 120 and the vector core 153. To elaborate, the scalar core 154 is configured to exchange data with the processing core 120, the vector core 153, the internal memory 140, and the main memory (not shown). To elaborate, the scalar core 154 may be specially designed to efficiently process a part of the attention operation of a transformer-based neural network model. That is, the scalar core 154 may include a plurality of specialized scalar operation circuit units.

For example, the scalar core 154 may be designed to include a scalar maximum value operation unit 1541, a scalar multiplication unit 1542, a scalar addition unit (S_ADD) 1543, a scalar summation unit (S_SUM) 1544, and a scalar function approximation unit (S_FuncApx) 1545. The scalar maximum value operation unit 1541 is configured to include a circuit that processes the maximum value operation of the input tensor data. The scalar multiplication unit 1542 is configured to include a circuit that processes the multiplication operation of the input tensor data. The scalar addition unit 1543 is configured to include a circuit that processes the addition operation of the input tensor data. The scalar summation unit 1544 is configured to include a circuit that accumulates a plurality of input scalar values or performs an aggregation operation according to a certain range or condition. The scalar function approximation unit 1545 is configured to include a circuit that processes the approximation operations of various functions. This function approximation operation may be applied to the calculation of a correction coefficient such as the approximate calculation of an exponential function used in a softmax operation and a reciprocal operation for the total sum. In other words, the scalar core 154 may be configured to calculate a correction coefficient for a softmax operation by calculating the maximum value among the results of the multiplication operation between a normalized query vector and a key vector, calculating the total sum of the exponential function, and then obtaining the reciprocal.

Hereinafter, the scalar function approximation unit 1545 will be described in more detail. The scalar core 154 may be a circuit designed to simultaneously process 1×N size tensor data. The scalar core 154 may be designed to receive 1×N size tensor data and output 1×1 size tensor data. The scalar core 154 may be designed to receive 1×N size tensor data and output 1×1 size scalar data. 1×N size of the tensor data received by the scalar core 154 may be the same as M×1 size received by the vector core 153. That is, a pipeline circuit design may be implemented by matching the size of a specific dimension of the tensor data of each of the vector core 153 and the scalar core 154. To elaborate, the scalar core 154 may include a register file for storing 1D array data. Therefore, the scalar core 154 may improve the operation processing efficiency by processing the tensor data output from the vector core 153 in specific dimension units. As mentioned above, the scalar core 154 is configured to process various function operations with a floating-point operator. Therefore, if the scalar core 154 is designed to process the same tensor size as the processing core 120, the semiconductor chip size and power consumption of the neural processing unit 100 may increase. However, since the scalar core 154 is designed to process data in a scalar form, the increase in the semiconductor chip size of the neural processing unit 100 may be reduced, power consumption may be reduced, and the bottleneck phenomenon of neural network operations may be reduced by being pipelined with the vector core 153. In some examples, the scalar core 154 may be designed to receive L×1 size tensor data. Here, L may be a power of 2 within a specific range based on the said N. For example, when N is 64, L may be 8, 16, 32, 64, 128, or 256.

In some embodiments, the vector core 153 shown in FIG. 5 and the scalar core 154 shown in FIG. 6 may be modified and implemented as a single integrated 'vector-scalar operation unit' with increased integration by sharing functionally overlapping circuits. This integrated architecture may increase the efficiency of hardware resources by sharing similar-function operation circuits, going beyond simply placing the two units physically adjacent to each other.

Referring again to FIG. 5, the vector core 153 is designed to perform parallel operations on each element of a vector composed of a plurality of data elements (e.g., N). This may be conceptually understood as a structure in which N independent scalar operation lanes are arranged in parallel. On the other hand, the scalar core 154 of FIG. 6 processes single data (1×1 scalar). Therefore, in this embodiment, based on the structural similarity, it may be configured to perform a scalar operation by selectively activating only some lanes of the vector operation circuit according to the control signal of the controller 110.

According to the above configuration, the integrated vector-scalar operation unit may be implemented as a selective resource sharing architecture that shares circuits by having the existing vector operator replace scalar operators with duplicate functions, and separately maintains only scalar operation units with specialized functions such as reduction. This may significantly improve the power, performance, and area (PPA) ratio by reducing the total number of gates and chip area of the special function unit (SFU) 150 while providing all functions equally.

Figure 7:
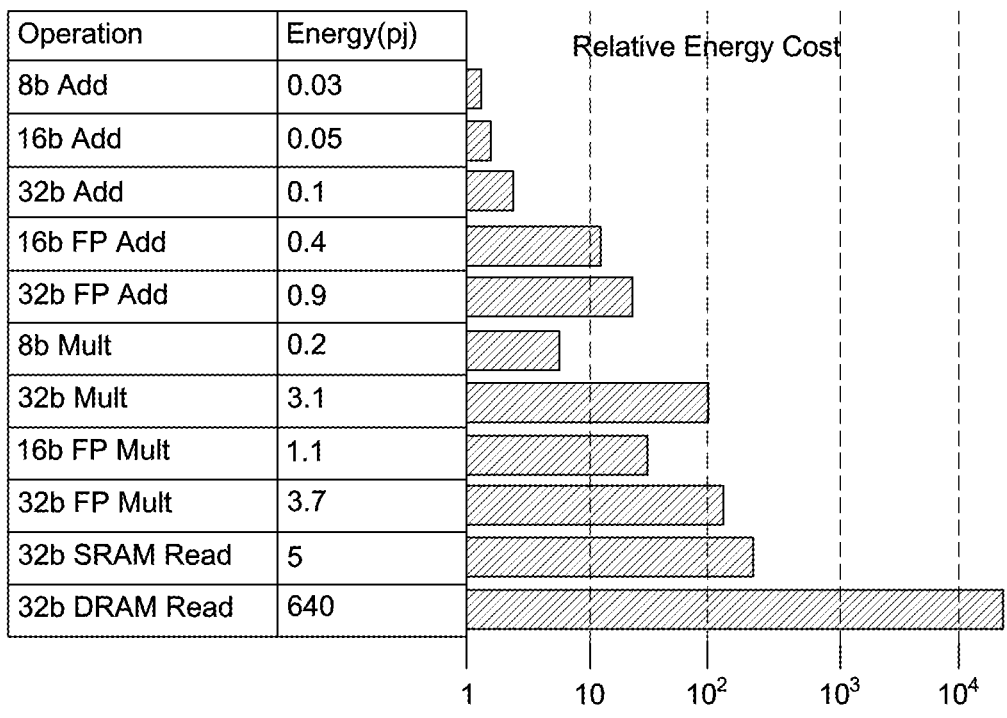
FIG. 7 is a diagram schematically illustrating the energy consumption per unit operation of a neural processing unit, according to embodiments.

FIG. 7 is a diagram schematically illustrating the energy consumption per unit operation of a neural processing unit that may be applied to examples of the present disclosure. Hereinafter, the power consumption of the processing core 120, the vector core 153, and the scalar core 154 of the neural processing unit 100 will be described with reference to FIG. 7.

FIG. 7 schematically illustrates the energy consumed per unit operation of various operators of the neural processing unit 100. For example, energy consumption may be explained by dividing it into addition operations and multiplication operations. However, the energy consumed per unit operation may vary depending on the foundry process technology of the semiconductor chip (e.g., 2 nm technology, 5 nm technology, 7 nm technology, 14 nm technology, 28 nm technology, etc.) or the technical capabilities of a specific foundry company.

The processing core 120 may be designed to operate on integer parameters of a specific bit width. "8b INT Add" in FIG. 7 means an 8-bit integer addition operation of the adder 1212 of the processing element 121. An 8-bit integer addition operation may consume 0.03 pJ of energy. "16b INT Add" means a 16-bit integer addition operation of the adder 1212 of the processing element 121. A 16-bit integer addition operation may consume 0.05 pJ of energy. "32b INT Add" means a 32-bit integer addition operation of the adder 1212 of the processing element 121. A 32-bit integer addition operation may consume 0.1 pJ of energy. "8b INT Mult" means an 8-bit integer multiplication operation of the multiplier 1211 of the processing element 121. An 8-bit integer multiplication operation may consume 0.2 pJ of energy. "32b INT Mult" means a 32-bit integer multiplication operation of the multiplier 1211 of the processing element 121. A 32-bit integer multiplication operation may consume 3.1 pJ of energy.

To elaborate, if the processing core 120 is composed of thousands to tens of thousands of processing elements designed as integer operators, the power consumption of the neural processing unit 100 may be significantly reduced compared to when the processing core is composed of the same number of processing elements designed as floating-point operators. In general, in the case of a generative artificial intelligence model, since most of the operations are processed in the processing core 120, the design of an operator with a specific integer bit width is important for the low-power design of the neural processing unit 100.

The vector core 153 and the scalar core 154 of the special function unit 150 may be designed to operate on floating-point parameters. "16b FP Add" means a 16-bit floating-point addition operation of the adder of the special function unit 150. A 16-bit floating-point addition operation may consume 0.4 pJ of energy. "32b FP Add" means a 32-bit floating-point addition operation of the adder of the special function unit 150. A 32-bit floating-point addition operation may consume 0.9 pJ of energy. "16b FP Mult" means a 16-bit floating-point multiplication operation of the multiplier of the special function unit 150. A 16-bit floating-point multiplication operation may consume 1.1 pJ of energy. "32b FP Mult" means a 32-bit floating-point multiplication operation of the multiplier of the special function unit 150. A 32-bit floating-point multiplication operation may consume 3.7 pJ of energy. To elaborate, if the special function unit 150 is designed with floating-point operators, it is advantageous in terms of the power consumption of the neural processing unit 100 and the miniaturization of the semiconductor chip size to design the number of operators of the special function unit 150 to be relatively smaller than the number of processing elements 121 of the processing core 120. Therefore, the number of floating-point operators of the special function unit 150 may be designed to be smaller than the number of integer operators of the processing core 120.

According to an embodiment, the operational efficiency of the neural processing unit 100 may be improved by implementing a data pipeline circuit design of the processing core 120, the vector core 153, and the scalar core 154 so that the array size of a specific dimension of the tensor data processed by the neural processing unit 100 is compatible with each other among the hardware components.

Figure 8:
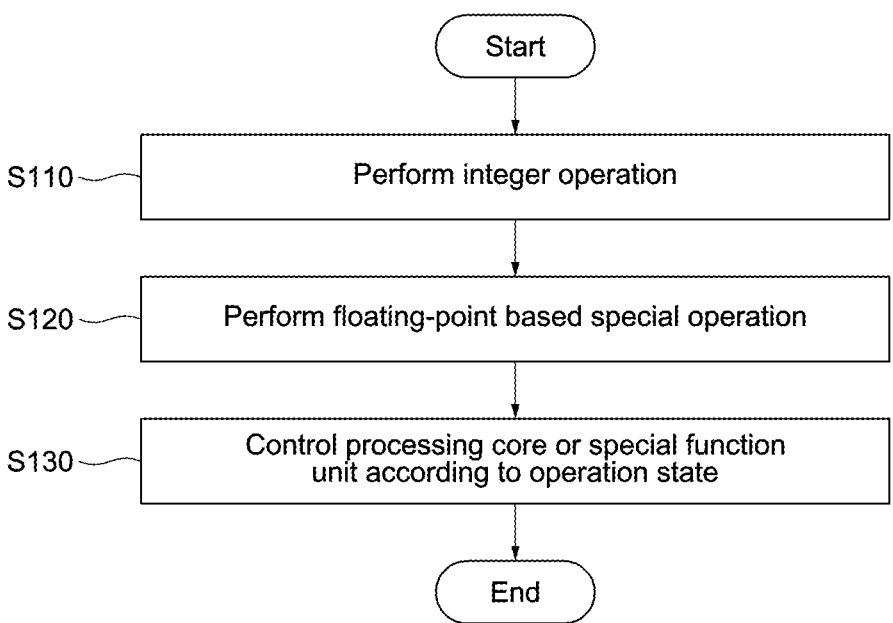
FIG. 8 is a flowchart illustrating a control method of a neural processing unit, according to one embodiment.

FIG. 8 is a flowchart illustrating a control method of a neural processing unit that may be applied to examples of the present disclosure. Referring to FIG. 8, the neural processing unit 100 may perform S110 an integer operation based on input data through the processing core 120 according to an input neural network operation request. The integer operation may include, for example, operations such as vector-matrix multiplication (MatMul) on quantized tensor data, vector accumulation, or integer-based activation functions, which may be performed in parallel in a plurality of processing elements arranged inside the processing core 120 of FIG. 3 described above. This operation is mainly performed in parallel in units of a plurality of processing elements inside the processing core 120, and by processing input data and neural network weights in an integer format (INT8, INT16, etc.), high speed and low power characteristics may be satisfied simultaneously.

Next, the neural processing unit 100 may perform S120 a special operation based on floating-point on the result of the integer operation performed by the processing core 120 in step S110 through the special function unit 150. The special function unit 150 may be configured to perform a nonlinear function approximation operation (e.g., activation function operation (ReLU, GELU, tanh, etc.), normalization, softmax, or other nonlinear function approximation operations) on the integer operation result converted to floating-point.

The special function unit 150 is configured to include a quantization unit 151, a dequantization unit 152, a vector core 153, and a scalar core 154, as shown in FIG. 3, where the dequantization unit 152 dequantizes integer data into a floating-point format such as FP16, BFLOAT, and the thus converted data is input to a nonlinear function operation. In addition, the vector core 153 performs operations such as softmax, normalization, ReLU. GELU, etc., in a high-speed parallel manner, and is suitable for multi-dimensional tensor data. On the other hand, the scalar core 154 is used for conditional branching, precision function approximation, single-value based calculations, etc., and may include an FSM-based control circuit for complex logic processing. These operations are suitable for high-precision calculations or nonlinear activation processing that are difficult to implement with integer-based operations, and contribute to ensuring the accuracy of the overall operation flow.

Next, the neural processing unit 100 may check the operation status of each of the integer operation by step S110 and the special operation by step S120 through the controller 110, and control S130 the operation of the processing core 120 or the special function unit 150 according to the operation status. As shown in FIG. 3, the controller 110 communicates with each module and may control the operating clock of each unit considering the operation load, operation priority, operation condition flags, etc., or readjust the operation order, if necessary. For example, if the input data is all composed of 0s, the corresponding integer operation or floating-point operation may be omitted to perform clock gating or power gating, thereby reducing power consumption. In addition, to reduce resource conflicts or pipeline bottlenecks between operation modules, the operation scheduling may be enhanced based on the decoding information of the execution instruction.

As such, the control flow of FIG. 8 operates in close conjunction with each hardware component of FIG. 3, and is designed with a structure that may increase power efficiency along with improving operation performance.

Figure 9:
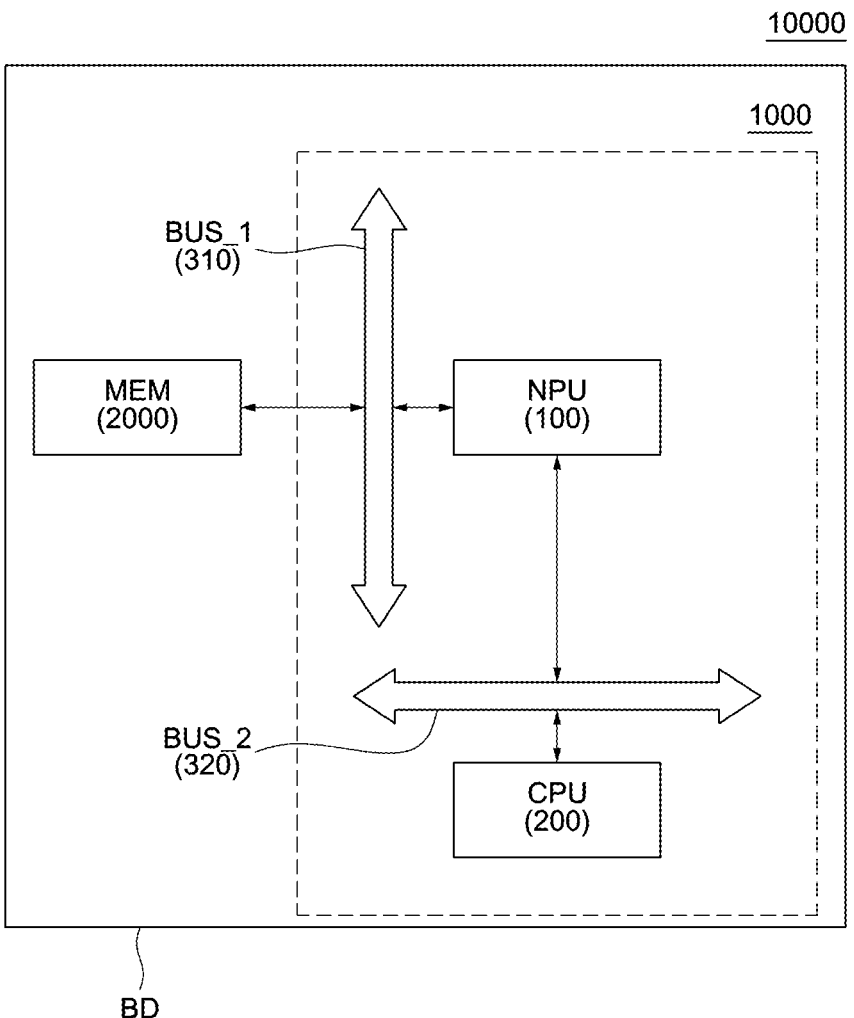
FIG. 9 is a block diagram illustrating a system on chip according to a first embodiment of a first example of the present disclosure.

FIG. 9 is a block diagram illustrating a system on chip according to a first embodiment of a first example of the present disclosure. A device 10000 according to the first embodiment of the first example of the present disclosure will be described with reference to FIG. 9. The device 10000 comprises a circuit board BD, a memory 2000, and a system on chip 1000. The memory 2000 and the system on chip 1000 may be disposed on a circuit board (not shown). The system on chip 1000 is configured to comprise a neural processing unit 100, a central processing unit 200, a first bus (BUS_1) 310, and a second bus (BUS_2) 320. The memory 2000 is configured to be electrically connected to the first bus 310. Each example and each embodiment of the present disclosure may be modified and implemented in combination with other examples and other embodiments of the present disclosure.

The system on chip 1000 refers to a system manufactured on a single semiconductor substrate. The system on chip 1000 may be further configured to include a package (not shown) that protects the semiconductor substrate.

The neural processing unit 100 may be configured to communicate with the memory 2000. A first bus 310 may be provided between the neural processing unit 100 and the memory 2000. For example, the first bus 310 may be an advanced extensible interface (AXI) bus. However, the examples of the present disclosure are not limited thereto. The first bus 310 may be configured to support a read and write address/control interface for the memory 2000 and the neural processing unit 100. The first bus 310 may be configured as an independent data communication channel to support high-speed data transmission through transaction processing other than memory control commands. The first bus 310 may be configured as a dedicated bus for transmitting input parameters, output parameters, and weight parameters of a neural network model, and it is desirable to appropriately design the bandwidth of the first bus 310 considering the parameter size of the neural network models to be processed.

The neural processing unit 100 may be configured to communicate with the central processing unit 200. A second bus 320 may be provided between the neural processing unit 100 and the central processing unit 200. For example, the second bus 320 may be an advanced high-performance bus (AHB). However, the examples of the present disclosure are not limited thereto. The second bus 320 may be provided for efficient communication between the neural processing unit 100, the central processing unit 200, and peripheral devices of the system on chip 1000. The second bus 320 may provide a master-slave architecture to improve data throughput. The second bus 320 may be configured to support burst transmission and pipeline operation tasks of the system on chip 1000. The second bus 320 may be configured to provide an on-the-fly function. The second bus 320 may be configured to allow a master of the second bus 320 to execute a new command on-the-fly without waiting while the central processing unit 200 or the neural processing unit 100 is reading or writing data in real time. Therefore, the real-time data processing of the neural processing unit 100 may be improved, and at least one core of the neural processing unit 100 may be configured to use the bus independently. Therefore, the second bus 320 may support the system on chip 1000 to perform various commands in real time.

To elaborate, the first bus 310 provides a higher memory bandwidth than the second bus 320, and the second bus 320 provides an on-the-fly function, thereby allowing the central processing unit 200 to dynamically control the neural processing unit 100. Accordingly, the system on chip 1000 may dynamically process various input queries for a generative neural network model.

The neural processing unit 100 is described above with reference to FIG. 3 to FIG. 7. Accordingly, a duplicate description of the neural processing unit 100 is omitted herein for the sake of brevity.

The central processing unit 200 may be configured to control the neural processing unit 100 based on the execution code of an artificial intelligence model. The execution code may be generated by a compiler (not shown). The central processing unit 200 may control the neural processing unit 100 by directly setting the register values of each circuit of the neural processing unit 100 based on the execution code. The execution code may include each register value. In addition, the central processing unit 200 may off-load and process operations that are not processed by the neural processing unit 100. In this case, the neural network model may be compiled to off-load a specific operation of the neural network model to the central processing unit 200, and an execution code may be obtained.

The memory 2000 may include a main memory located outside the system on chip 1000, but is not limited thereto. The memory 2000 may be electrically connected to the system on chip 1000 through the first bus 310. The memory 2000 of the device 10000 according to the first embodiment of the first example of the present disclosure may include at least one memory such as SRAM, LPDDR RAM, Resistive RAM, Magneto-resistive RAM, Phase-change RAM, Ferroelectric RAM, Flash Memory, HBM, etc. The memory 2000 may be composed of at least one memory unit (e.g., a bank, etc.). The memory 2000 may be composed of a single (homogeneous) memory or a heterogeneous memory. It is desirable that the capacity of the memory 2000 is larger than the total size of the weight parameters of the neural network model. In this case, all of the weight parameters of the neural network model may be loaded and reside in the memory 2000 at the same time. If the storage capacity of the memory 2000 is insufficient, only a part of the weight parameters may be loaded, which may make it difficult to quickly process the inference operation of the neural network model in real time. For example, the capacity of the memory 2000 may be one of 4 GBytes and 8 GBytes. That is, the capacity of the memory 2000 may be from 4 GBytes to 8 GBytes, and may be determined considering the parameter size of the neural network model to be driven in the system on chip 1000.

That is, the main memory 2000 may be provided as a dedicated memory for the neural processing unit 100, and may be configured to sufficiently store and access at high speed all essential data, including not only the entire learned weights of the neural network model but also key activation values generated during the inference operation process and used in the next operation. Whereas in the past, for large-scale models, a part of the weights or activation values had to rely on external slow memory or a server, the present disclosure may reduce data movement bottlenecks and may eliminate external dependencies by having all operation data reside within the on-device main memory. This lays the foundation for completing and performing the entire inference process of a neural network model on the device itself without data exchange with an external server (server-independent operation), which provides great advantages in terms of real-time responsiveness and data privacy. This memory structure supports the neural processing unit 100 to stably process complex models without delay. As a result, a true on-device AI environment may be implemented.

The bandwidth of the first bus 310 may be determined according to the processing performance of the neural processing unit 100 (e.g., the Tera Operations Per Second (TOPS) of the neural processing unit 100). For example, a memory bandwidth of 2 GB/s to 4 GB/s per 1 TOPS may be used for the memory 2000. For example, a 10 TOPS neural processing unit 100 may be configured with a memory 2000 to provide a bus bandwidth of 20 GB/s to 40 GB/s. The bandwidth of the first bus 310 may be determined according to the operating frequency of the memory 2000 and the number of communication channels. For example, to configure a memory bandwidth of 40 GB/s with LPDDR5, the following formula may be used.

$$\text{Memory Bandwidth (GB/s)} = (\text{Data Rate (Gbps per pin)} \times \text{Bus Width (bits)} \times \text{Number of Channels} \div 8) \quad \text{Equation 5}$$

To elaborate. LPDDR5 generally supports a data rate of up to 6400 Mbps per pin. The bus width of an LPDDR channel is generally 16 bits (2 bytes). However, the number of channels cannot be a decimal point and is an integer. However, the examples of the present disclosure are not limited to the bandwidth of the first bus 310.

The device 10000 according to the first embodiment of the first example of the present disclosure may be configured to provide a low-power function for use on-device.

The low-power mode of the device 10000 according to the first embodiment of the first example of the present disclosure may be provided with, for example, a sleep mode, a deep sleep mode, a retention mode, etc. In some examples, the low-power mode may be referred to as a standby mode, a hibernation mode, an idle mode, etc.

The sleep mode may be implemented, for example, by applying clock gating to at least one of the processing core 120, the vector core 153, and the scalar core 154 of the neural processing unit 100. The deep sleep mode may be implemented, for example, by applying power gating to at least one of the processing core 120, the vector core 153, the scalar core 154 of the neural processing unit 100, or the memory 2000.

The retention mode may be implemented by supplying a minimum retention voltage to the controller 110 of the neural processing unit 100 or the memory 2000. For example, the neural processing unit 100 of the device 10000 according to the first embodiment of the first example of the present disclosure may be configured to provide at least one of a power gating function, a clock gating function, and a register retention function. To elaborate, when the device 10000 enters sleep mode, the neural processing unit 100 may activate the clock gating function. When the device 10000 enters deep sleep mode, the neural processing unit 100 may activate the power gating function. When the device 10000 enters retention mode, the supply voltage input to the neural processing unit 100 may be reduced or the operating frequency may be reduced.

For example, the memory MEM of the device 10000 according to the first embodiment of the first example of the present disclosure may provide at least one of a deep sleep function, a retention function, and a maintain parameters function. To elaborate, when the device 10000 enters deep sleep mode, the memory 2000 may be power-gated, and in the case of a volatile memory device, data may be lost. When the device 10000 enters retention mode, the supply voltage input to the memory 2000 may be reduced or the operating frequency may be reduced, and in the case of a volatile memory device, data may be maintained. When the device 10000 enters a maintain parameters mode, the supply voltage input to the memory 2000 may be reduced or the operating frequency may be reduced, and in the case of DRAM, the refresh period of the memory cells may be increased, so that data may be maintained in the case of a volatile memory device.

The low-power mode may be activated when an input query for speculative decoding is not input to the device

10000 for a certain period of time or more. The certain period of time may be provided based on, for example, a timer, a counter value, etc. The low-power mode may be activated based on a specific threshold time, and may be deactivated when an input query processed by speculative decoding is input to the device 10000. The state in which the low-power mode is deactivated may be referred to as a wake-up state.

The device 10000 according to the first embodiment of the first example of the present disclosure may be a device operable in a battery environment. Therefore, the neural processing unit 100 may be designed to be operable with a battery voltage.

The device 10000 according to the first embodiment of the first example of the present disclosure may be configured to provide at least one low-power mode and simultaneously provide speculative decoding in an on-device environment. The device 10000 may enter a low-power mode based on a preset condition, and accordingly, the power consumption of the device 10000 may be reduced.

The system on chip 1000 according to the first embodiment of the first example of the present disclosure has the effect of being able to rapidly accelerate the inference operation of a generative neural network model with low power by the pipeline circuit structure of the processing core 120, the vector core 153, and the scalar core 154.

Figure 10:
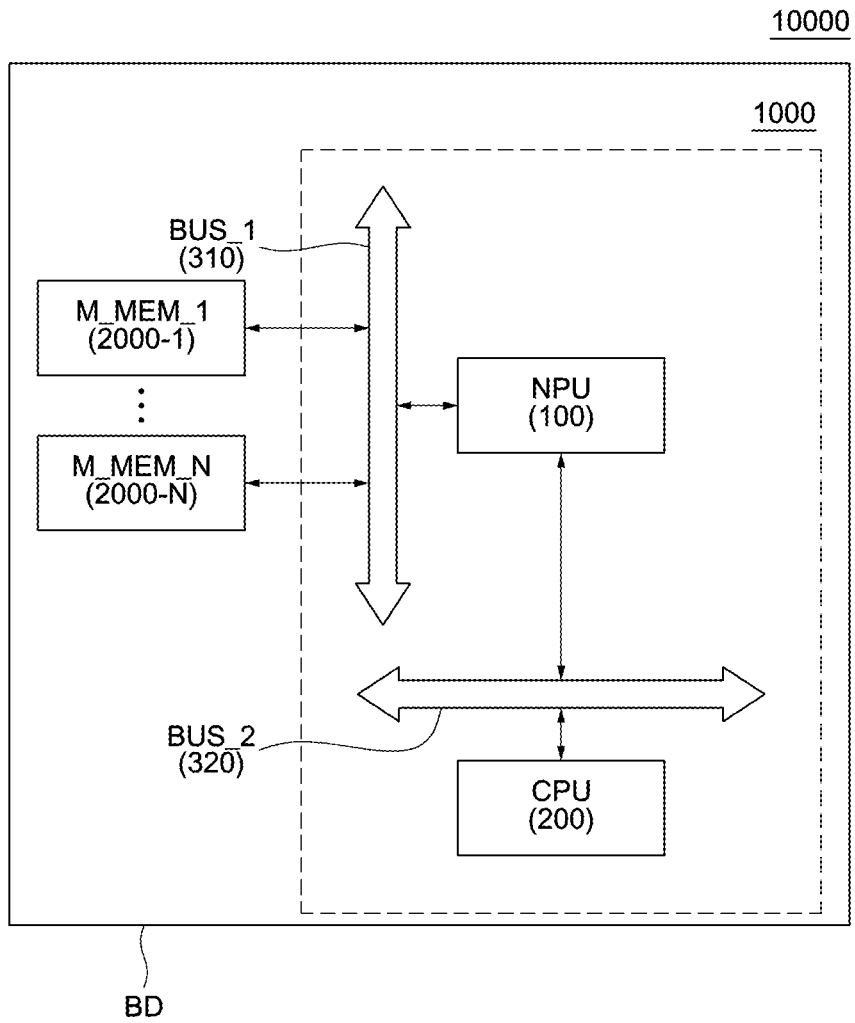
FIG. 10 is a block diagram illustrating a system on chip according to a second embodiment of the first example of the present disclosure.

FIG. 10 is a block diagram illustrating a system on chip according to a second embodiment of the first example of the present disclosure. A device 10000 according to the second embodiment of the first example of the present disclosure will be described with reference to FIG. 10. The device 10000 comprises a circuit board BD, a plurality of main memories (M_MEM_1, . . . , M_MEM_N) 2000-1, . . . , 2000-N, and a system on chip 1000. In describing the device 10000 according to the second embodiment of the first example of the present disclosure, overlapping descriptions with those explained above with reference to FIG. 3 to FIG. 9 may be omitted for brevity. Each example and each embodiment of the present disclosure may be modified and implemented in combination with other examples and other embodiments of the present disclosure.

The system on chip 1000 according to the second embodiment of the first example of the present disclosure is configured to comprise a neural processing unit 100, a central processing unit 200, a first bus 310, and a second bus 320. The plurality of main memories 2000-1, . . . , 2000-N are configured to be electrically connected to the first bus 310. The plurality of main memories 2000-1, . . . , 2000-N are configured to comprise a plurality of semiconductor chips.

A first bus 310 may be provided between the neural processing unit 100 and the plurality of main memories 2000-1, . . . , 2000-N. A second bus 320 may be provided between the neural processing unit 100 and the central processing unit 200.

Since the operation of the neural processing unit 100 has been described above with reference to FIG. 3 to FIG. 9, a detailed description of the operation of the neural processing unit 100 may be omitted. Since the operation of the central processing unit 200 has been described above with reference to FIG. 9, a detailed description of the operation of the central processing unit 200 may be omitted.

The plurality of main memories 2000-1, . . . , 2000-N may be configured as a plurality of memories disposed outside the system on chip 1000. However, the present disclosure is not limited thereto. The plurality of main memories 2000-1, . . . , 2000-N may each be electrically connected to the system on chip 1000 through the first bus 310. Each of the plurality of main memories 2000-1, . . . , 2000-N of the device 10000 according to the second embodiment of the first example of the present disclosure may include SRAM, LPDDR RAM, resistive RAM, magneto-resistive RAM, phase-change RAM, ferroelectric RAM, flash memory, or HBM, etc. The plurality of main memories 2000-1, . . . , 2000-N may be configured as a single (homogeneous) memory or a heterogeneous memory.

It is desirable that the total capacity of the plurality of main memories 2000-1, . . . , 2000-N is larger than the total capacity occupied by the weight parameters of the artificial intelligence model. In this case, the weight parameters of the neural network model may be loaded and reside on the plurality of main memories 2000-1, . . . , 2000-N at once. If the storage capacity of the plurality of main memories 2000-1, . . . , 2000-N is insufficient, it may be difficult to quickly process the inference operation of the neural network model in real time. For example, the total capacity of the plurality of main memories 2000-1, . . . , 2000-N may be one of 8 GBytes, 16 GBytes, 32 GBytes, 64 GBytes, and 128 GBytes. That is, the total capacity of the plurality of main memories 2000-1, . . . , 2000-N may be from 8 GBytes to 128 GBytes, and may be determined considering the parameter size of at least one artificial intelligence model to be driven in the system on chip 1000. Therefore, by placing a plurality of main memories for loading and storing the parameters of the artificial intelligence model outside the system on chip 1000, the device 10000 may easily increase the capacity of the main memory while reducing the manufacturing cost of the system on chip 1000. If a plurality of main memories are placed inside a package that protects the system on chip 1000, the size of the package may increase, leading to an increase in manufacturing cost, but it may satisfy the criteria of a specific form factor (e.g., M.2 2230, M.2 2242).

The bandwidth of the first bus 310 may be determined according to the processing performance of the neural processing unit 100 (e.g., the Tera Operations Per Second (TOPS) of the neural processing unit 100). For example, for a 30 TOPS neural processing unit 100, the plurality of main memories 2000-1, . . . , 2000-N may be configured to provide a bus bandwidth of 60 GB/s to 120 GB/s. The bandwidth of the first bus 310 may be determined according to the operating frequency of the plurality of main memories 2000-1, . . . , 2000-N and the number of communication channels. However, the examples of the present disclosure are not limited to the bandwidth of the first bus 310.

The device 10000 according to the second embodiment of the first example of the present disclosure provides a plurality of main memories 2000-1, . . . , 2000-N, and the total capacity of the main memories may be a capacity capable of storing all parameters of at least one neural network model at once. In addition, according to the configuration of the second embodiment of the first example, the memory capacity may be expanded to correspond to the size of a generative neural network model with a considerable size of weight parameters. Therefore, the system on chip 1000 may process the neural network model quickly in real time. To elaborate, the plurality of main memories 2000-1, . . . , 2000-N of the device 10000 according to the embodiments of the present disclosure are configured as a dedicated memory for the system on chip 1000. If not all parameters of the artificial intelligence model processed by the neural processing unit 100 are stored in the plurality of main memories 2000-1, . . . , 2000-N, especially if all weight parameters and attention scores cannot be stored in the plurality of main memories 2000-1, . . . , 2000-N, the parameters must be stored in a separate storage device, which causes a decrease in operation speed due to large-capacity memory operations.

Figure 11:
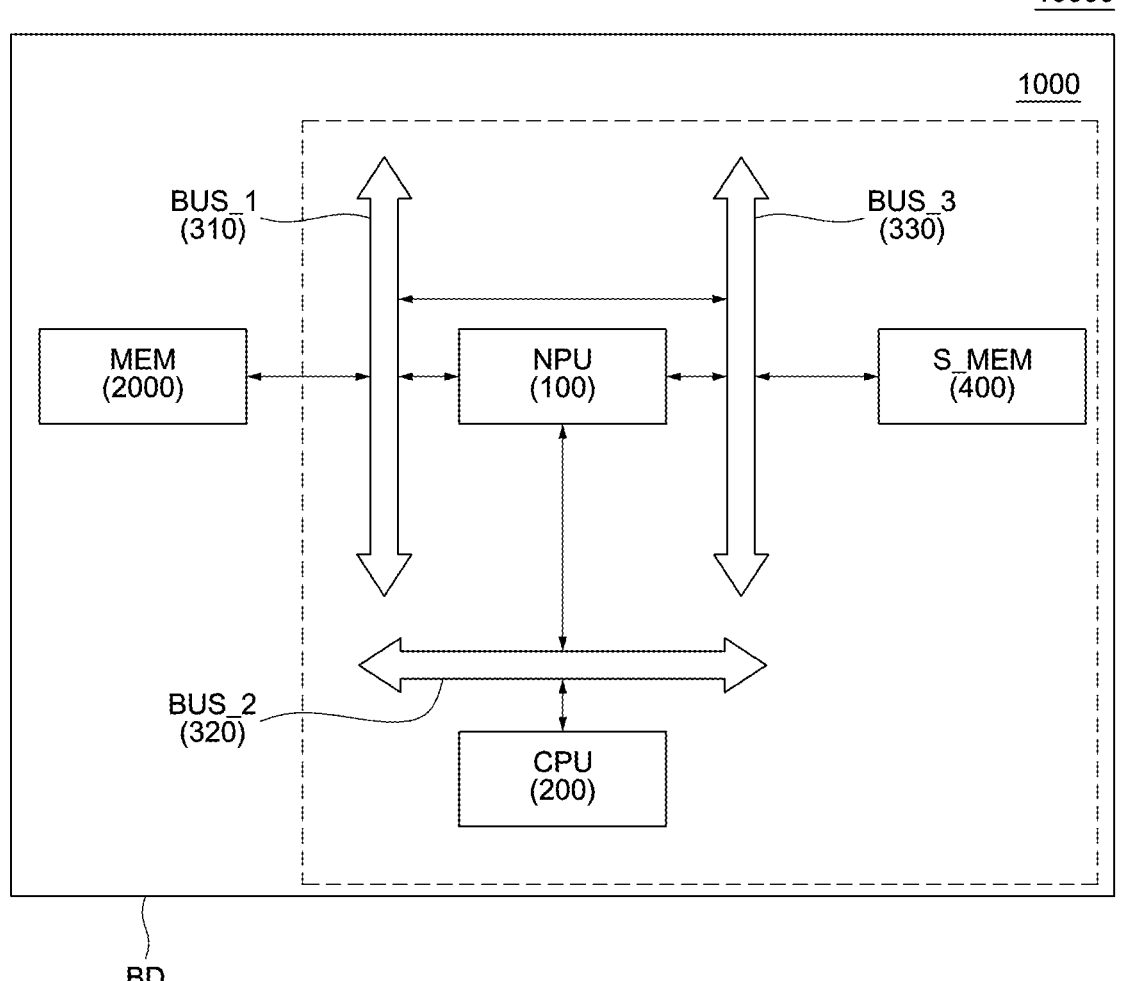
FIG. 11 is a block diagram illustrating a system on chip according to a third embodiment of the first example of the present disclosure.

FIG. 11 is a block diagram illustrating a system on chip according to a third embodiment of the first example of the present disclosure. A device 10000 according to the third embodiment of the first example of the present disclosure will be described with reference to FIG. 11. The device 10000 comprises a circuit board BD, a main memory 2000, and a system on chip 1000. In describing the system on chip 1000 according to the third embodiment of the first example of the present disclosure, overlapping descriptions with those explained with reference to FIG. 3 to FIG. 10 may be omitted for convenience of explanation. Each example and each embodiment of the present disclosure may be modified and implemented in combination with other examples and other embodiments of the present disclosure.

The system on chip 1000 according to the third embodiment of the first example of the present disclosure is configured to comprise a neural processing unit 100, a central processing unit 200, a first bus 310, a second bus 320, a third bus 330, and a shared memory (S_MEM) 400. The shared memory 400 is configured as an on-chip memory of the system on chip 1000. The main memory 2000 is configured to be electrically connected to the first bus 310. The main memory 2000 is configured to comprise at least one semiconductor chip. The shared memory 400 is configured to be electrically connected to the third bus 330.

A first bus 310 may be located between the neural processing unit 100 and the main memory 2000. A second bus 320 may be located between the neural processing unit 100 and the central processing unit 200. A third bus 330 may be located between the neural processing unit 100 and the shared memory 400. For example, the third bus 330 may be an advanced extensible interface (AXI) bus. However, the examples of the present disclosure are not limited thereto. The third bus 330 may be configured to support a read and write address/control interface for the shared memory 400 and the neural processing unit 100. The third bus 330 may be configured as an independent data communication channel to support high-speed data transmission through transaction processing other than memory control commands. The third bus 330 may be configured as a dedicated bus for transmitting input parameters, output parameters, and weight parameters of a neural network model. Here, the first bus 310 and the third bus 330 are configured to be electrically connected. Accordingly, the shared memory 400 and the main memory 2000 may transmit tensor data through the first bus 310 and the third bus 330.

Since the operation of the neural processing unit 100 has been described above with reference to FIG. 3 to FIG. 10, a detailed description may be omitted. Since the operation of the central processing unit 200 has been described above with reference to FIG. 9 to FIG. 10, a detailed description may be omitted.

The main memory 2000 may be configured as at least one memory disposed outside the system on chip 1000. The main memory 2000 may be configured as a single (homogeneous) memory or a heterogeneous memory. The capacity of the main memory 2000 may be determined considering the parameter size of at least one neural network model to be driven in the system on chip 1000. The bandwidth of the first bus 310 may be determined based on the processing performance of the neural processing unit 100.

The shared memory 400 may be configured as at least one memory disposed inside the system on chip 1000. The shared memory 400 of the system on chip 1000 according to the third embodiment of the first example of the present disclosure may include at least one memory such as SRAM, LPDDR RAM, Resistive RAM, Magneto-resistive RAM, Phase-change RAM, Ferroelectric RAM, Flash Memory, HBM, etc. The shared memory 400 may be configured as a single (homogeneous) memory or a heterogeneous memory. As a representative embodiment, the shared memory 400 may be implemented with SRAM. The capacity of the shared memory 400 is designed to be smaller than the capacity of the main memory 2000. If the capacity of the shared memory 400 increases, the semiconductor manufacturing cost may increase rapidly. Therefore, the capacity of the shared memory 400 may be configured from 4 MBytes to 128 MBytes. Preferably, the capacity of the shared memory 400 may be configured from 16 MBytes to 64 MBytes. The capacity of the shared memory 400 may be larger than the capacity of the internal memory 140 of the neural processing unit 100.

The operation of the shared memory 400 and the main memory 2000 will be described with reference to FIG. 7. "32b S_MEM Read" in FIG. 9 means a 32-bit data read operation of the main memory 2000. Here, the main memory 2000 may be LPDDR RAM. In this case, a 32-bit data read operation of the main memory 2000 may consume 640 pJ of energy. "32b S_MEM Read" in FIG. 9 means a 32-bit data read operation of the shared memory 400. Here, the shared memory 400 may be SRAM. In this case, a 32-bit data read operation of the shared memory 400 may consume 5 pJ of energy. That is, when the neural processing unit 100 uses the shared memory 400 implemented with SRAM, the energy consumption of the device 10000 can be significantly reduced compared to the case of using only the main memory 2000. However, since the manufacturing cost of the shared memory 400 is high, it is difficult to implement it with a large capacity. Therefore, when the compiler (not shown) generates the execution code of the neural network model to be processed by the system on chip 1000, it can set reusable input parameters, output parameters, and weight parameters to be preferentially stored in the shared memory 400 rather than the main memory 2000. That is, the compiler (not shown) can provide a function of determining reusable parameters during a series of neural network model operations and storing them in the shared memory 400 for reuse.

The system on chip 1000 according to the third embodiment of the first example of the present disclosure provides a shared memory 400, and by executing an execution code set to store reusable parameters in the shared memory 400, the power consumption of the system on chip 1000 can be reduced.

Figure 12:
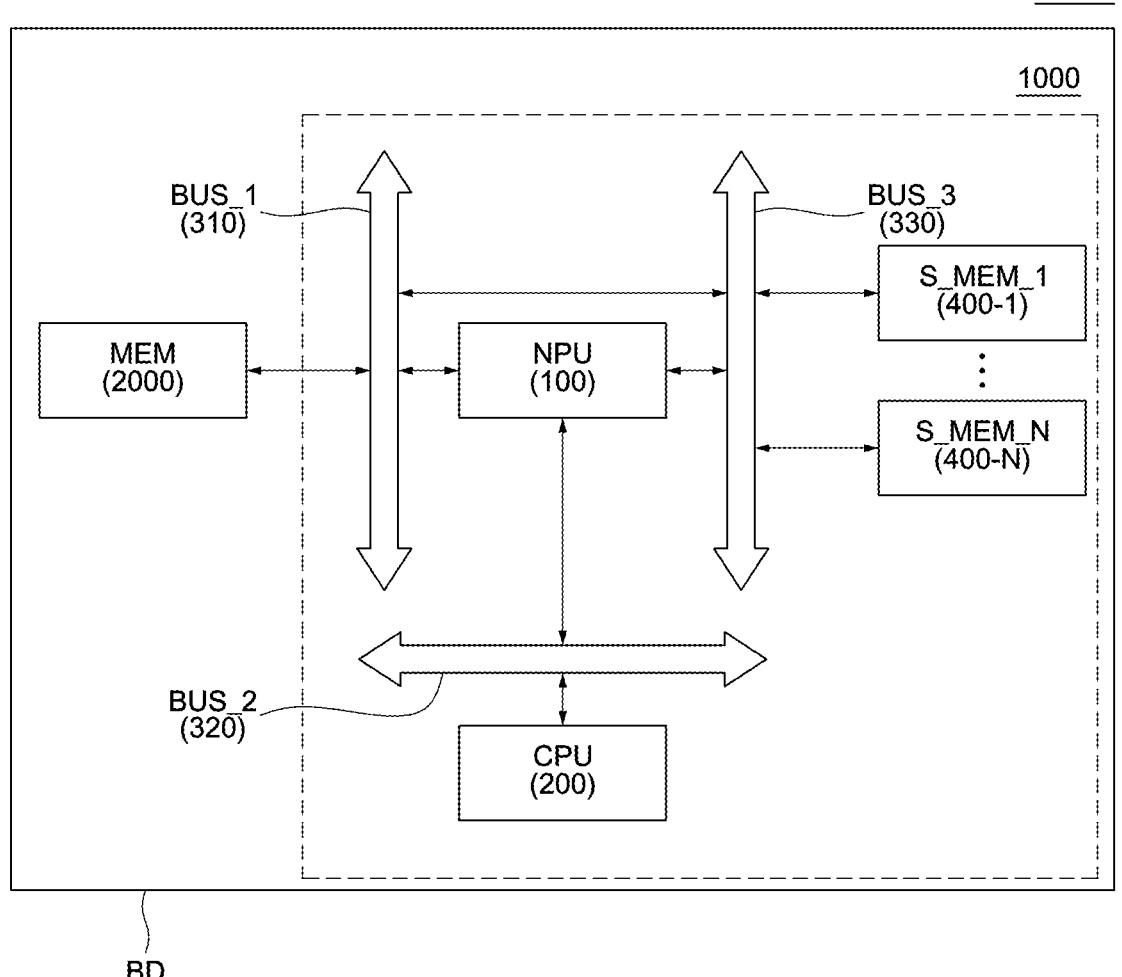
FIG. 12 is a block diagram illustrating a system on chip according to a fourth embodiment of the first example of the present disclosure.

FIG. 12 is a block diagram illustrating a system on chip according to a fourth embodiment of the first example of the present disclosure. A device 10000 according to the fourth embodiment of the first example of the present disclosure will be described with reference to FIG. 12. The device 10000 comprises a circuit board BD, a main memory 2000, and a system on chip 1000. In describing the system on chip 1000 according to the fourth embodiment of the first example of the present disclosure, overlapping descriptions with those in FIG. 3 to FIG. 11 may be omitted for convenience of explanation. Each example and each embodiment of the present disclosure may be modified and implemented in combination with other examples and other embodiments of the present disclosure.

The system on chip 1000 according to the fourth embodiment of the first example of the present disclosure is configured to comprise a neural processing unit 100, a central processing unit 200, a first bus 310, a second bus 320, a third bus 330, and a plurality of shared memories 400-1, . . . , 400-N. The plurality of shared memories 400-1, . . . , 400-N are configured as on-chip memories of the system on chip 1000. The main memory 2000 is configured to be electrically connected to the first bus 310. The main memory 2000 is configured to comprise at least one semiconductor chip. The plurality of shared memories 400-1, . . . , 400-N are configured to be electrically connected to the third bus 330.

A first bus 310 may be located between the neural processing unit 100 and the main memory 2000. A second bus 320 may be located between the neural processing unit 100 and the central processing unit 200. A third bus 330 may be located between the neural processing unit 100 and the plurality of shared memories 400-1, . . . , 400-N. Here, the first bus 310 and the third bus 330 are configured to be electrically connected.

Since the operation of the neural processing unit 100 has been described with reference to FIG. 3 to FIG. 11, a duplicate description of the operation of the neural processing unit 100 may be omitted. Since the operation of the central processing unit 200 has been described with reference to FIG. 9 to FIG. 11, a duplicate description of the central processing unit 200 may be omitted.

The main memory 2000 may be configured as at least one memory disposed outside the system on chip 1000. The main memory 2000 may be configured as a single (homogeneous) memory or a heterogeneous memory. The capacity of the main memory 2000 may be determined considering the parameter size of at least one neural network model to be driven in the system on chip 1000. The bandwidth of the first bus 310 may be determined according to the processing performance of the neural processing unit 100.

The plurality of shared memories 400-1, . . . , 400-N may be configured as a plurality of memories disposed inside the system on chip 1000. Each shared memory may be configured to operate independently of each other. The plurality of shared memories 400-1, . . . , 400-N of the system on chip 1000 according to the fourth embodiment of the first example of the present disclosure may include at least one memory such as SRAM, LPDDR RAM, Resistive RAM, Magneto-resistive RAM, Phase-change RAM, Ferroelectric RAM, Flash Memory, HBM, etc. The plurality of shared memories 400-1, . . . , 400-N may be configured as a single (homogeneous) memory or a heterogeneous memory. Here, an example in which the plurality of shared memories 400-1, . . . , 400-N are implemented with SRAM is described. The capacity of the plurality of shared memories 400-1, . . . , 400-N is designed to be smaller than the capacity of the main memory 2000. If the capacity of the plurality of shared memories 400-1, . . . , 400-N increases, the semiconductor manufacturing cost may increase rapidly. Therefore, the total capacity of the plurality of shared memories 400-1, . . . , 400-N may be configured from 4 MBytes to 128 MBytes. Preferably, the total capacity of the plurality of shared memories 400-1, . . . , 400-N may be configured from 16 MBytes to 64 MBytes. The capacity of the plurality of shared memories 400-1, . . . , 400-N may be configured to be larger than the capacity of the internal memory 140 of the neural processing unit 100.

When the neural processing unit 100 uses the plurality of shared memories 400-1, . . . , 400-N implemented with SRAM, the energy consumption of the device 10000 can be significantly reduced compared to the case of using only the main memory 2000. Therefore, when the compiler (not shown) generates the execution code of the neural network model to be processed by the system on chip 1000, it can set a data reuse command to preferentially store reusable input parameters, output parameters, and weight parameters in the plurality of shared memories 400-1, . . . , 400-N located inside the system on chip 1000 rather than the main memory 2000.

The system on chip 1000 according to the fourth embodiment of the first example of the present disclosure provides a plurality of shared memories 400-1, . . . , 400-N, and by executing an execution code set to preferentially store reusable parameters in the plurality of shared memories 400-1, . . . , 400-N, the power consumption of the system on chip 1000 can be reduced. In addition, by providing a plurality of independent shared memories for their respective domains (e.g., weight domain, attention score domain, etc.), the memory operation of each domain of the neural network model's parameters (e.g., weights, input parameters, output parameters) can be easily processed.

The system on chip 1000 according to the fourth embodiment of the first example of the present disclosure provides a plurality of shared memories 400-1, . . . , 400-N. and by executing an execution code set to preferentially store reusable parameters in the plurality of shared memories 400-1, . . . , 400-N, the power consumption of the system on chip 1000 can be reduced. In addition, by providing a plurality of independent shared memories, the memory operation of each domain of the neural network model's parameters (e.g., weights, input parameters, output parameters) can be easily processed.

Figure 13:
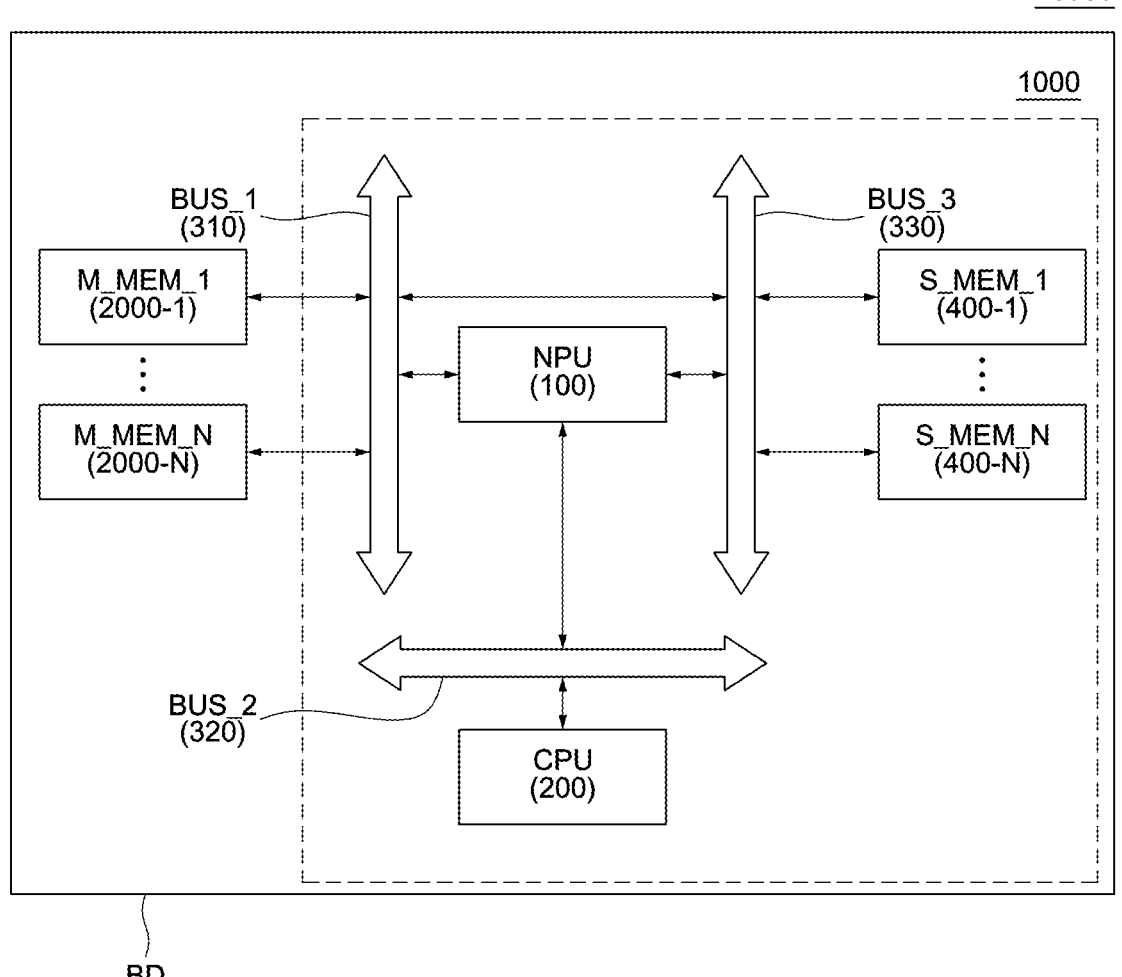
FIG. 13 is a block diagram illustrating a system on chip according to a fifth embodiment of the first example of the present disclosure.

FIG. 13 is a block diagram illustrating a system on chip according to a fifth embodiment of the first example of the present disclosure. A device 10000 according to the fifth embodiment of the first example of the present disclosure will be described with reference to FIG. 13. The device 10000 comprises a circuit board BD, a plurality of main memories 2000-1, . . . , 2000-N, and a system on chip 1000. In describing the system on chip 1000 according to the fifth embodiment of the first example of the present disclosure, overlapping descriptions with those in FIG. 3 to FIG. 12 may be omitted for convenience of explanation. Each example and each embodiment of the present disclosure may be modified and implemented in combination with other examples and other embodiments of the present disclosure.

The system on chip 1000 according to the fifth embodiment of the first example of the present disclosure is configured to comprise a neural processing unit 100, a central processing unit 200, a first bus 310, a second bus 320, a third bus 330, and a plurality of shared memories 400-1, . . . , 400-N. The plurality of shared memories 400-1, . . . , 400-N are configured as on-chip memories of the system on chip 1000. The plurality of main memories 2000-1, . . . , 2000-N are configured to be electrically connected to the first bus 310. The plurality of main memories 2000-1, . . . , 2000-N are configured to comprise at least one semiconductor chip. The plurality of shared memories 400-1, . . . , 400-N are configured to be electrically connected to the third bus 330.

A first bus 310 may be provided between the neural processing unit 100 and the plurality of main memories 2000-1, . . . , 2000-N. A second bus 320 may be provided between the neural processing unit 100 and the central processing unit 200. A third bus 330 may be provided between the neural processing unit 100 and the plurality of shared memories 400-1, . . . , 400-N. Here, the first bus 310 and the third bus 330 are configured to be electrically connected.

A description of the neural processing unit 100 refers to FIG. 3 to FIG. 12. Accordingly, a duplicate description of the neural processing unit 100 may be omitted. A description of the central processing unit 200 refers to FIG. 9 to FIG. 12. Accordingly, a duplicate description of the central processing unit 200 may be omitted. A description regarding the plurality of main memories 2000-1, . . . , 2000-N refers to FIG. 10. Accordingly, a duplicate description of the plurality of main memories 2000-1, . . . , 2000-N may be omitted. A description regarding the plurality of shared memories 400-1, . . . , 400-N refers to FIG. 12. Accordingly, a duplicate description of the plurality of shared memories 400-1, . . . , 400-N may be omitted.

The plurality of main memories 2000-1, . . . , 2000-N may be configured as a plurality of memories disposed outside the system on chip 1000. The total capacity of the plurality of main memories 2000-1, . . . , 2000-N may be determined considering the parameter size of at least one neural network model to be driven in the system on chip 1000. The total capacity of the plurality of main memories 2000-1, . . . , 2000-N may be configured to be larger than the total capacity of the plurality of shared memories 400-1, . . . , 400-N. Therefore, by providing a plurality of main memories outside the system on chip 1000, the manufacturing cost of the system on chip 1000 can be reduced.

The plurality of shared memories 400-1, . . . , 400-N may be configured as a plurality of memories disposed inside the system on chip 1000. The total capacity of the plurality of shared memories 400-1, . . . , 400-N may be configured to be larger than the capacity of the internal memory 140 of the neural processing unit 100. Therefore, by placing reusable parameters in the plurality of shared memories 400-1, . . . , 400-N, the data read from or transmitted to the plurality of main memories 2000-1, . . . , 2000-N can be reduced, thereby reducing the power consumption of the device 10000.

A compiler (not shown) may, when generating the execution code of a neural network model to be processed by the system on chip 1000, set reusable input parameters, output parameters, and weight parameters to be preferentially stored in the plurality of shared memories 400-1, . . . , 400-N rather than the plurality of main memories 2000-1, . . . , 2000-N.

The device 10000 according to the fifth embodiment of the first example of the present disclosure, by combining the features of the second embodiment and the fourth embodiment of the first example of the present disclosure, can support a generative neural network model with a large number of parameters and improve data reuse with an expandable main memory and an expandable shared memory.

Figure 14:
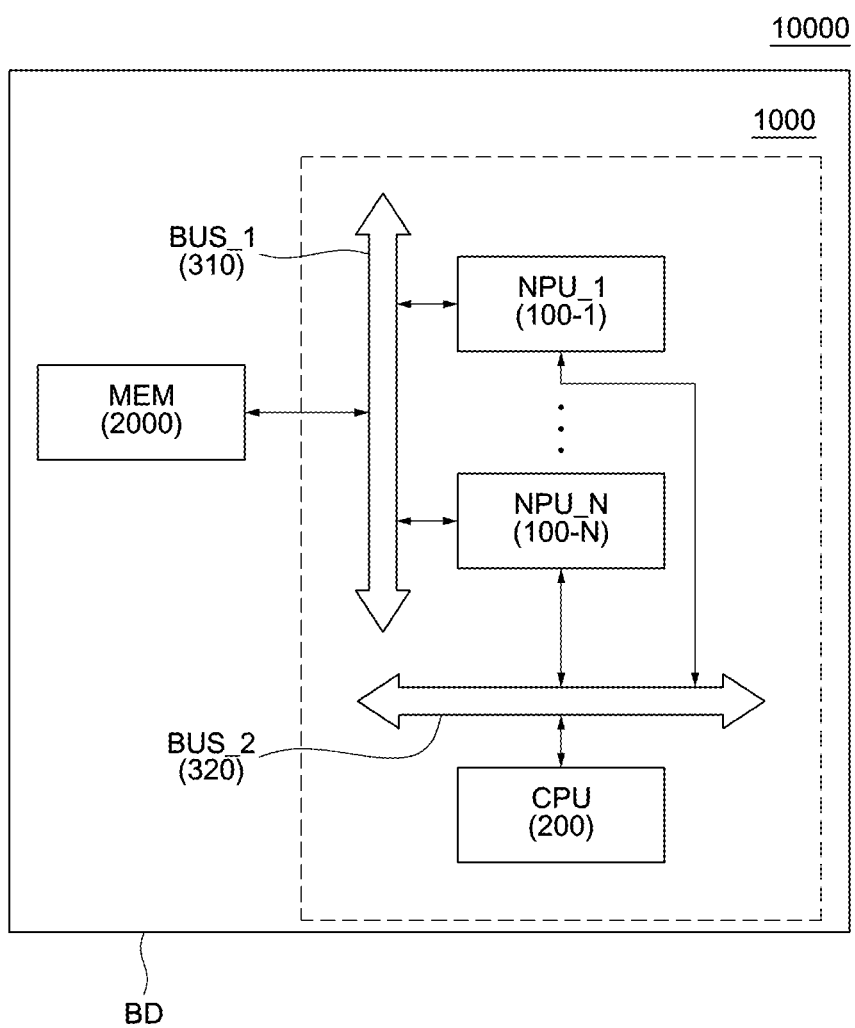
FIG. 14 is a block diagram illustrating a system on chip according to a sixth embodiment of the first example of the present disclosure.

FIG. 14 is a block diagram illustrating a system on chip according to a sixth embodiment of the first example of the present disclosure. A device 10000 according to the sixth embodiment of the first example of the present disclosure will be described with reference to FIG. 14. The device 10000 comprises a circuit board BD, a memory 2000, and a system on chip 1000. In describing the system on chip 1000 according to the sixth embodiment of the first example of the present disclosure, overlapping descriptions with those in FIG. 3 to FIG. 13 are omitted herein for the sake of brevity. Each example and each embodiment of the present disclosure may be modified and implemented in combination with other examples and other embodiments of the present disclosure.

The system on chip 1000 according to the sixth embodiment of the first example of the present disclosure is configured to comprise a plurality of neural processing units (NPU_1, . . . , NPU_N) 100-1, . . . , 100-N, a central processing unit 200, a first bus 310, and a second bus 320. The memory 2000 is configured to be electrically connected to the first bus 310.

Each of the plurality of neural processing units 100-1, . . . , 100-N may be configured to communicate with the memory 2000. A first bus 310 may be provided between the plurality of neural processing units 100-1, . . . 100-N and the memory 2000. Each of the plurality of neural processing units 100-1, . . . , 100-N may be configured to communicate with the central processing unit 200. A second bus 320 may be provided between the plurality of neural processing units 100-1, . . . , 100-N and the central processing unit 200. A detailed explanation of the plurality of neural processing units 100-1, . . . , 100-N is described above with reference to FIG. 3 to FIG. 13. Accordingly, a duplicate description of the neural processing unit 100 is omitted herein for the sake of brevity.

The processing performance (TOPS) of each of the plurality of neural processing units 100-1, . . . , 100-N may be the same as or different from each other. Each of the plurality of neural processing units 100-1, . . . , 100-N may be configured to operate independently. Each of the plurality of neural processing units 100-1, . . . , 100-N may be configured to process the operations of a specific neural network model in parallel.

A description of the central processing unit 200 is provided above with reference to FIG. 9 to FIG. 13. Accordingly, a duplicate description of the central processing unit 200 is omitted herein. The central processing unit 200 may be configured to control each of the plurality of neural processing units 100-1, . . . , 100-N based on the execution code of a neural network model. Here, a compiler (not shown) may be configured to generate a respective execution code corresponding to each of the plurality of neural processing units 100-1, . . . , 100-N. The central processing unit 200 may be configured to control the plurality of neural processing units 100-1, . . . , 100-N by directly setting the register values of the circuits of each of the plurality of neural processing units 100-1, . . . 100-N based on the respective execution code.

The memory 2000 may be configured as a main memory disposed outside the system on chip 1000. The memory 2000 may be configured as a single (homogeneous) memory or a heterogeneous memory. The capacity of the memory 2000 may be determined considering the parameter size of at least one neural network model to be driven in the system on chip 1000. The bandwidth of the first bus 310 may be determined according to the processing performance of the plurality of neural processing units 100-1, . . . , 100-N.

The bandwidth of the first bus 310 may be determined according to the processing performance (e.g., the Tera Operations Per Second (TOPS) of the neural processing unit 100) of the plurality of neural processing units 100-1, . . . , 100-N. For example, a memory bandwidth of 2 GB/s to 4 GB/s per 1 TOPS may be used for the memory 2000. For example, if there are two 10 TOPS neural processing units 100, the memory 2000 may be configured to provide a bus bandwidth of 40 GB/s to 80 GB/s. The bandwidth of the first bus 310 may be determined according to the operating frequency of the memory 2000 and the number of communication channels.

The system on chip 1000 according to the sixth embodiment of the first example of the present disclosure has the effect of being able to generate a response to an input query more quickly by improving the parallel processing performance of a neural network model by providing a plurality of neural processing units 100-1, . . . , 100-N.

Figure 15:
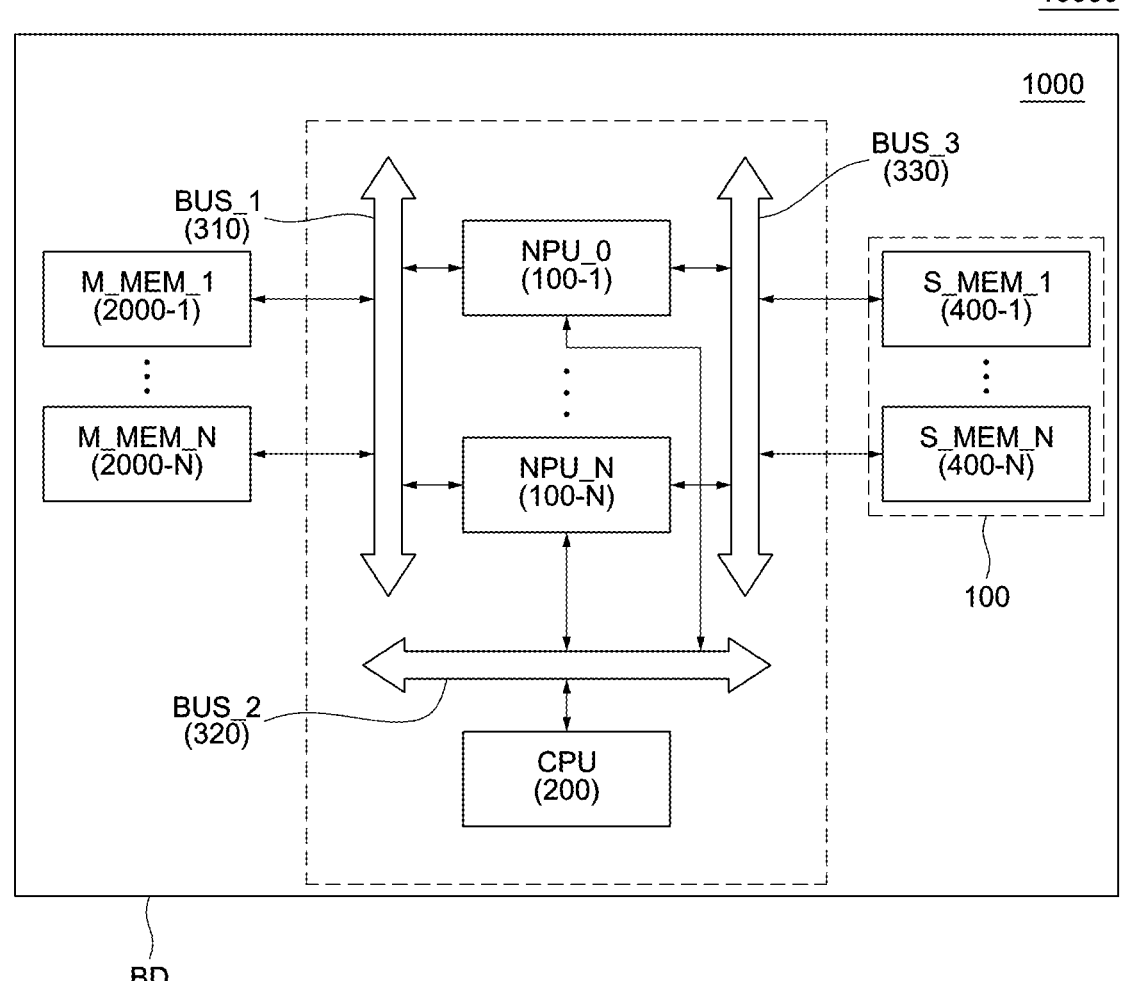
FIG. 15 is a block diagram illustrating a system on chip according to a seventh embodiment of the first example of the present disclosure.

FIG. 15 is a block diagram illustrating a system on chip according to a seventh embodiment of the first example of the present disclosure. A device 10000 according to the seventh embodiment of the first example of the present disclosure will be described with reference to FIG. 15. The device 10000 comprises a circuit board BD, a plurality of main memories 2000-1, . . . , 2000-N, and a system on chip 1000. In describing the system on chip 1000 according to the seventh embodiment of the first example of the present disclosure, overlapping descriptions with those in FIG. 3 to FIG. 14 may be omitted for convenience of explanation. Each example and each embodiment of the present disclosure may be modified and implemented in combination with other examples and other embodiments of the present disclosure.

The system on chip 1000 according to the seventh embodiment of the first example of the present disclosure is configured to comprise a plurality of neural processing units 100-1, . . . , 100-N, a central processing unit 200, a first bus 310, a second bus 320, a third bus 330, and a plurality of shared memories 400-1, . . . , 400-N. The plurality of shared memories 400-1, . . . , 400-N are configured as on-chip memories of the system on chip 1000. The plurality of main memories 2000-1, . . . , 2000-N are configured to be electrically connected to the first bus 310. The plurality of main memories 2000-1, . . . , 2000-N are configured to comprise at least one semiconductor chip. The plurality of shared memories 400-1, . . . , 400-N are configured to be electrically connected to the third bus 330.

A first bus 310 may be provided between the plurality of neural processing units and the plurality of main memories 2000-1, . . . , 2000-N. A second bus 320 may be provided between the plurality of neural processing units and the central processing unit 200. A third bus 330 may be provided between the plurality of neural processing units and the plurality of shared memories 400-1, . . . , 400-N. Here, the first bus 310 and the third bus 330 are configured to be electrically connected.

A description of the neural processing unit 100 are provided above with reference to FIG. 3 to FIG. 14. Accordingly, a duplicate description of the neural processing unit 100 is omitted herein. A description of the central processing unit 200 is provided above with reference to FIG. 9 to FIG. 14. Accordingly, a duplicate description of the central processing unit 200 is omitted herein. A description regarding the plurality of main memories 2000-1, . . . , 2000-N is provided above with reference to FIG. 10. Accordingly, a duplicate description of the plurality of main memories 2000-1, . . . , 2000-N is omitted herein. A description regarding the plurality of shared memories 400-1, . . . , 400-N is provided with reference to FIG. 12. Accordingly, a duplicate description of the plurality of shared memories 400-1, . . . , 400-N is omitted herein. A description regarding the plurality of neural processing units 100-1, . . . , 100-N is provided above with reference to FIG. 14. Accordingly, a duplicate description of the plurality of neural processing units 100-1, . . . , 100-N is omitted herein.

The plurality of main memories 2000-1, . . . , 2000-N may be configured as a plurality of memories disposed outside the system on chip 1000. The total capacity of the plurality of main memories 2000-1, . . . , 2000-N may be determined considering the parameter size of at least one neural network model to be driven in the system on chip 1000. The total capacity of the plurality of main memories 2000-1, . . . , 2000-N may be configured to be larger than the total capacity of the plurality of shared memories 400-1, . . . , 400-N. Therefore, by providing a plurality of main memories outside the system on chip 1000, the manufacturing cost of the system on chip 1000 can be reduced.

The plurality of shared memories 400-1, . . . , 400-N may be configured as a plurality of memories disposed inside the system on chip 1000. The total capacity of the plurality of shared memories 400-1, . . . , 400-N may be configured to be larger than the capacity of the internal memory 140 of the neural processing unit 100. Therefore, by placing reusable parameters in the plurality of shared memories 400-1, . . . , 400-N, the data read from or transmitted to the plurality of main memories 2000-1, . . . , 2000-N can be reduced, thereby reducing the power consumption of the device 10000.

A compiler (not shown) may, when generating the execution code of a neural network model to be processed by the system on chip 1000, set reusable input parameters, output parameters, and weight parameters to be preferentially stored in the plurality of shared memories 400-1, . . . , 400-N rather than the plurality of main memories 2000-1, . . . , 2000-N.

The device 10000 according to the seventh embodiment of the first example of the present disclosure, by combining the features of the fifth embodiment and the sixth embodiment of the first example of the present disclosure, provides a plurality of neural processing units, an expandable main memory, and an expandable shared memory. Accordingly, a generative neural network model with a large number of parameters can be supported by parallel processing by a plurality of neural processing units while improving data reuse.

Figure 16:
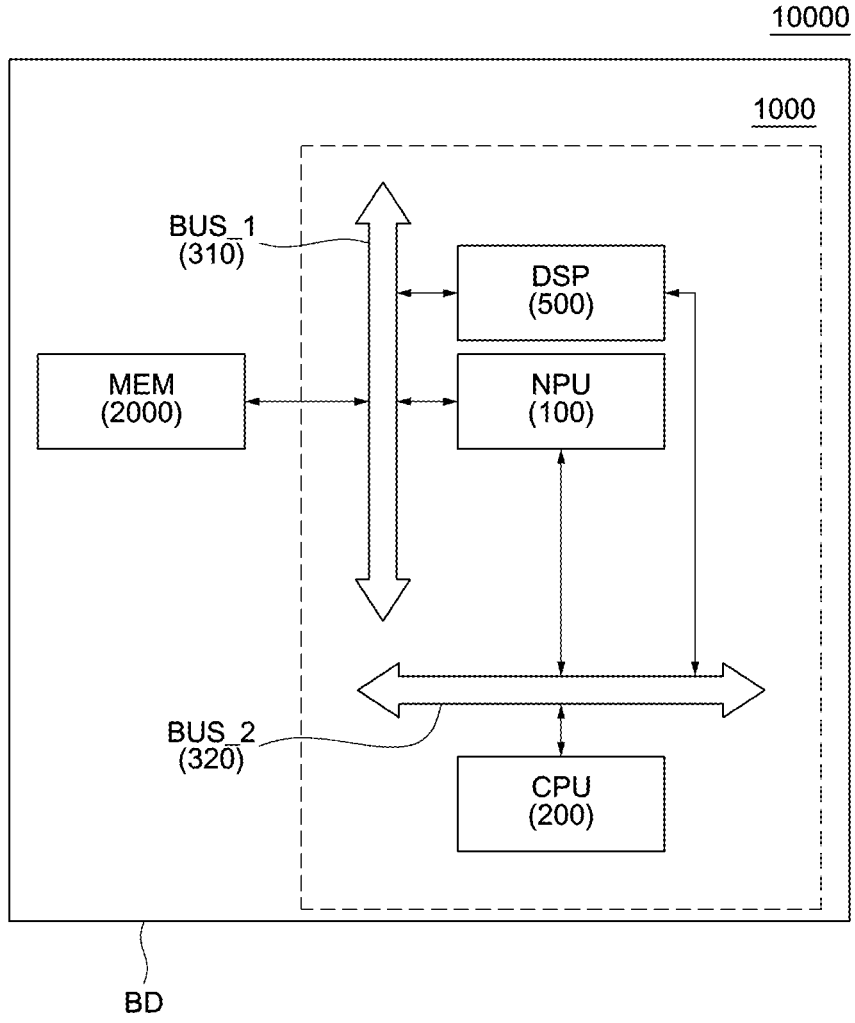
FIG. 16 is a block diagram illustrating a system on chip according to an eighth embodiment of the first example of the present disclosure.

FIG. 16 is a block diagram illustrating a system on chip according to an eighth embodiment of the first example of the present disclosure. A system on chip 1000 according to the eighth embodiment of the first example of the present disclosure will be described with reference to FIG. 16. In describing the system on chip 1000 according to the eighth embodiment of the first example of the present disclosure, overlapping descriptions with those in FIG. 3 to FIG. 15 is omitted for brevity. Each example and each embodiment of the present disclosure may be modified and implemented in combination with other examples and other embodiments of the present disclosure.

The system on chip 1000 according to the eighth embodiment of the first example of the present disclosure is configured to comprise a neural processing unit 100, a central processing unit 200, a first bus 310, and a second bus 320. The system on chip 1000 according to the eighth embodiment of the first example of the present disclosure is further configured to comprise a digital signal processing unit 500. A memory 2000 is configured to be electrically connected to the first bus 310. The memory 2000 is configured to comprise at least one semiconductor chip.

A first bus 310 may be provided between the neural processing unit 100 and the memory 2000. A first bus 310 may be provided between the digital signal processing unit 500 and the memory 2000. A second bus 320 may be provided between the neural processing unit 100 and the central processing unit 200. A second bus 320 may be provided between the digital signal processing unit 500 and the central processing unit 200.

A description of the neural processing unit 100 is provided above with reference to FIG. 3 to FIG. 15. Accordingly, a duplicate description of the neural processing unit 100 is omitted herein. A description of the central processing unit 200 is provided above with reference to FIG. 9 to FIG. 15. Accordingly, a duplicate description of the central processing unit 200 is omitted herein. A description of the memory 2000 is provided above with reference to FIG. 9 to FIG. 15. Accordingly, a duplicate description of the memory 2000 is omitted herein.

The digital signal processing unit 500 may be configured to process at least a part of the operations of a neural network model that are inefficient to process in the neural processing unit 100. The digital signal processing unit 500 comprises at least one vector processor (not shown) and at least one scalar processor (not shown).

The system on chip 1000 according to the eighth embodiment of the first example of the present disclosure further provides a digital signal processing unit 500, and can offload specific operations of a neural network model that are inefficient to process in the neural processing unit 100. Therefore, the system on chip 1000 can process the neural network model quickly in real time.

In some examples, a dedicated bus or a high-speed bus interface that operates separately from the system bus may be further included to improve the transmission speed of parameters or operation data between the shared memory(s) and the neural processing unit 100. The system bus may be configured to support communication between modules such as a neural processing unit, a central processing unit, and an on-chip memory as a common data transmission path inside the system on chip 1000, including the second bus 320, the third bus 330, etc. On the other hand, the dedicated bus may play a role in mitigating data transmission bottlenecks and enabling high-speed access by connecting the model parameters of a specific domain stored in the shared memory to a plurality of neural processing units in parallel. This separate bus configuration is designed to improve the operation path accessing the shared memory while reducing the load on the main bus (e.g., the first bus 310).

The various system on chip embodiments according to the first example of the present disclosure (described above with reference to FIG. 9 to FIG. 16) provide a hardware foundation for implementing a scalable on-device AI acceleration platform with high parallel processing capability and flexibility, and this platform may selectively or in combination include the following features:

First, according to various examples, a multiple NPU core architecture that increases parallel operation processing capability by integrating a plurality of NPU cores (each NPU including an integer operation-centric processing core P_CORE and a special function unit SFU for processing floating-point (FP) operations) on a single chip, each with improved power, performance, and area (PPA), may be provided. (e.g., see the sixth embodiment (FIG. 14) and the seventh embodiment (FIG. 15) of the first example)

Second, a hierarchical/distributed memory system may be provided, comprising a plurality of independent on-chip shared memory (SRAM) banks that can be allocated to each NPU core or NPU core group to increase data locality, and a multi-channel main memory (external DRAM) system that is accessible by all of these NPU cores and provides a high total bandwidth. (e.g., see the third, fourth, fifth, and seventh embodiments (FIG. 11, FIG. 12, FIG. 13, FIG. 15) of the first example) This efficiently manages complex data flows and reduces memory bottleneck phenomena.

Third, the special function unit SFU within the NPU core may include a programmable function approximation (Piecewise Affine Function. PAF) unit. (e.g., see the configuration of the SFU 150 within the NPU 100 of FIG. 3 and the fourth example (FIG. 24, FIG. 25, FIG. 27)) This allows for the software-based support of various current and future activation functions and nonlinear operations without separate hardware changes, thereby securing the system's flexibility and future scalability.

Fourth, in the system configuration according to the first example of the present disclosure (e.g., FIG. 9 to FIG. 16), a digital signal processing unit (DSP) 500 for offloading specific operations that are inefficient to process in the NPU, such as data processing before and after neural network operations (e.g., sensor data preprocessing, post-processing), may be selectively integrated (FIG. 16 illustrates an example of such DSP integration). This allows the NPU to focus on core AI operations, thereby improving the overall efficiency of the system.

The organic combination of the above-mentioned components creates a powerful synergistic effect. The multiple NPU cores and the distributed/hierarchical memory structure provide extreme parallelism and high data supply capability, enabling the simultaneous or very fast processing of complex or multiple AI models in an on-device environment. When a programmable SFU is combined with this, it can provide flexibility that is not limited to specific models or operations, and adaptability to new AI algorithms of the future in an on-device environment. The selective integration of a DSP further expands the application range of this platform.

In summary, a scalable on-device artificial intelligence (AI) acceleration system according to the present disclosure may comprise: one or a plurality of NPU cores, each including an integer operation processing core and a floating-point special function unit SFU; (optionally) one or more on-chip shared memories associated with each of the NPU cores or a group of NPU cores to provide data locality; a high-bandwidth main memory interface shared by the NPU cores for large-capacity data storage; and an integrated controller that distributes AI operations to the NPU cores and (optionally) the DSP, and controls data flow through the on-chip shared memory and the main memory interface. The floating-point special function unit SFU may include a programmable function approximation circuit PAF that approximates various nonlinear functions according to input parameters. In addition, a digital signal processing unit (DSP) that performs specific signal processing operations independently of the operations of the NPU core may be selectively provided. This enables the parallel and flexible acceleration of various AI models and workloads in an on-device environment, making the realization of high-performance AI applications possible.

The various system on chip SoC embodiments according to the first example of the present disclosure (see FIG. 9 to FIG. 16), when combined with the unique architecture of the neural processing unit 100 described above, can create an integrated synergistic effect that goes beyond the simple parallel arrangement of hardware. This is a feature of the present disclosure that solves the technical difficulties of implementing high-performance on-device AI, and can be embodied as follows.

For example, an intelligent linkage of a hierarchical/distributed memory system and a hybrid function approximation unit can be implemented by the aforementioned example. As shown in FIG. 11, FIG. 13, FIG. 15, etc., the system according to the first example of the present disclosure may have a hierarchical memory structure composed of a large-capacity external main memory 2000 and a high-speed on-chip shared memory 400. The effect of this memory system can be enhanced when it operates in conjunction with the hybrid structure of the special function unit 150, which combines a programmable method and a dedicated hardware method to process various nonlinear functions. Specifically, the controller 110 or a compiler may improve data placement by storing the vast amount of neural network weights in the external main memory 2000, while having key parameters such as programmable operation coefficients, which are repeatedly used by the function approximation unit FuncApx to approximate activation functions like GELU, SiLU, etc., reside in the high-speed on-chip shared memory 400 or the internal memory of the NPU. Since the coefficients are loaded directly from the on-chip memory for each activation function operation without needing to access external memory, the system's memory bottleneck phenomenon is greatly alleviated, and the power consumption associated with data movement can be reduced.

For example, an operation pipeline through NPU-DSP heterogeneous computing can be implemented by the aforementioned example. As shown in FIG. 16, the system of the present invention can implement a highly specialized heterogeneous computing architecture by integrating a digital signal processing unit (DSP) 500 along with the neural processing unit 100. This can improve processing efficiency by decomposing the entire AI inference process into the following three-stage specialized pipeline.

The three-stage specialized pipeline may include a signal pre/post-processing pipeline, a large-scale integer matrix operation pipeline, and a high-precision nonlinear function operation pipeline. The signal pre/post-processing pipeline may be a pipeline dedicated to the DSP. For example, the signal pre/post-processing pipeline may be configured such that the DSP 500 is dedicated to traditional signal processing operations such as sensor data filtering, Fourier transform (FFT), etc.

The large-scale integer matrix operation pipeline may be a pipeline dedicated to the P_CORE. The large-scale integer matrix operation pipeline may be configured such that the integer operation-based processing core (P_CORE) 120, which is specialized for low power, processes matrix multiplication (MatMul), which accounts for most of the neural network operation amount.

The high-precision nonlinear function operation pipeline may be a pipeline dedicated to the SFU/FuncApx. The high-precision nonlinear function operation pipeline may be configured such that the function approximation unit FuncApx within the special function unit (SFU) 150, which performs an autonomous pipeline operation with a single instruction, processes complex nonlinear functions using the precision of floating-point (FP), such as Softmax, negative exponential, and reciprocal, at ultra-high speed. This division of roles can improve the overall processing performance and energy efficiency of the system by efficiently allocating hardware for each operation.

Figure 17:
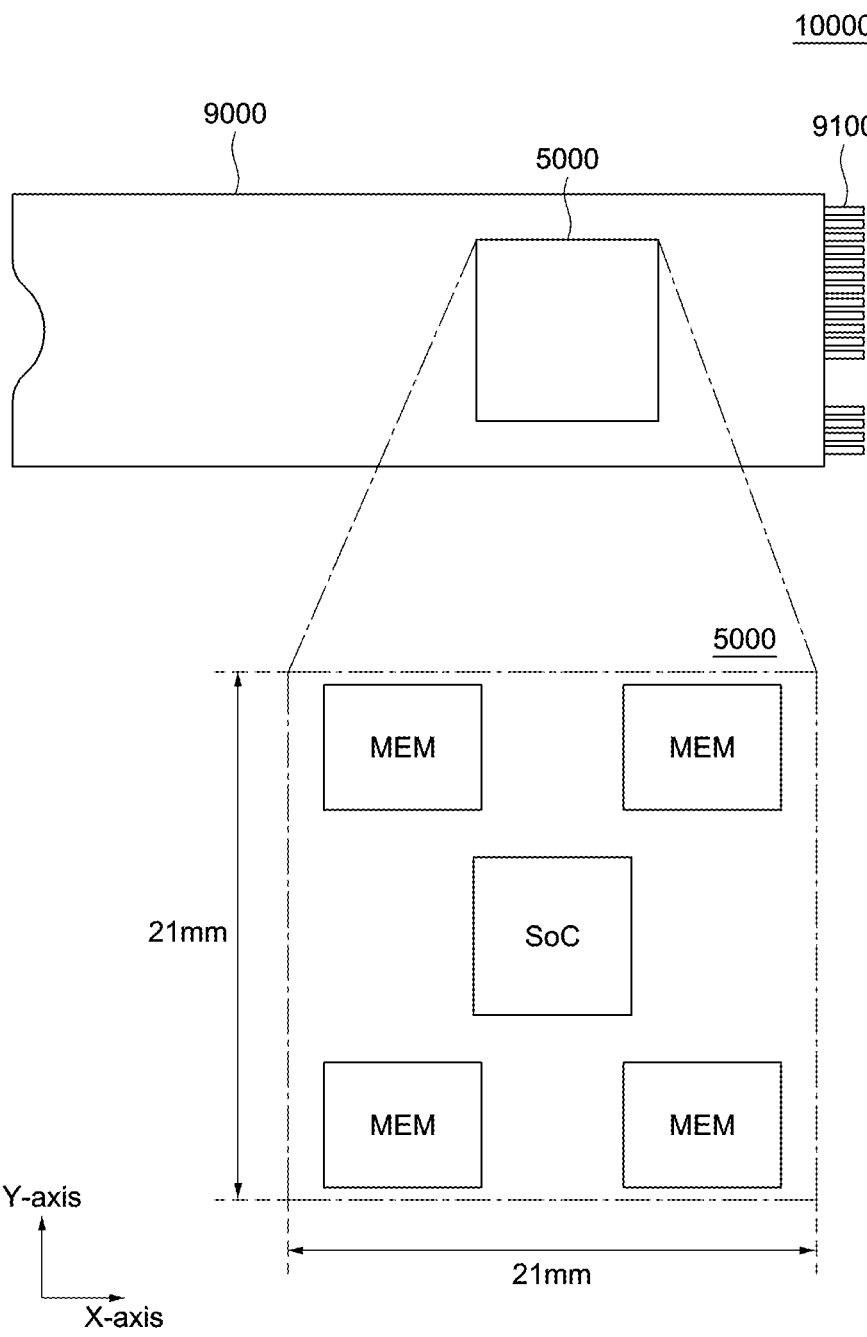
FIG. 17 is a diagram illustrating a device according to a first embodiment of a second example of the present disclosure.

FIG. 17 illustrates a device 10000 according to a first embodiment of a second example of the present disclosure. The device 10000 illustrated in FIG. 17 may be a plan view of the device 10000 viewed from above, but is not limited thereto. The size of each of the hardware components described with reference to FIG. 17 may mean width (X-axis length) and height (Y-axis length).

The device 10000 according to the first embodiment of the second example of the present disclosure comprises a circuit board 9000 and a package 5000. The circuit board 9000 may further comprise a slot 9100 (e.g., an M.2 slot). The device 10000 according to the first embodiment of the second example of the present disclosure may correspond to the device 10000 according to the embodiments of the first example of the present disclosure. The circuit board 9000 according to the first embodiment of the second example of the present disclosure may correspond to the circuit board BD according to the embodiments of the first example of the present disclosure. The package 5000 according to the first embodiment of the second example of the present disclosure may correspond to the package (not shown) in the embodiments of the first example of the present disclosure. Duplicate descriptions are explained with reference to FIG. 3 to FIG. 16 and are omitted herein for the sake of brevity.

The device 10000 according to the first embodiment of the second example of the present disclosure may be configured as a system on chip SoC. A system on chip SoC may mean a semiconductor package that integrates at least one neural processing unit 100 and components of various electronic systems. A system on chip SoC can integrate digital circuits, analog circuits, mixed-signal, and radio frequency processing circuits in a single package. For example, a system on chip SoC may further comprise at least one of a central processing unit (CPU), a digital signal processor (DSP), an image signal processor (ISP), and a graphics processing unit in addition to a NPU. A system on chip SoC may comprise at least one memory MEM. A system on chip SoC may comprise a high-speed data bus for efficient communication between various circuits included in the system on chip SoC. A system on chip SoC may comprise at least one interface such as PCIe, USB, I2C, SPI, UART, GPIO for connection with external devices and sensors. A system on chip SoC may comprise an on-chip power management unit that regulates the voltage and power distribution of the semiconductor package. A system on chip SoC may comprise a communication interface that integrates wired or wireless communication protocols such as Ethernet, Wi-Fi, Bluetooth, cellular connection for data transmission.

Referring to FIG. 17, the device 10000 is an example implemented in an M.2 form factor. In the first embodiment of the second example of the present disclosure, the width of the circuit board 9000 is 22 mm and the depth may be 42 mm, 60 mm, 80 mm, or 110 mm, but is not limited thereto. The M.2 board is a next-generation interface standard for high-speed data transmission, providing high speed and high efficiency, and is designed in a compact size, being adopted in various devices such as laptops, desktops, and mini-PCs. In particular, a small form factor such as M.2 is easy to apply on-device.

The package 5000 mounted on the device 10000 may comprise a system on chip SoC and at least one memory MEM. The system on chip SoC according to the first embodiment of the second example of the present disclosure may correspond to the system on chip 1000 according to the embodiments of the first example of the present disclosure. The memory MEM of FIG. 17 may correspond to the memory MEM or main memory M_MEM described above with reference to FIG. 9 to FIG. 16.

The physical size of the system on chip SoC may be, for example, 4.50 mm×4.85 mm. However, the present disclosure is not limited thereto. Considering the minimum separation distance between the system on chip SoC and the memories MEM, the physical size of each memory MEM may be limited to 6.43 mm×5.30 mm. However, the present disclosure is not limited to the size or dimensions of each component.

Meanwhile, the maximum number of memories MEM in the package 5000 may be determined considering the processing capability (e.g., TOPS) of the system on chip SoC, or a package size that is smaller than a specific size that satisfies the size of a specific form factor applied to the system on chip SoC.

According to an embodiment, the process node of the semiconductor manufacturing process of the memory MEM may be lower than the process node of the semiconductor manufacturing process of the system on chip SoC. For example, the memory MEM may be manufactured by a 14 nm semiconductor manufacturing process, and the process of the system on chip SoC may be manufactured by a 7 nm semiconductor manufacturing process. For example, the memory MEM may be manufactured by a 5 nm semiconductor manufacturing process and the system on chip SoC may be manufactured by a 7 nm semiconductor manufacturing process. For example, the memory MEM may be manufactured by a 2 nm semiconductor manufacturing process, and the system on chip SoC may be manufactured by a 5 nm semiconductor manufacturing process. According to the above configuration, the size of the system on chip SoC can be reduced to be suitable for the standard of a specific form factor (e.g., M.2). In particular, in the case of on-device, if the size of the system on chip SoC is large, it can be an obstacle to commercialization.

Referring to FIG. 17, the package 5000 may comprise up to four memories MEM. Each memory MEM may be a low-power double data rate 5 (LPDDR5) or a low-power double data rate 6 (LPDDR6). If the number of bus channels between the system on chip SoC and the memories MEM is increased to correspond to the number of memories MEM, the memory bandwidth of the first bus 310 of the embodiments of the first example of the present disclosure can be increased. For example, if the system on chip SoC and the four memories MEM of the package 5000 are placed closest to each other, the size of the package 5000 can be 21 mm×31 mm. In this embodiment, the package 5000 can be mounted on a device 10000 having a width of 22 mm and a depth of 42 mm.

However, the package 5000 of FIG. 17 cannot be mounted on a circuit board 9000 having a depth of 30 mm. Therefore, FIG. 18 describes an embodiment in which a package 5000 comprising a system on chip SoC and four memories MEM can be mounted on a circuit board 9000 having a depth of 30 mm.

The package 5000 may comprise at least one semiconductor chip to which a fan-in semiconductor package, a fan-out semiconductor package, a package on package (PoP), and/or a 2.5D package method is applied. In addition, the technical features of different examples of the present disclosure may be combined and modified.

Figure 18:
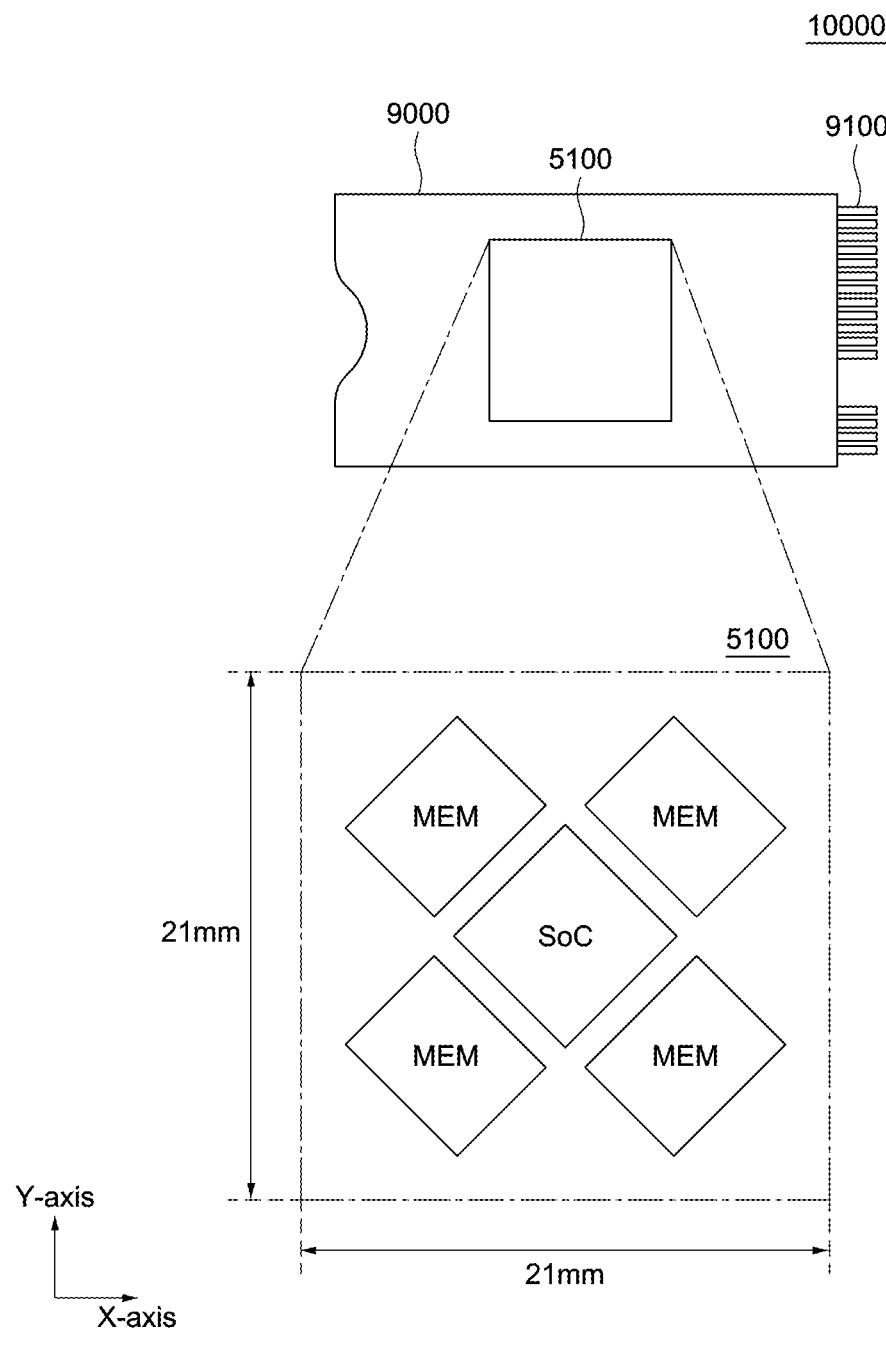
FIG. 18 is a diagram illustrating a device according to a second embodiment of the second example of the present disclosure.

FIG. 18 illustrates a device 10000 according to a second embodiment of the second example of the present disclosure. The device 10000 illustrated in FIG. 18 may be a plan view of the device 10000 viewed from above. The size of each of the hardware components described with reference to FIG. 18 may mean width (X-axis length) and height (Y-axis length).

The device 10000 according to the second embodiment of the second example of the present disclosure comprises a circuit board 9000 and a package 5100. The circuit board 9000 may further comprise a slot 9100 (e.g., an M.2 slot). The device 10000 according to the second embodiment of the second example of the present disclosure may correspond to the device 10000 according to the embodiments of the first example of the present disclosure. The circuit board 9000 according to the second embodiment of the second example of the present disclosure may correspond to the circuit board BD according to the embodiments of the first example of the present disclosure. The package 5100 according to the second embodiment of the second example of the present disclosure may correspond to the package (not shown) in the embodiments of the first example of the present disclosure. Duplicate descriptions among the contents described above with reference to FIG. 3 to FIG. 17 are omitted. In addition, in describing the second embodiment of the second example of the present disclosure, duplicate descriptions with the first embodiment of the second example may be omitted for convenience of explanation.

Referring to FIG. 18, the device 10000 may be implemented in an M.2 form factor. In the second embodiment of the second example of the present disclosure, the width of the circuit board 9000 may be 22 mm and the depth may be 30 mm, but is not limited thereto.

The package 5100 mounted on the device 10000 may comprise a system on chip SoC and at least one memory MEM. The system on chip SoC according to the second embodiment of the second example of the present disclosure may correspond to the system on chip 1000 according to the embodiments of the first example of the present disclosure. The memory MEM of FIG. 18 may correspond to the memory MEM or main memory M_MEM described above with reference to FIG. 10 to FIG. 17.

The width of the circuit board 9000 illustrated in FIG. 18 may be 22 mm, and the depth may be 30 mm. In order to mount the package 5100 within such a restrictive size, the arrangement of the system on chip SoC and the plurality of memories MEM within the package 5100 must be improved.

The physical size of the system on chip SoC may be 4.50 mm×4.85 mm, and the physical size of each memory MEM may be 6.43 mm×5.30 mm.

According to an embodiment, the process node of the semiconductor manufacturing process of the memory MEM may be lower than the process node of the semiconductor manufacturing process of the system on chip SoC. For example, the memory MEM may be manufactured by a 14 nm semiconductor manufacturing process, and the process of the system on chip SoC may be manufactured by a 7 nm semiconductor manufacturing process. For example, the memory MEM may be manufactured by a 5 nm semiconductor manufacturing process and the system on chip SoC may be manufactured by a 7 nm semiconductor manufacturing process. For example, the memory MEM may be manufactured by a 2 nm semiconductor manufacturing process, and the system on chip SoC may be manufactured by a 5 nm semiconductor manufacturing process. According to the above configuration, the size of the system on chip SoC can be reduced to be suitable for the standard of a specific form factor (e.g., M.2).

Referring to FIG. 18, the system on chip SoC and the plurality of memories MEM may be arranged in a diagonal direction of the package 5100. In this case, the size of the package 5100 can be reduced to 21 mm×21 mm. The configuration of the plurality of semiconductor chips arranged inside the package 5100 is referred to as a "rotated multi-chip substrate layout." The package 5100 of the rotated multi-chip substrate layout has the effect of being able to reduce the size of the package 5100 due to the arrangement of each semiconductor chip rotated at a specific angle. That is, the X-axis of the system on chip SoC and the X-axis of the package 5100 may not be parallel. The Y-axis of the system on chip SoC and the Y-axis of the package 5100 may not be parallel. The X-axis of the memory MEM and the X-axis of the package 5100 may not be parallel. The Y-axis of the memory MEM and the Y-axis of the packagee 5100 may not be parallel.

Meanwhile, the number of memories MEM in the package 5100 may be changed according to the processing capability (e.g., TOPS) of the system on chip SoC, the size of a specific form factor, and a size that can be placed within a package smaller than the specific form factor.

The package 5100 may be configured to comprise at least one semiconductor chip to which a fan-in semiconductor package, a fan-out semiconductor package, a package on package (PoP), and/or a 2.5D package method is applied. In addition, the technical features of different examples of the present disclosure may be combined and modified. That is, the package 5100 may comprise a semiconductor package substrate, a system on chip SoC rotated at a first angle with respect to one side of the semiconductor package substrate on a planar basis and disposed on the semiconductor package substrate, and one or a plurality of memories MEM rotated at a second angle with respect to one side of the semiconductor package substrate on a planar basis and disposed on the semiconductor package substrate adjacent to the system on chip SoC. The first angle and the second angle may be determined so that the size of the package 5100 is smaller than the size of a specific form factor.

That is, according to the device 10000 of the second embodiment of the second example of the present disclosure, a 'rotated multi-chip substrate layout' for mounting a system on chip SoC and a plurality of memories MEM in a very limited form factor such as M.2 2230 is exemplified. In order to efficiently implement sophisticated and computationally intensive artificial intelligence (AI) operations in such a small device with extremely limited physical space, an customized hardware foundation is essential. Various embodiments of the present disclosure can provide this hardware support, and some of its features are as follows.

First, a NPU core with efficient power consumption, performance, and area usage (i.e., PPA) may be provided. This NPU core comprises an integer operation-centric processing core P_CORE and a special function unit SFU for processing efficient floating-point (FP) operations, and in particular, an area-efficient function approximation (e.g., PAF) method, etc., may be adopted within the SFU to support complex activation function processing.

Second, a packaging technology that integrates an NPU chip and essential memory (e.g., LPDDR series) at high density may be applied to facilitate mounting on standard small form factors such as M.2 cards. As exemplified in FIG. 18, the overall module size can be reduced through an efficient space layout such as rotating and arranging the system on chip SoC and memory chips within the package.

Third, a main memory of sufficient capacity may be provided, placed very close inside the package or on the main board, to store the weights and operation data of the target AI model and exchange data with the NPU at high speed. This contributes to the miniaturization of the entire system by reducing the need for memory expansion through an external large printed circuit board (PCB).

As such, the organic combination of an NPU core customized for PPA, high-density integration packaging technology (see FIG. 18), and a close memory configuration creates a significant synergistic effect. It enables the effective implementation of sophisticated on-device AI functions (e.g., advanced operations such as speculative decoding) even in mobile devices, wearable devices, or small embedded systems with extremely limited space and power budgets, where it was previously difficult to mount an AI accelerator.

In conclusion, a small form factor AI acceleration device according to the present disclosure may comprise: an NPU die including an integer operation processing core and a floating-point special function unit SFU customized for power, performance, and area, and one or more memory dies electrically connected to the NPU die to store the weights and operation data of an AI model. At this time, the NPU die and the memory die are integrated at high density within a single semiconductor package that can be mounted on a standard small form factor board such as the M.2 standard, as shown in FIG. 18, and the relative positions and orientations of the dies within the package may be configured to reduce the overall package area. In addition, the SFU may include a programmable function approximation circuit to implement various activation functions in an area-efficient manner. Through this, the AI acceleration device of the present disclosure can be successfully integrated into portable or embedded devices with extreme constraints on physical size and power consumption, and can support the efficient performance of advanced AI operations (e.g., operations such as speculative decoding) in an on-device environment.

Figure 19:
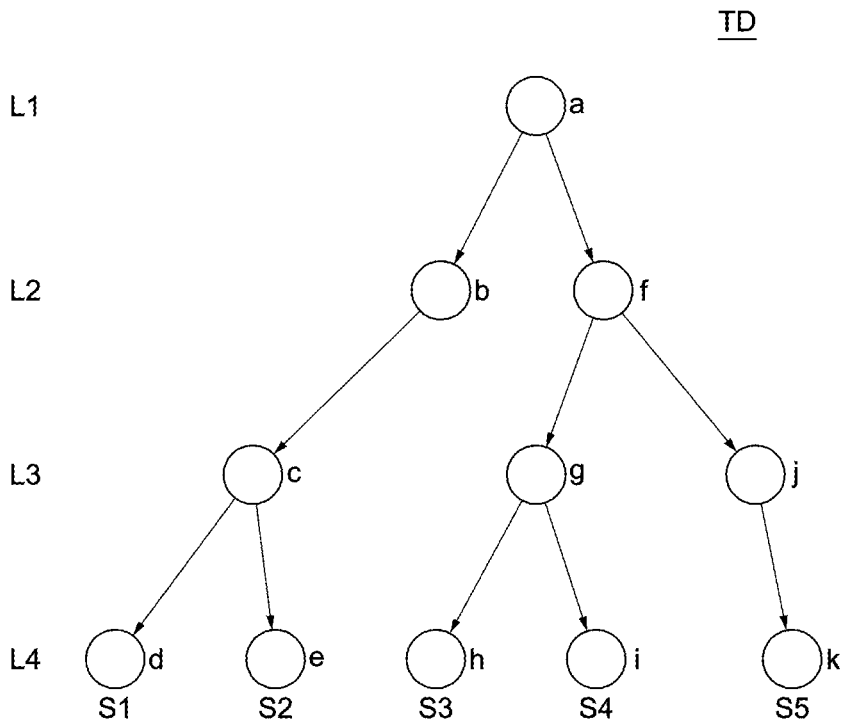
FIG. 19 is a diagram illustrating a tree for explaining speculative decoding, according to a third example of the present disclosure.

FIG. 19 is a tree diagram illustrating speculative decoding according to a third example of the present disclosure. The speculative decoding method according to the third example of the present disclosure may be performed in the device 10000 described with reference to FIG. 3 to 18. Accordingly, in describing the third example of the present disclosure, duplicate descriptions with the first example and the second example may be omitted for convenience of explanation.

A transformer-based generative artificial intelligence model can receive a query and generate a response. For example, a language model can receive a query in text form to obtain an input token, and generate an output token from the input token. Subsequently, the query and the generated output token are input back into the language model to generate a subsequent next output token. This token generation operation can be repeated several times until the response to the query is complete. A token may correspond to a word or part of a word. A response may include an output token. The final response generated by the language model for the input query data may include a series of output tokens generated by re-inputting the output tokens generated as part of the response from the language model back into the language model.

The larger the number of parameters of a language model, the higher the cost for generating a response from the language model. Therefore, using a language model with a large number of parameters results in a high computational cost to generate a response. Reducing the number of parameters of a language model can lower the computational cost and improve response speed, but it may cause a problem of degrading the response accuracy. That is, the number of parameters and accuracy (or quality) of a language model and the time for a processor to perform the language model's operations have a trade-off relationship. In particular, to generate a response of a certain level of quality or higher, the number of parameters of the language model must be quite large.

Meanwhile, in order to provide a commercial service by processing a language model on the device itself, there are difficulties, considering the hardware resource limitations of the device (e.g., energy consumption, battery capacity, memory capacity, AI processing capability, etc.). Accordingly, the third example of the present disclosure describes speculative decoding (or speculation decoding) for driving heterogeneous language models using the limited hardware resources of the device 10000.

Speculative decoding is a technique in which a plurality of language models each perform a prediction, and then the results are combined to generate the most reliable answer. For example, a first language model may select candidates that can come as the next token and calculate a probability representing the suitability for each candidate token. Thereafter, a second language model may consider the context and finally select one of the candidate tokens proposed by the first language model. Since the second language model must select one of the candidate tokens reflecting a broader context, it may be a model with a larger number of parameters and better performance than the first language model.

The device 10000 according to examples of the present disclosure can drive heterogeneous language models based on at least one system on chip 1000. That is, in an on-device method, in order to accelerate the token generation speed of a language model, speculative decoding can utilize heterogeneous language models. At least one device 10000 may utilize a speculative decoding technique in which heterogeneous language models cooperate with each other to generate a response to an input query.

The heterogeneous language model according to the third example of the present disclosure may include a first language model and a second language model. Here, the number of parameters of the first language model is smaller than the number of parameters of the second language model. That is, the number of parameters of the heterogeneous language models is different from each other. A language model with a relatively small number of parameters and a language model with a large number of parameters can be defined as an upper model and a lower model, respectively. That is, the first language model is defined as a lower model of the second language model, and the second language model is defined as an upper model of the first language model. For example, the number of parameters of the upper model may be 7 billion, and the number of parameters of the lower model may be 1 billion.

The lower model according to the third example of the present disclosure may generate probabilities used for sampling the additional tokens, based on the speculatively generated additional tokens and the currently accepted token set. The upper model according to the third example of the present disclosure generates output tokens using the candidate tokens generated by the lower model. The upper model can accept or reject the candidate tokens by sampling the additional tokens speculatively generated by the lower model. Here, the acceptance or rejection of the upper model can be determined by comparing the probability generated by the upper model corresponding to each token and the probability generated by the lower model corresponding to each token. A candidate token accepted by the upper model may be an output token included in the response.

According to the speculative decoding of the third example of the present disclosure, the lower model can generate one or more candidate token sets to generate a response corresponding to the query input to the lower model. A candidate token set is a set including one or more candidate tokens.

The upper model can accept or reject the corresponding candidate token set by sampling for each of one or more candidate token sets. Here, when the device 10000 samples for each candidate token set, the device 10000 can generate more tokens faster than when sampling for each token. In addition, the probability distributions of the lower model and the upper model can also be maintained similarly. Here, the token generation speed may be referred to as TPS (tokens per second).

The speculative decoding according to the third example of the present disclosure may operate in an auto-regressive token generation method. The auto-regressive token generation method generates a token by re-inputting a series of tokens generated in the lower model back into the lower model. The lower model generates one token for each auto-regression. Therefore, if the lower model performs N inferences, N series of tokens are generated. The lower model generates a conditional probability distribution related to the N series of tokens. Subsequently, the upper model processes the N series of tokens generated by the lower model and the conditional probability distribution related to the N series of tokens to generate a probability distribution of the upper model. Therefore, the upper model can accept or reject the token generated by the lower model by comparing the probability distribution generated by the upper model and the conditional probability distribution generated by the lower model. The upper model can accept a token based on a threshold value. When the similarity between the probability distribution value of the upper model and the conditional probability distribution value of the lower model is equal to or greater than a threshold value, the corresponding token is accepted, and when the similarity is less than the threshold value, the corresponding token may be rejected.

The upper model can accept or reject a series of tokens generated by the lower model based on a threshold value. If a specific token among the series of tokens is rejected, the tokens up to the previous token of the rejected token become the final output tokens. For example, the lower model of speculative decoding can generate tokens in set units. In this case, the upper model can accept or reject for each of a plurality of token sets generated by the lower model. If the lower model generates candidate tokens in set units, the acceptance or rejection judgment in the upper model can also be performed in set units, which can improve the token generation speed of the speculative decoding of the device 10000. In addition, as the number of token sets generated by the lower model increases, the probability that the upper model will accept a token set may increase.

The lower model generates one or more candidate token sets in response to an input query. Each candidate token set includes a series of tokens, and the lower model can select a series of tokens with high probability in the probability distribution as a candidate token set. Each candidate token set can be selected in various ways. For example, each candidate token set can be generated by selecting the tokens with the highest probability within the probability distribution, but the present disclosure is not limited thereto. In order for the upper model to accept one candidate token set, the probabilities of the tokens included in each candidate token set can be summed. Therefore, the upper model can accept or reject the entire candidate token set based on the summed probability of the candidate token set, not the probability of each token. To elaborate, when using the probability of each token, it may be difficult to match the probabilities of each token generated by the lower model and the upper model, so the rejection probability of the upper model increases. When using the summed probability of a token set, the matching of the summed probabilities of the token sets generated by the lower model and the upper model may be more similar, so the acceptance probability of the upper model increases.

The lower model can generate one or more candidate token sets in response to an input query. The one or more candidate token sets can be generated statically or dynamically. For example, the sequence length of each candidate token set can be preset. The lower model can generate one or more candidate token sets and generate tree data by combining each candidate token set. The tree data includes a node at each branch point.

FIG. 19 illustrates tree data TD including one or more token sets generated by a lower model, according to an embodiment. Referring to FIG. 19, a first token set S1, a second token set S2, a third token set S3, a fourth token set S4, and a fifth token set S5 are displayed below the leaf nodes of the tree.

The first candidate token set S1 may include four tokens (a, b, c, d). The second candidate token set S2 may include four tokens (a, b, c, c). The third candidate token set S3 may include four tokens (a, f, g, h). The fourth candidate token set S4 may include four tokens (a, f, g, i). The fifth candidate token set S5 may include four tokens (a, f, j, k). Each of the candidate token sets may be selected or rejected by the upper model.

The token length of each candidate token set may be set. For example, the sentence length of each token set may be set to 4. However, the present disclosure is not limited thereto, and the length of the token set may be dynamically changed.

Each token may have an order level. The order level may correspond to the sentence length. Specifically, the first order level L1 corresponds to the token (a). The second order level L2 corresponds to the tokens (b, f). The third order level L3 corresponds to the tokens (c, g, j). The fourth order level L4 corresponds to the tokens (d, e, h, i, k). In the example where the sentence length is set to 4, the maximum order level is set to 4. The order of the tokens in each token set may be arranged according to the corresponding order level. Specifically, the first token (a) among the tokens (a, b, c, d) of the first token set S1 corresponds to the first order level L1. The second token (b) among the tokens (a, b, c, d) of the first token set S1 corresponds to the second order level L2. The third token (c) among the tokens (a, b, c, d) of the first token set S1 corresponds to the third order level L3. The fourth token (d) among the tokens (a, b, c, d) of the first token set S1 corresponds to the fourth order level L4.

Each token is defined as a node of the tree data TD. For example, the token (g) can be a branch node of the third token set S3 and the fourth token set S4 at the third order level L3. Each node includes branch information. That is, the tree data TD generated by the lower model may include all or at least a part of one or more token sets (S1 to S5), order levels (L1 to L4), node information of each token (a, b, c, d, e, f, g, h, i, j, k), and the selection probability of each candidate token set (e.g., the summed probability of the token set). The upper model can accept or reject at least one token of the tree data TD.

Speculative decoding may also be implemented as hybrid speculative decoding. Hybrid speculative decoding may set a threshold value a that determines whether a token is approved or rejected by comparing the probability distributions of the lower model and the upper model, after the previously speculatively generated token is verified by the upper model.

Speculative decoding may also be implemented as group speculative decoding. Group speculative decoding is configured to generate several tokens in group units in the lower model and have them verified by the upper model, and can provide a high level of efficiency.

Figure 20:
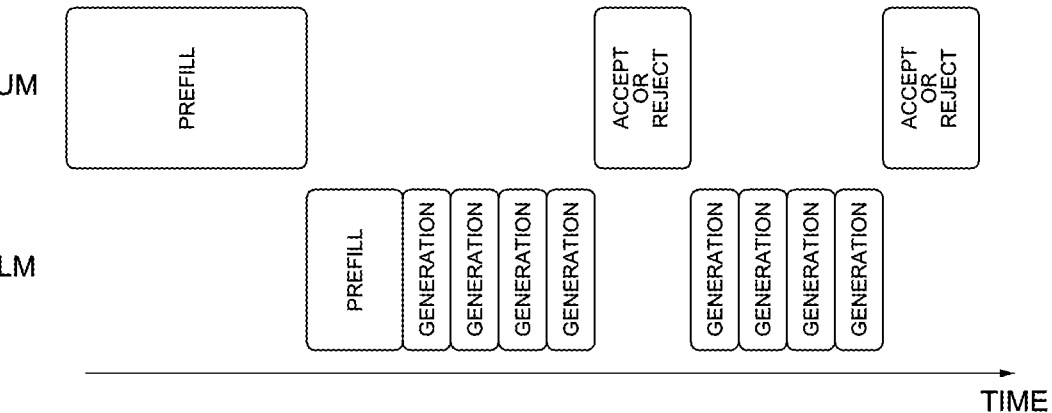
FIG. 20 is a diagram schematically illustrating a speculative decoding operation, according to the third example of the present disclosure.

FIG. 20 schematically illustrates a speculative decoding operation according to a third example of the present disclosure. Referring to FIG. 20, a lower model LM and an upper model UM are illustrated. The device 10000 according to the third example of the present disclosure may be configured to sequentially process the lower model LM and the upper model UM for speculative decoding.

A transformer-based artificial intelligence model may perform predetermined operation steps (e.g., a prefill step and a generation step) to generate a response to an input query. A transformer is an artificial intelligence model based on an attention mechanism. A transformer utilizes a large number of matrix multiplication operations. A transformer can obtain an attention score (Q, K, V), which is an output value, using an input value and parameters such as a query Q, a key K, and a value V. A transformer can process various inference operations based on the output value (i.e., attention (Q, K, V)). A transformer is actively utilized in generative language models.

A tensor refers to a multi-dimensional matrix parameter processed in an artificial intelligence model (e.g., an artificial neural network). A tensor may include various neural network model parameters such as weights, input parameters, output parameters, and attention parameters.

The prefill step is an initial step of processing and interpreting an input (e.g., a prompt input by a user). The prefill step may include a tokenization step, a context embedding step, a processing step through layers, and a preparation step for decoding. The prefill step may be processed by one or more neural processing units. In the tokenization step, the input text is converted into tokens (sub-words, words, or characters), which are numerical representations used in the artificial intelligence model. In the context embedding step, the tokens can be mapped to a dense embedding vector that encodes semantic and syntactic information. In the prefill step, the embeddings are processed through several layers of the neural network model (e.g., transformer blocks) to generate a contextual representation of the input tokens. In the preparation step for decoding, the artificial intelligence model calculates the probability for each entire token of what the next output token might be based on the input context, but does not yet finally generate the next token. Instead, it can set the context for the generation step.

In the generation step, one or more neural processing units can sequentially generate one or more output tokens based on the context provided by the artificial intelligence model in the prefill step and the previously generated output tokens. The generation step includes an initial prediction step, an autoregressive processing step, and a stopping condition. The generation step may be processed by one or a plurality of neural processing units. In the initial prediction step, the first token is generated by sampling from the probability distribution calculated in the prefill step.

In the autoregressive processing step, each subsequent token is generated by integrating the previous tokens (including the generated tokens) into the context of the neural network model. The generation process continues until a stopping condition is met, such as reaching a maximum token limit, encountering a special end-of-sequence (EOS) token, or achieving a specific semantic goal. The series of tokens generated in the generation step may correspond to the tree data TD of FIG. 19. The tree data may include at least one token set.

Referring again to FIG. 20, a third example illustrating the steps of speculative decoding according to the flow of time is shown. The speculative decoding according to examples of the present disclosure may be processed sequentially or in parallel by one or more neural processing units. In speculative decoding, an upper model UM and a lower model LM cooperate with each other to generate a response to an input query. The longer the horizontal length of the block representing each step, the more processing time is consumed.

Specifically, in speculative decoding, the upper model UM first performs a prefill operation. Subsequently, the lower model LM performs a prefill operation. Subsequently, the lower model LM continuously performs a generation step, and in each generation step, each token is generated. Next, the upper model UM accepts or rejects the tokens generated by the lower model LM. The upper model UM can accept or reject some or all of the tokens generated by the lower model LM. The lower model LM re-inputs the accepted tokens as an input query, and the lower model LM continuously performs generation steps to generate each token corresponding to each generation step. Next, the upper model UM accepts or rejects the tokens generated by the lower model LM. The above steps are repeated until a stopping condition is met.

The number of parameters of the upper model UM is larger than the number of parameters of the lower model LM, so the processing time is longer. Therefore, the processing time of the prefill step of the upper model UM is longer than the processing time of the prefill step of the lower model LM. The processing time of the acceptance or rejection step of the upper model UM is longer than the processing time of the generation step of the lower model LM. Therefore, in generating a token for a response, the token generation speed of the system can be improved by configuring the lower model to generate as many tokens as possible and the upper model to perform only selective judgment.

The number of parameters of each of the lower model LM and the upper model UM may be determined considering the hardware resource limitations of the device 10000 (e.g., the processing performance of the system on chip SoC and the bandwidth of the memory MEM). The upper model UM can utilize a language model whose number of parameters is determined considering the hardware resource limitations of the device being processed.

In some examples, the lower model LM may be a model obtained by pruning the parameters of the upper model UM. In this case, the parameters of the pruned neural network model can be lightweight, and the associated memory bandwidth may be smaller than that of the upper model UM.

According to the third example of the present disclosure, the device 10000 may be configured to process a prefill operation using the upper model UM to process speculative decoding. Subsequently, the device 10000 may process a prefill operation and a generation operation using the lower model LM to process speculative decoding.

The device 10000 according to the third example of the present disclosure may include at least one interface (not shown). The interface can input and/or output data. The device 10000 can receive an input query through the interface (not shown). The interface may be an electronic circuit capable of receiving an input query such as a prompt, a gesture, a voice, etc. The input and/or output interface may include, for example, a mouse, a keyboard, a touch pad, a touch screen, a microphone, a wireless communication device, a wired communication device, a camera, a speaker, etc.

The system on chip SoC of the device 10000 according to the third example of the present disclosure can perform inference operations on the upper model UM and the lower model LM. The upper model UM and the lower model LM can cooperate with each other to process speculative decoding. The NPU of the system on chip SoC of the device 10000 according to the third example of the present disclosure can process the upper model UM and the lower model LM alternately. That is, the NPU operates to sequentially process the upper model UM and the lower model LM. In other words, the NPU operates to process the upper model UM and the lower model LM in a time-division manner. Therefore, the utilization rate of the operation circuits of the NPU can be increased while sequentially processing the upper model UM and the lower model LM.

According to the disclosed embodiment, speculative decoding is performed by sequentially processing the upper model UM and the lower model LM in the NPU of the device 10000, and the bottleneck phenomenon caused by the speculative decoding operation can be reduced by having the parameters of the upper model UM and the lower model LM reside in the memory MEM.

The memory MEM of the device 10000 according to the third example of the present disclosure is configured to store all the weight parameters of the upper model UM and the lower model LM when the device 10000 operates. By storing all the first weight parameters of the upper model UM and the second weight parameters of the lower model LM in the memory MEM, the device 10000 can efficiently process speculative decoding. The memory MEM of the device 10000 according to the third example of the present disclosure can provide the parameters of the upper model UM to the NPU when the NPU infers the upper model UM, and provide the parameters of the lower model LM to the NPU when it infers the lower model LM.

For example, when performing a speculative decoding operation, the device 10000 can allocate a memory bank where the weight parameters of the upper model UM and the lower model LM will be stored by setting the address map of the memory MEM. Therefore, during a speculative decoding operation, all the weight parameters of the upper model UM and the lower model LM can reside in the memory MEM. That is, the capacity of the memory MEM of the device 10000 according to the third example of the present disclosure may be larger than the total capacity occupied by the first weight parameters of the upper model UM and the second weight parameters of the lower model LM. If the memory MEM of the device 10000 does not have the memory capacity to store the upper model UM and the lower model LM, it may be difficult to quickly process speculative decoding in real time. That is, the capacity of the memory MEM may be determined considering the size of the parameters of the upper model UM and the lower model LM to be driven in the device 10000. If not all the parameters of the upper model UM and the lower model LM are stored in the memory MEM, a conventional device has to read the weight parameters of each model from an external storage device for speculative decoding. In this embodiment, the conventional device has to command unnecessary memory read and memory write operations for speculative decoding, so the token generation speed may be lower than the token generation speed of the device 10000 according to the third example of the present disclosure.

The first memory MEM1 of the device 200 according to the second embodiment of the first example of the present disclosure is configured to store the weight parameters of the upper model UM and the tokens generated by the upper model UM when the device 200 operates.

The second memory MEM2 of the device 200 according to the second embodiment of the first example of the present disclosure is configured to store the weight parameters of the lower model LM and the tokens generated by the lower model when the device 200 operates. If all of the weight parameters of the upper model UM and the lower model LM are stored in the first memory MEM1 and the second memory MEM2, the device 200 can efficiently process speculative decoding. To elaborate, the size of the weight parameters of the upper model UM and the lower model LM can be quite large, and it may be difficult to store them all in one memory chip. In this case, the device 200 can increase the capacity of the memory by configuring a plurality of memories.

The first memory MEM1 of the device 200 according to the second embodiment of the first example of the present disclosure is configured to provide the parameters of the upper model UM to the NPU when the NPU infers the upper model UM, and the second memory MEM2 is configured to provide the parameters of the lower model LM to the NPU when it infers the lower model LM.

For example, when performing a speculative decoding operation, the device 200 can allocate a memory bank where the weight parameters of the upper model UM and the lower model LM will be stored by setting the address map of each of the first memory MEM1 and the second memory MEM2. Therefore, during a speculative decoding operation, all the weight parameters of the upper model UM and the lower model LM can reside in both the first memory MEM1 and the second memory MEM2.

Accordingly, the capacity of the plurality of memories (MEM1, MEM2) of the device 200 according to the second embodiment of the first example of the present disclosure is configured to be larger than the total capacity occupied by the weight parameters of the upper model UM and the lower model LM. Therefore, the weight parameters of the upper model UM and the lower model LM can reside in the plurality of memories (MEM1, MEM2). If the capacity of the plurality of memories (MEM1, MME2) of the device 200 is insufficient for the upper model UM and the lower model LM, it may be difficult to efficiently process speculative decoding.

If not all the parameters of the upper model UM and the lower model LM are stored in the plurality of memories (MEM1, MEM2), a conventional device has to read the weight parameters of each model from an external storage device for speculative decoding. Accordingly, the conventional device commands unnecessary memory read and memory write operations for speculative decoding. Accordingly, the token generation speed of the conventional device becomes lower than the token generation speed of the device 200 according to the second embodiment of the first example of the present disclosure.

In summary, FIGS. 19 20 explain speculative decoding according to a third example of the present disclosure. And, the speculative decoding method according to the third example of the present disclosure may be performed in the device 10000 described with reference to FIGS. 3 to 18. In order to support such efficient on-device speculative decoding, the device 10000 according to the present disclosure can lay the foundation through the following improved hardware architecture and system configuration.

That is, the device 10000 according to the present disclosure includes a low-power NPU (neural processing unit, see 100 in FIG. 3) core architecture, and the low-power NPU core architecture has a separate structure of an integer operation-centric processing core (P_CORE, see 120 in FIG. 3) and a special function unit (SFU, see 150 in FIG. 3) for floating-point operations and complex function processing. The special function unit (SFU) 150 is configured to include a dedicated hardware accelerator (e.g., NEXP (see FIG. 30), RECIP (see FIG. 28) circuits, etc., included in the vector function approximation unit (V_FuncApx, see 1537 in FIG.

Figure 24:
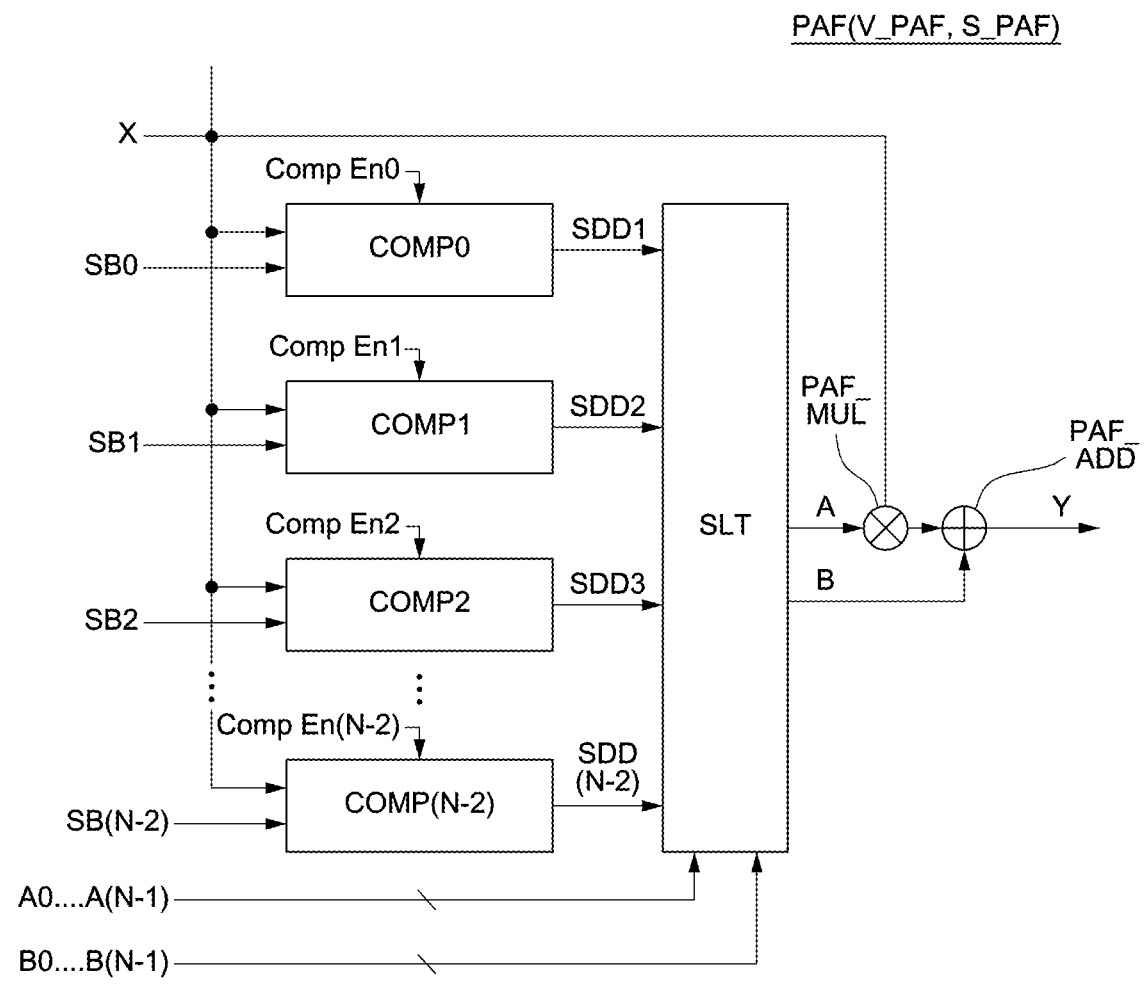
FIG. 24 is a diagram illustrating a function approximation circuit of a neural processing unit configured to process a programmed activation function, according to a second embodiment of the fourth example of the present disclosure.
Figure 25:
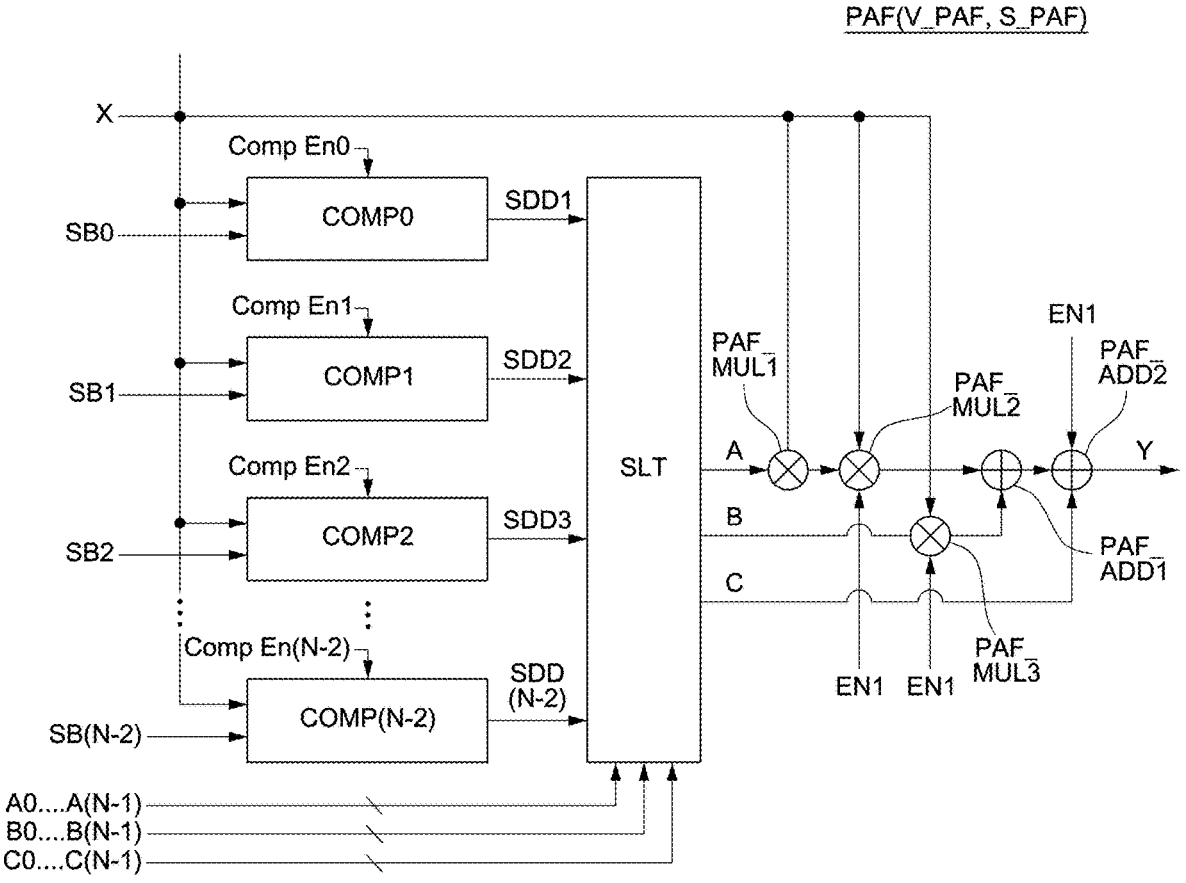
FIG. 25 is a diagram illustrating a function approximation circuit of a neural processing unit configured to process a programmed activation function, according to a third embodiment of the fourth example of the present disclosure.

5) or the scalar function approximation unit (S_FuncApx, see 1545 in FIG. 6) within the SFU 150) for functions such as exponential, reciprocal, etc., which are essential for softmax and attention operations, and a programmable function approximation unit PAF (e.g., a function approximation circuit describe above with reference to FIGS. 24 and 25) included in the function approximation unit) that supports various activation functions.

Accordingly, the device 10000 includes a large-capacity on-device memory system, and the memory system includes a main memory (e.g., external DRAM, see 2000 in FIG. 9 or 2000-1-2000-N in FIG. 10) of sufficient capacity to store all the weights of an LLM and even the weights of an auxiliary model that can be used for speculative decoding, and an on-chip shared memory (e.g., SRAM, see 400 in FIG. 11 or 400-1~400-N in FIG. 12) of sufficient capacity for high-speed access and reuse of frequently used weights and intermediate activation values. Accordingly, the memory system may have a hierarchical structure.

Therefore, NPU acceleration-based speculative decoding can be effectively implemented through the improved hardware configuration of this NPU core 100 and memory system. According to the above configuration, it is not a simple sum of individual technologies, but an improved NPU core 100 is organically combined with a large-capacity memory system (e.g., 2000, 400) and a speculative decoding algorithm, providing a synergistic effect that enables the execution of large-scale language models, which previously used server-level computing power, in a completely on-device form without response delay while reducing energy consumption. This enables the implementation of a practical server-independent AI agent.

In summary, a low-power on-device large language model (LLM) inference system according to the present disclosure can achieve the above effects by including the following components: a processing core 120 that performs integer-based matrix operations on input data; a special function unit (SFU) 150 that performs special operations (including exponential, reciprocal, and programmable function approximation) based on floating-point on the integer operation results, where the special operations are improved for attention and activation function processing of an LLM; a main memory 2000 that stores the entire weights of the LLM and the weights of at least one auxiliary model for speculative decoding; an on-chip shared memory 400 that temporarily stores data frequently accessed by the processing core 120 or the SFU 150 to increase data reusability; and a controller (e.g., the controller 110 within the NPU 100 or a system-level control unit including it) that controls the processing core 120, the SFU 150, the main memory 2000, and the on-chip shared memory 400 to perform a speculative decoding operation including candidate token generation using the auxiliary model and candidate token verification using the LLM. Through this system configuration, completing the inference of the LLM with low power without the help of an external server may be possible.

Hereinafter, a fourth example of the present disclosure will be described. The fourth example of the present disclosure describes the circuit configuration and operation method of the vector function approximation unit V_FuncApx and the scalar function approximation unit S_FuncApx shown in FIG. 5 and FIG. 6.

Figure 21:
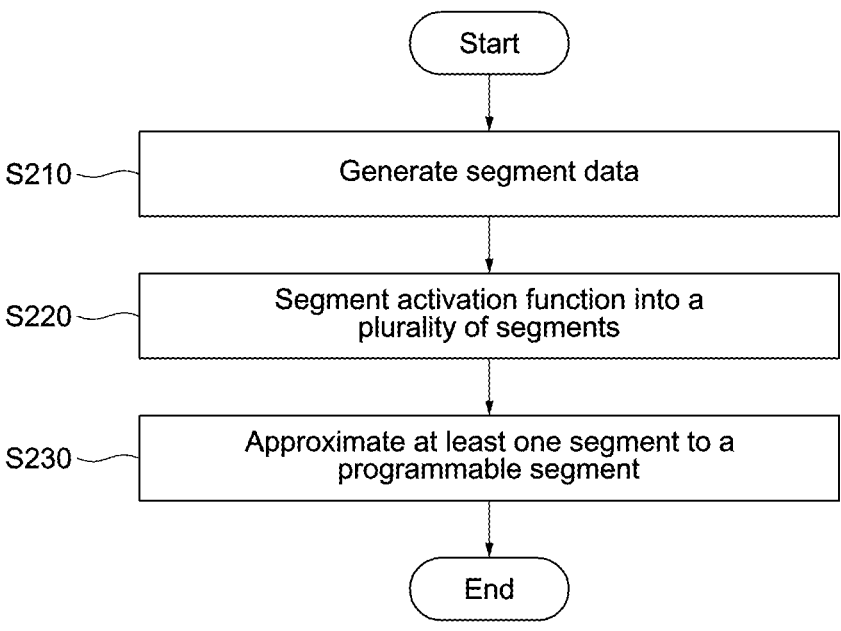
FIG. 21 is a flowchart illustrating an activation function programming method according to a first embodiment of a fourth example of the present disclosure.

FIG. 21 is a flowchart illustrating an activation function programming method according to a first embodiment of a fourth example of the present disclosure. The operation of the vector function approximation unit 1537 and the scalar function approximation unit 1545 will be described with reference to FIG. 21. The vector function approximation unit 1537 and the scalar function approximation unit 1545 are configured to process a programmed activation function to be described later.

In a neural network model, whether elements of outputs from a layer of the neural network model are activated may be determined according to the strengths of the output elements generated by an activation function in the corresponding layer. The inference accuracy of a neural network model may vary depending on the activation function implemented in the neural processing unit 100 according to the fourth example of the present disclosure. That is, the inference accuracy and efficiency of a neural network model may vary depending on the hardware implementation characteristics of the processing circuit of the activation function of the neural processing unit 100.

Accordingly, the activation function programming method according to the first embodiment of the fourth example of the present disclosure includes a step of generating segment data for segmenting an activation function S210, a step of segmenting the activation function into a plurality of segments using the generated segment data S220, and a step of approximating at least one of the plurality of segments as a programmable segment S230.

The activation function programming method may be performed by an activation function conversion program (not shown). The activation function conversion program (not shown) may be a computer program, software, firmware, an application, or an execution code stored in a recording medium. The activation function conversion program (not shown) may be a computer program configured to perform a command to convert an activation function into a programmed activation function expressed as programmable parameters (i.e., operation coefficients). The activation function conversion program (not shown) may be stored in a computer-readable recording medium. The activation function conversion program (not shown) may be included in a compiler (not shown).

In step S210, segment data is generated. The segment data is data generated to segment a specific activation function into a plurality of segments. The segment data will be described later.

In step S220, the activation function is segmented into a plurality of segments using the generated segment data. In the present disclosure, the term 'segment' means a part of an activation function divided into a plurality of sections, and is distinguished from 'candidate segment' or 'programmable segment', which are terms related to the approximation of an activation function.

Step S220 may include a step of determining the number and width of a plurality of segments based on the segment data. In step S220, the number of a plurality of segments for segmenting the activation function to be converted and the width of each of the plurality of segments may be determined using the segment data. At least one of the plurality of segments may have the same or a different width as another segment.

The section of the plurality of segments may also be expressed by the coordinates of the start point and end point of the X-axis. On the other hand, if the number of the plurality of segments and the width of each of the plurality of segments are determined, the coordinates of the section of the plurality of segments can be obtained using the number and width of the plurality of segments.

In step S230, at least one of the plurality of segments is approximated as a programmable segment. The programmable segment can be programmed according to the circuit design of the vector function approximation unit 1537 and the scalar function approximation unit 1545. That is, the activation function conversion program (not shown) may program the activation function of the neural processing unit 100 based on the hardware configuration of the vector function approximation unit 1537 and the scalar function approximation unit 1545. Programmable parameters may be data generated in step S230. The programmable parameters may have a form compatible with the circuits of the vector function approximation unit 1537 and the scalar function approximation unit 1545 of the neural processing unit 100. For example, each of the vector function approximation unit 1537 and the scalar function approximation unit 1545 may have hardware configured to operate each programmable segment with a specific slope and a specific offset. The activation function conversion program (not shown) may be provided with the configuration information of the vector function approximation unit 1537 and the scalar function approximation unit 1545.

The activation function conversion program (not shown) can program the programmable segment to represent a linear function having a slope and an offset as it parameters, or a quadratic function of a higher degree than the linear function. For example, the programmable segment may be approximated as a linear function according to a specific determination criterion. In this case, the activation function conversion program (not shown) can generate a programmable segment expressed in the form of "(slope a)*(input value x)+(offset b)." The specific slope and specific offset mentioned above may be programmable parameters. In the case of a programmable segment determined to be approximated by a linear function, step S230 may include a step of approximating the one selected segment with a specific slope and a specific offset value.

Step S220 and step S230 may be performed as a single step. This is because the step of segmenting a segment and the step of generating a programmable parameter of the corresponding programmable segment can be performed simultaneously. To elaborate, step S220 and step S230 may be modified into a step of segmenting an activation function into a plurality of segments using the generated segment data, and approximating at least one of the plurality of segments as a programmable segment.

Meanwhile, the activation function programming method, particularly the process of generating desirable segment data (e.g., the boundary value and width of a segment) and deriving corresponding programmable parameters to approximate each segment, may be performed in a systematic and automated manner by replacing it with a deep learning model's learning problem, according to another embodiment of the present disclosure.

Conventionally, the process of finding desirable approximation parameters relied on empirical or complex numerical analysis, making it difficult to guarantee desirable approximations for all nonlinear functions. However, the present disclosure utilizes a small-scale artificial neural network that represents a piecewise linear function. Through this artificial neural network, learning can be conducted to better imitate the target activation function to be approximated.

Figure 23:
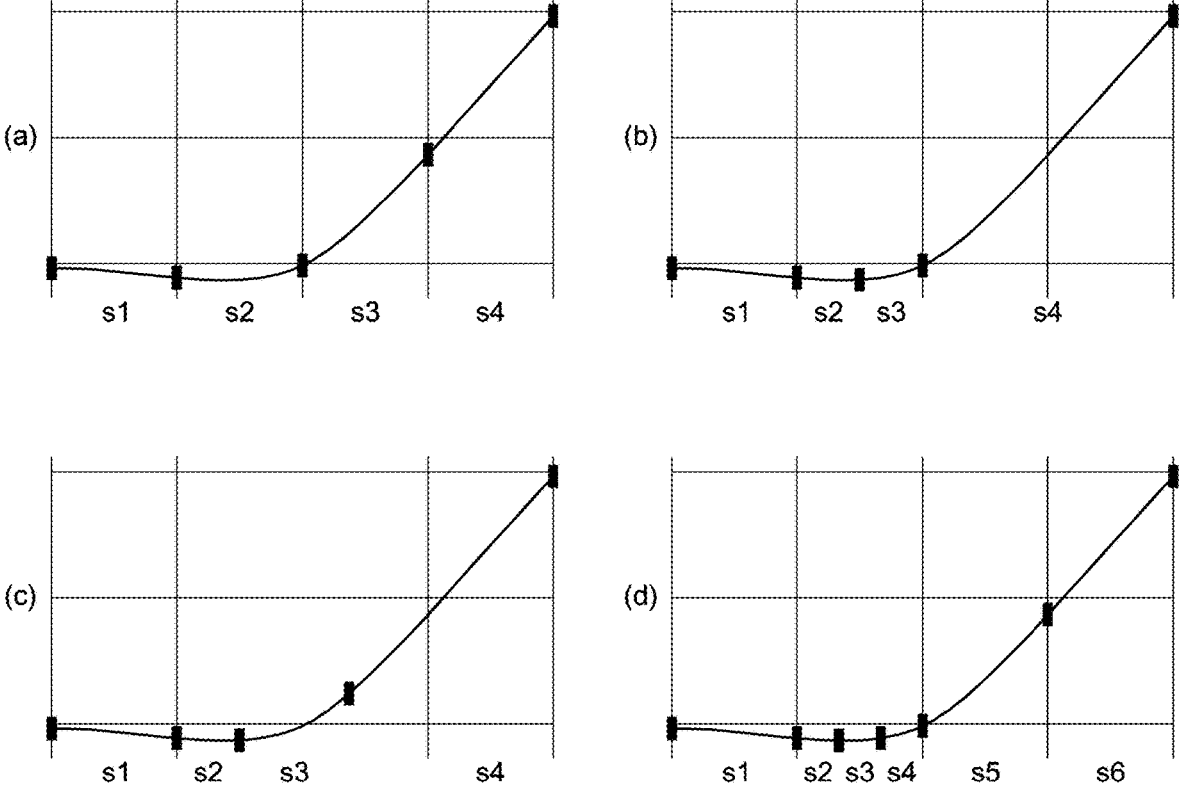
FIG. 23 is a graph illustrating various cases of segmenting an activation function into a plurality of segments by the activation function programming method, according to the first embodiment of the fourth example of the present disclosure.

During the learning process, the artificial neural network updates its internal weights and biases in an iterative manner to reduce a loss function, and in this process, the optimal division points (inflection points) that better represent the nonlinear characteristics of the target function and the linear relationship of each section are automatically determined. Once learning is complete, a set of programmable parameters, including segment boundary values SB, the slope A and offset B of each segment, etc., in a form suitable for use by the programmable function approximation circuit PAF, may be extracted from the parameters of the updated artificial neural network. Through this deep learning-based approach, desirable segmentation with the segments of various widths and a preferred number of segments may be obtained according to the characteristics of the function, as shown in FIG. 23. In this way, more accurate approximation parameters may be obtained.

Figure 22:
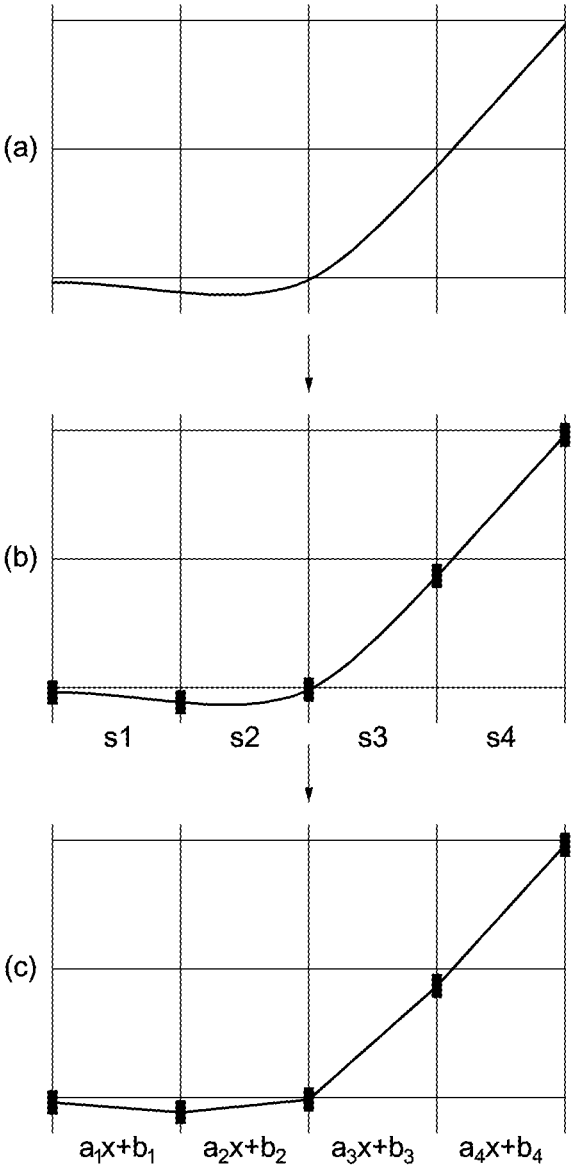
FIG. 22 is a graph illustrating a process in which an activation function is approximated by the activation function programming method, according to the first embodiment of the fourth example of the present disclosure.

FIG. 22 is a graph illustrating a process in which an activation function is approximated by the activation function programming method according to the first embodiment of the fourth example of the present disclosure. The activation function shown in (a) of FIG. 22 is segmented into a plurality of segments (s1, s2, s3, s4) using segment data as shown in (b) of FIG. 22. The plurality of segments (s1, s2, s3, s4) are approximated as programmable segments (a1x+b1, a2x+b2, a3x+b3, a4x+b4) as shown in (c) of FIG. 22. An example is described in which the activation function conversion program (not shown) generates programmable parameters so that all programmable segments correspond to a linear function.

Each programmable segment includes corresponding programmable parameters. In (c) of FIG. 22, all of the plurality of segments have been approximated as programmable segments in the form of a linear function. However, in various examples, some of the plurality of segments may be approximated as programmable segments of other forms. For example, the activation function conversion program (not shown) can program each programmable segment in the form of a linear function, a quadratic function, a cubic function, a logarithmic function, etc.

For example, only the segments (s1, s3, s4) may be approximated as programmable segments, and the segment (s2) may be approximated using various methods available in the device where the activation function will be processed. Specifically, if a pre-determined and stored lookup table, a nonlinear approximation formula, etc., are available in the hardware in the section of the segment (s2), the segment (s2) can be approximated using this pre-determined and stored lookup table, nonlinear approximation formula, etc.

In other words, the activation function conversion program (not shown) may be configured to program each of the segments (s1, s2, s3, s4) independently. At this time, the activation function conversion program (not shown) is provided with the hardware configuration information of the vector function approximation unit 1537 and the scalar function approximation unit 1545. The activation function conversion program (not shown) may be configured to independently determine the approximation method for each of the segments (s1, s2, s3, s4) based on the hardware configuration information of the vector function approximation unit 1537 and the scalar function approximation unit 1545.

For example, each of the vector function approximation unit 1537 and the scalar function approximation unit 1545 may be designed to include at least one of a linear function approximation circuit, a quadratic function approximation circuit, a reciprocal function approximation circuit, a root mean square function approximation circuit, and a negative exponential function approximation circuit. In this case, the activation function conversion program (not shown) can selectively program at least one of each of the segments (s1, s2, s3, s4) in the form of a linear function, a quadratic function, a reciprocal function, a root mean square function, and a negative exponential function.

For example, if each of the vector function approximation unit 1537 and the scalar function approximation unit 1545 is configured to include a circuit configured to support at least one specific function operation, the activation function conversion program (not shown) can program each of the segments (s1, s2, s3, s4) in the form of a corresponding specific function.

For example, the vector function approximation unit 1537 and the scalar function approximation unit 1545 may be configured to include at least one of a linear function operation circuit, a quadratic function operation circuit, a reciprocal function operation circuit, a root mean square function operation circuit, and a negative exponential function operation circuit, or a similar function operation circuit, designed in hardware.

For example, the activation function conversion program (not shown) can program the same activation function in different ways.

For example, the activation function conversion program (not shown) can program a specific activation function only with a linear function.

For example, the activation function conversion program (not shown) can program a specific activation function only with a quadratic function.

For example, the activation function conversion program (not shown) can program a specific activation function only with a reciprocal function.

For example, the activation function conversion program (not shown) can program a specific activation function only with a root mean square function.

For example, the activation function conversion program (not shown) can program a specific activation function only with a negative exponential function.

For example, the activation function conversion program (not shown) can program each of a plurality of segments of a specific activation function with a corresponding approximation function.

For example, the activation function conversion program (not shown) can program a plurality of segments of a specific activation function with a set of approximation functions of different formulas.

For example, the programmed activation function to be processed in the vector function approximation unit 1537 and the scalar function approximation unit 1545 according to the first embodiment of the fourth example of the present disclosure may include at least one of Swish, Mish, Sigmoid, Hyperbolic Tangent (Tanh), Scaled Exponential Linear Unit (SELU), Gaussian Error Linear Unit (GELU), Softplus, Rectified Linear Unit (ReLU), Leaky ReLU, Maxout, Exponential Linear Unit (ELU), Hard Sigmoid, Hard Tanh, Bent Identity, ArcTan, Softsign, Sinusoidal Activation, S-shaped Rectified Linear Unit (SReLU), Parametric Rectified Linear Unit (PReLU), Logistic Activation, Radial Basis Function (RBF), Binary Step, Reciprocal, root mean square, and negative exponential. Each programmed activation function can be converted into a programmable parameter and provided to the neural processing unit 100.

FIG. 23 is a graph illustrating various cases of segmenting an activation function into a plurality of segments by the activation function programming method according to the first embodiment of the fourth example of the present disclosure.

Referring to (a) of FIG. 23, a specific activation function can be segmented to have 4 segments and a uniform width.

Referring to (b) of FIG. 23, a specific activation function can be segmented to have 4 segments and different widths.

Referring to (c) of FIG. 23, a specific activation function can be segmented to have 4 segments and different widths.

Referring to (d) of FIG. 23, a specific activation function can be segmented to have 6 segments and different widths.

The number of a plurality of segments and the width of each of the plurality of segments can be determined using segment data.

The activation function conversion program (not shown) may be configured to analyze the nonlinearity of an activation function and segment a plurality of segments with different widths. However, the present disclosure is not limited thereto.

The activation function conversion program (not shown) may be configured to analyze the nonlinearity of an activation function so that each of a plurality of segments is segmented with an optimal width. However, the present disclosure is not limited thereto.

In the present disclosure, an activation function can be implemented in various forms including characteristic sections. When segmenting an activation function into a plurality of segments, the number and width of the plurality of segments can be determined in various ways according to the various forms that the activation function has.

For example, various activation functions such as a swish function, a Mish function, a sigmoid function, a hyperbolic tangent (tanh) function, an SELU function, a GELU (Gaussian Error Linear Unit) function, a SOFTPLUS function, a ReLU function, a Leaky ReLU function, a Maxout function, an ELU function, etc., have various forms that are divided into a plurality of characteristic sections including (substantially) linear sections and/or nonlinear sections. Accordingly, when approximating a nonlinear activation function to be processable in hardware, if segmentation is performed considering these characteristic sections, that is, if the number and width of the segments are determined considering (substantially) linear sections, nonlinear sections, etc., the activation function can be approximated more efficiently corresponding to the characteristics of each activation function.

FIG. 24 is a diagram illustrating a function approximation circuit of a neural processing unit configured to process a programmed activation function according to a second embodiment of the fourth example of the present disclosure. The programmable function approximation circuit PAF according to the second embodiment of the fourth example of the present disclosure shown in FIG. 24 may correspond to the vector function approximation circuit V_PAF of the vector function approximation unit 1537 of FIG. 5 and the scalar function approximation circuit S_PAF of the scalar function approximation unit 1545 of FIG. 6. Hereinafter, for convenience of explanation, the vector function approximation circuit V_PAF and the scalar function approximation circuit S_PAF will be collectively referred to as the programmable function approximation circuit PAF to describe the second embodiment of the fourth example of the present disclosure. Specifically, the programmable function approximation circuit PAF according to the second embodiment of the fourth example of the present disclosure shown in FIG. 24 is an example of a circuit configured to process an activation function programmed as a linear function.

The programmable function approximation circuit PAF configured to process an activation function programmed as a linear function may be configured to comprise a plurality of comparators COMP0 to COMP(N-2), a selector SLT, a multiplier PAF_MUL, and an adder PAF_ADD. However, the present disclosure is not limited thereto, and it is also possible to configure the circuit in various ways to distinguish the regions of each segment. In addition, it is also possible for the programmable function approximation circuit PAF to be modified to further include additional circuit configurations to process an activation function by a programming method other than a linear function.

The coordinates of the start point and end point of the section of the plurality of segments are defined as a segment boundary value SB. That is, the section of each of the plurality of segments can be determined by the segment boundary values (SB0 to SB(N−2)). For example, in order to define the sections of N segments, N−1 segment boundary values (SB0 to SB(N−2)) may be used.

Each of the plurality of comparators COMP0 to COMP(N−2) compares input value X with each of the plurality of segment boundary values (SB0 to SB(N−2)). Accordingly, the section of the segment corresponding to the input value X among the sections of the plurality of segments can be determined through the comparison value output from each of the plurality of comparators COMP0 to COMP(N−2). The output value output from each of the plurality of comparators COMP0 to COMP(N−2) described above may be referred to as segment decision data (SDD). The selector SLT, according to the segment decision data SDD0 to SDD(N−2), outputs the slope A for the section of the segment of the programmable segment corresponding to the input value X selected from the plurality of slopes A0 to A(N−1) for the plurality of programmable segments. The selector SLT, according to the segment decision data SDD0 to SDD(N−2), outputs the offset B for the section of the segment of the programmable segment corresponding to the input value X selected from the plurality of offsets (B0 to B(N−1)) for the plurality of programmable segments.

When a specific segment is determined based on the segment decision data (SDD), the slope A and offset B of the determined segment can be output from the selector SLT. That is, the programmable parameter includes the slope A and offset B for each of the programmable segments. The slope A is multiplied by the input value X in the multiplier PAF_MUL, and the offset B is added to the output value of the multiplier PAF_MUL in the adder PAF_ADD. That is, the output of the multiplier PAF_MUL can be expressed as A×X, and the output of the adder PAF_ADD can be expressed as A×X+B.

Meanwhile, the operation of each of the plurality of comparators COMP0 to COMP(N−2) may be determined by each of a plurality of comparator enable signals Comp En 0 to Comp En(N−2). For example, even when the activation function conversion program (not shown) programs the same activation function, a first programmed activation function may be programmed to have 10 segments, and a second programmed activation function may be programmed to have 5 segments. Therefore, the programmable function approximation circuit PAF can control the number of comparators activated in the programmable function approximation circuit PAF differently according to each programmed activation function data, even for the same activation function. Therefore, the accuracy of the artificial neural network operation and the power consumption of the neural processing unit 100 may also vary depending on the programming. That is, it is also possible to provide a high-performance activation function operation function or a low-power activation function operation function for the same activation function according to the user's requirements.

Meanwhile, according to the maximum number of segment boundary values SB, the number of a plurality of comparators that receive them as input must also be varied.

For example, if the maximum number of segment boundary values SB is 10, at least 10 or more comparators may need to be provided. That is, the minimum number of comparators can be the maximum number of segment boundary values.

Accordingly, each of the plurality of comparators COMP0 to COMP(N−2) can determine its operation by each of a plurality of comparator enable signals Comp En 0 to Comp En(N−2). Therefore, by controlling the operation of unnecessary comparators according to the number of a plurality of segments, the power consumption of the neural processing unit 100 can be reduced.

However, due to hardware limitations, the number of comparators may be limited. Accordingly, the number of a plurality of segments for segmenting an activation function may be limited according to the number of comparators of the programmable function approximation circuit PAF.

Meanwhile, according to the first embodiment of the fourth example of the present disclosure, it is possible to distinguish between the linear section and the nonlinear section of an activation function, and it is possible to reduce the number of segments by providing a variable segment width while reducing the error value. Therefore, there is an advantage in that the gate count of the hardware of the programmable function approximation circuit PAF of the neural processing unit 100 can be reduced by reducing the number of comparators.

In addition, the activation function programming method according to the first embodiment of the fourth example of the present disclosure may be configured to program a specific activation function based on the information of the maximum number of supportable comparators.

Meanwhile, the selector SLT may be a multiplexer composed of a plurality of switching elements, but the configuration of the selector SLT can be changed in various ways. The programmed activation function operation unit of the programmable function approximation circuit PAF may mean a circuit unit configured to receive an input value X, a slope A, and an offset B and operate on an output value Y. The programmed activation function operation unit of the programmable function approximation circuit PAF may be configured to include at least one multiplier PAF_MUL and an adder PAF_ADD. The programmed activation function operation unit of the programmable function approximation circuit PAF may be a hard-wired circuit. In particular, if the programmable function approximation circuit PAF is a hard-wired circuit, the programmable function approximation circuit PAF can process the approximation operation in clock units by simply inputting the programmable parameters without complex instructions.

Meanwhile, the parameter storage and utilization method of the present disclosure has the following differences relative the conventional LUT method:

First, the essence of the stored data is different. A conventional LUT stores a 'final approximation result value' or a 'representative value for interpolation' for a specific input section. This is a passive data table whose purpose is to look up and retrieve a pre-calculated result value according to an input address. On the other hand, the programmable parameter stored in the present disclosure is not a result value, but an 'operation coefficient' (i.e., a programmable parameter) for controlling a hard-wired operation unit in real time.

Second, the role and operation method of the data are different. The conventional LUT method is a 'lookup-centric' operation that reads a value from memory. In contrast, the present disclosure is a 'computation-centric' architecture that directly performs a polynomial operation such as Ax+B by supplying the operation coefficients selected through the selector SLT in real time to a 'direct computation engine' composed of a multiplier PAF_MUL and an adder PAF_ADD. That is, the parameter storage unit of the present disclosure functions as an active 'coefficient register file' that dynamically configures the operation circuit, which is one of the core technical features of the present disclosure that is clearly distinguished from a conventional LUT.

In particular, the programmable parameters (A0 . . . A(N−1), B0 . . . B(N−1), and the like) have an important technical feature in that they are constant values pre-generated off-line through the deep learning-based improvement method described above.

That is, these parameters determined through learning are not changed at the runtime when the NPU performs the actual inference operation, and are pre-stored in a designated memory or coefficient register within the programmable function approximation circuit PAF. Therefore, when performing an operation, the NPU can immediately load and process these pre-optimized constant values without a complex calculation process, thereby eliminating additional operation overhead and increasing the speed of the function approximation operation.

In addition, the function approximation unit FuncApx of the present disclosure has a structure that can reuse one programmable function approximation circuit PAF in common for approximating several different kinds of dedicated functions (e.g., reciprocal, reciprocal square root, negative exponential, etc.). The effect of this structure can be enhanced when combined with the learning-based parameter generation method. The hardware is equipped with only a single, area-efficient programmable function approximation circuit PAF, and by selectively loading and using a pre-learned optimal set of constant parameters (i.e., a programmable parameter set) according to the function to be processed, it eliminates the inefficiency of designing a separate approximation circuit for each function and can secure high accuracy and flexibility at the same time while increasing the utilization of hardware resources.

Meanwhile, the means for storing the programmable parameters (slope A, offset B, etc.) used by the PAF circuit of the present disclosure has a fundamental difference from a conventional lookup table (LUT) in its purpose and operation method.

A conventional LUT is a passive memory table that stores a 'final approximation result value' for a specific input section and looks up the corresponding result value according to an input address. In contrast, the means for storing parameters in the present invention functions as an active coefficient register file or an equivalent on-chip memory. That is, the value stored here is not a final result value, but an 'operation coefficient' for controlling a hard-wired operation unit (multiplier, adder) in real time. The selector SLT reads the operation coefficients corresponding to the determined segment from this register file and supplies them to a 'direct computation engine'. Therefore, this circuit is a 'computation-centric' architecture that directly performs an arithmetic operation such as Ax+B on an input value to calculate a result, which is clearly distinguished from the 'lookup-centric' conventional LUT method.

FIG. 25 is a diagram illustrating a function approximation circuit of a neural processing unit configured to process a programmed activation function according to a third embodiment of the fourth example of the present disclosure. The programmable function approximation circuit PAF according to the third embodiment of the fourth example of the present disclosure shown in FIG. 25 may correspond to the vector function approximation circuit V_PAF of the vector function approximation unit 1537 of FIG. 5 and the scalar function approximation circuit S_PAF of the scalar function approximation unit 1545 of FIG. 6. Hereinafter, for convenience of explanation, the vector function approximation circuit V_PAF and the scalar function approximation circuit S_PAF will be collectively referred to as the programmable function approximation circuit PAF to describe the third embodiment of the fourth example of the present disclosure.

In describing the programmable function approximation circuit PAF of FIG. 25, duplicate descriptions with the programmable function approximation circuit PAF of FIG. 24 may be omitted for convenience of explanation. Specifically, the programmable function approximation circuit PAF according to the third embodiment of the fourth example of the present disclosure shown in FIG. 25 is an example of a circuit configured to process an activation function programmed as a quadratic function. Accordingly, the coefficients (A, B, C) for the programmable segment described above may include a coefficient of a quadratic term A, a coefficient of a linear term B, and an offset C.

The programmable function approximation circuit PAF according to the third embodiment of the fourth example of the present disclosure may be configured to comprise a plurality of comparators COMP0 to COMP(N−2), a selector SLT, a plurality of multipliers (PAF_MUL1, PAF_MUL2, PAF_MUL3), and a plurality of adders (PAF_ADD1, PAF_ADD2).

Each of the plurality of comparators COMP0 to COMP (N−2) compares an input value X calculated in at least one processing core P_CORE with each of a plurality of segment boundary values (SB0 to SB(N−2)).

Accordingly, the section of the segment to which the input value X belongs among the sections of the plurality of segments can be determined through the output value output from each of the plurality of comparators COMP0 to COMP (N−2).

Meanwhile, the operation of each of the plurality of comparators COMP0 to COMP(N−2) may be determined by each of a plurality of comparator enable signals Comp En 0 to Comp En(N−2).

Then, the selector SLT, according to the segment decision data SDD0 to SDD(N−2), outputs the coefficients (A, B, C) for the programmable segment corresponding to the section of the segment to which the input value X belongs, from among the coefficients (A0 to A(N−1), B0 to B(N−1), C0 to C(N−1)) for the plurality of programmable segments.

Specifically, a pre-stored coefficient set or coefficient register provides the coefficient of the quadratic term A0 to A(N−1), the coefficient of the linear term (B0 to B(N−1)), and the offset C0 to C(N−1) for each of the plurality of programmable segments to the selector SLT.

Then, the selector SLT can determine the section of the segment to which the input value X belongs among the sections of the plurality of segments according to the segment decision data SDD0 to SDD(N−2) output from each of the plurality of comparators COMP0 to COMP(N−2).

Then, the selector SLT can output the coefficient of the quadratic term A, the coefficient of the linear term B, and the offset C for the programmable segment corresponding to the section of the determined segment, from among the coefficient of the quadratic term A0 to A(N−1), the coefficient of the linear term (B0 to B(N−1)), and the offset C0 to C(N−1) for the plurality of programmable segments.

Accordingly, the selector SLT can output the coefficient of the quadratic term A, the coefficient of the linear term B, and the offset C for the programmable segment corresponding to the section of the segment to which the input value X belongs.

The programmed activation function operation unit of the programmable function approximation circuit PAF may mean a circuit unit configured to receive an input value X, a coefficient of a quadratic term A, a coefficient of a linear term B, and an offset C and operate on an output value Y.

The programmed activation function operation unit of the programmable function approximation circuit PAF may be configured to comprise a plurality of multipliers (PAF_MUL1, PAF_MUL2, PAF_MUL3) and a plurality of adders (PAF_ADD1, PAF_ADD2) to process a quadratic function or a linear function.

The programmed activation function operation unit of the programmable function approximation circuit PAF may be a hard-wired circuit.

The plurality of multipliers of the programmed activation function operation unit may include a first multiplier PAF_MUL1, a second multiplier PAF_MUL2, and a third multiplier PAF_MUL3.

The first multiplier PAF_MUL1 multiplies the input value X by the coefficient of the quadratic term A for the programmable segment corresponding to the section of the segment to which the input value X belongs.

Specifically, the first multiplier PAF_MUL1 multiplies the input value X calculated in at least one processing core P_CORE by the coefficient of the quadratic term A for the programmable segment output from the selector SLT.

Accordingly, the first multiplier PAF_MUL1 can output by multiplying the coefficient of the quadratic term A for the programmable segment by the input value X. That is, the output of the first multiplier PAF_MUL1 can be expressed as A×X.

Then, the second multiplier PAF_MUL2 multiplies the output value output from the first multiplier PAF_MUL1 by the input value X.

Specifically, the second multiplier PAF_MUL2 multiplies the input value X calculated in at least one processing core P_CORE by the output value output from the second multiplier PAF_MUL2.

Accordingly, the output of the second multiplier PAF_MUL2 can be expressed as $A \times X^2$. However, the above-described configuration is only one example for implementing $A \times X^2$, and it is also possible to be modified and implemented through various circuit combinations.

The third multiplier PAF_MUL3 multiplies the input value X by the coefficient of the linear term B for the programmable segment corresponding to the section of the segment to which the input value X belongs.

Specifically, the third multiplier PAF_MUL3 multiplies the input value X calculated in at least one processing core P_CORE by the coefficient of the linear term B for the programmable segment output from the selector SLT.

Accordingly, the third multiplier PAF_MUL3 can output by multiplying the coefficient of the linear term B for the programmable segment by the input value X. That is, the output of the third multiplier PAF_MUL3 can be expressed as B×X.

The plurality of adders may include a first adder PAF_ADD1 and a second adder PAF_ADD2.

The first adder PAF_ADD1 adds the output value of the second multiplier PAF_MUL2 to the output value of the third multiplier PAF_MUL3.

Specifically, the first adder PAF_ADD1 can output the sum of the quadratic term and the linear term of each of the plurality of programmable segments composed of a quadratic term. That is, the output of the first adder PAF_ADD1 can be expressed as $A \times X^2 + B \times X$.

Then, the second adder PAF_ADD2 adds the offset C for the programmable segment corresponding to the section of the segment to which the input value X belongs to the output value of the first adder PAF_ADD1.

Specifically, the adder PAF_ADD adds the offset C for the programmable segment to the sum of the quadratic term and the linear term of the programmable segment composed of a quadratic term. That is, the output of the second adder PAF_ADD2 can be expressed as $A \times X^2 + B \times X + C$.

Accordingly, the adder PAF_ADD can output an activation value to which an activation function programmed as a quadratic function is applied to the operation value that is the input value X.

According to the above configuration, the programmable function approximation circuit PAF operates to be able to process a quadratic polynomial.

Meanwhile, the operation of the second multiplier PAF_MUL2, the third multiplier PAF_MUL3, and the second adder PAF_ADD2 may be controlled by a first enable signal EN1.

Specifically, when the second multiplier PAF_MUL2, the third multiplier PAF_MUL3, and the second adder PAF_ADD2 do not operate due to the first enable signal EN1, the operation is as described below.

The first multiplier PAF_MUL1 multiplies the input value X by the coefficient of the quadratic term A for the programmable segment corresponding to the section of the segment to which the input value X belongs.

Specifically, the first multiplier PAF_MUL1 multiplies the input value X calculated in at least one processing core 120 by the coefficient of the quadratic term A for the programmable segment output from the selector SLT.

Accordingly, the first multiplier PAF_MUL1 can output by multiplying the coefficient of the quadratic term A for the programmable segment by the input value X. That is, the output of the first multiplier PAF_MUL1 can be expressed as A×X.

Then, since the second multiplier PAF_MUL2 and the third multiplier PAF_MUL3 do not operate, the output of the first multiplier PAF_MUL1 is input to the first adder PAF_ADD1 as it is. That is, the operator deactivated by the first enable signal EN1 can be bypassed.

Then, the first adder PAF_ADD1 adds the coefficient of the linear term B for the programmable segment corresponding to the section of the segment to which the input value X belongs to the value obtained by multiplying the coefficient of the quadratic term A for the programmable segment by the input value X.

Specifically, the first adder PAF_ADD1 adds the coefficient of the linear term B for the programmable segment to the value obtained by multiplying the coefficient of the quadratic term A for the programmable segment by the input value X. That is, the output of the first adder PAF_ADD1 can be expressed as A×X+B.

Then, since the second adder PAF_ADD2 does not operate, the output of the first adder PAF_ADD1 is output as it is. That is, the operator deactivated by the first enable signal EN1 can be bypassed.

That is, the first adder PAF_ADD1 can output an activation value to which an activation function programmed as a linear function is applied to the operation value that is the input value X.

According to the above configuration, the programmable function approximation circuit PAF operates to be able to process a linear polynomial.

As described above, some configurations of the plurality of multipliers and the plurality of adders can be controlled by the first enable signal EN1. Accordingly, according to the first enable signal EN1, the programmable function approximation circuit PAF can be driven not only when each of the programmable segments is a quadratic polynomial, but also when each of the programmable segments is a linear polynomial.

To elaborate, the programmable function approximation circuit PAF pipelined with at least one processing core 120 according to an example of the present disclosure may also be configured as a hard-wired circuit configured to implement both an activation function programmed as a quadratic function and a linear function.

Therefore, there is an advantage in that various cases of PAF can be processed with one programmable function approximation circuit PAF.

Meanwhile, the programmable function approximation circuit PAF may include not only a plurality of comparators COMP0 to COMP(N–2), a selector SLT, a plurality of multipliers (PAF_MUL1, PAF_MUL2, PAF_MUL3), and a plurality of adders (PAF_ADD1, PAF_ADD2), but also a logarithmic operator.

Figure 26:
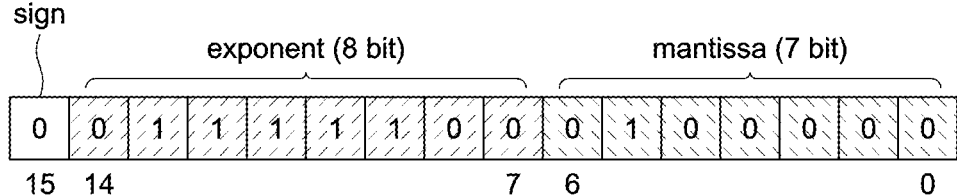
FIG. 26 is a diagram illustrating an example of a number system processed in a special function unit of a neural processing unit, according to one embodiment.

FIG. 26 is a diagram illustrating an example of a number system processed in a special function unit of a neural processing unit that may be applied to examples of the present disclosure. The special function unit 150 of the neural processing unit 100 according to examples of the present disclosure is designed to be processed with at least one floating-point number system. For example, the special function unit 150 may be designed to process floating-point numbers. Referring to FIG. 26, a floating-point number is expressed in the brain floating 16 format. Referring to FIG. 26, the BF16 format floating-point number system comprises a sign bit S, an exponent bit E, and a mantissa bit M.

However, the number system of the special function unit 150 according to examples of the present disclosure may also use the IEEE standard 754, and other number systems may be applied for the operation efficiency, memory usage reduction, and power consumption reduction of the special function unit 150. However, the examples of the present disclosure are not limited thereto, and dynamic floating-point, variable precision floating-point (VPFP), custom floating-point (CFP), flexible floating-point (FFP), etc., may be applied. Therefore, the bit width allocation of the exponent part and the bit width allocation of the mantissa part may be varied according to the number system supported by the special function unit 150 of the neural processing unit 100.

For example, when the special function unit 150 according to examples of the present disclosure is configured to use the FP32 number system, the special function unit 150 is configured to recognize the 31st bit of the weight parameter, input parameter, and output parameter as the sign bit S, the 23rd bit to the 30th bit as the exponent bit E, and the 0th bit to the 22nd bit as the mantissa bit M.

For example, when the special function unit 150 according to examples of the present disclosure is configured to use the FP16 number system, the special function unit 150 is configured to recognize the 15th bit of the weight parameter, input parameter, and output parameter as the sign bit S, the 10th bit to the 14th bit as the exponent bit E, and the 0th bit to the 9th bit as the mantissa bit M. For example, when the special function unit 150 according to examples of the present disclosure is configured to use the brain floating 16 (BF16) number system, the special function unit 150 is configured to recognize the 15th bit of the weight parameter, input parameter, and output parameter as the sign bit S, the 7th bit to the 14th bit as the exponent bit E, and the 0th bit to the 6th bit as the mantissa bit M. This can be expressed by Equation 6.

$$x = (-1)^s \times m \times 2^e \qquad\qquad \text{Equation 6}$$

where x is the input in floating-point format, s means the sign of the input x, e means the exponent part of the input x, and m denotes the mantissa part of the input x. The bias of BF16 is 127, and the range of the actual value of the exponent part is –126 to 127. The actual exponent value can be derived by subtracting the bias from the stored exponent.

Figure 27:
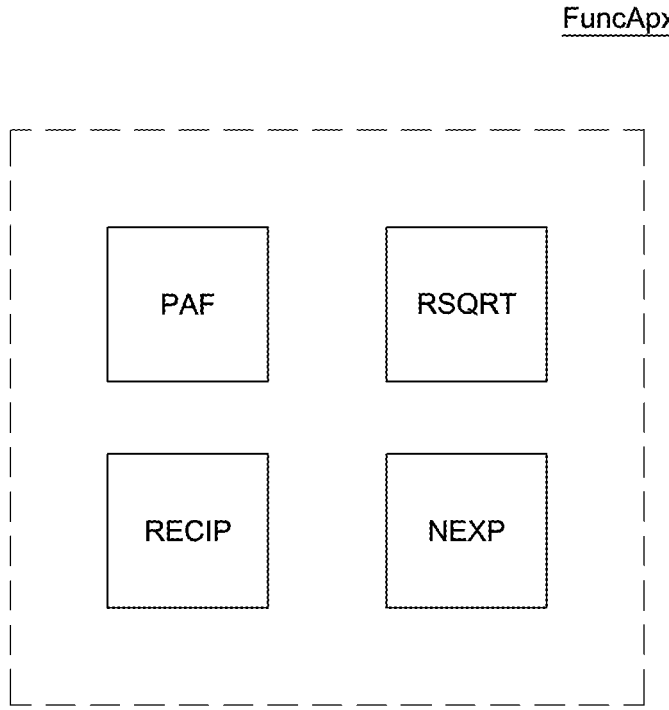
FIG. 27 is a block diagram illustrating a function approximation unit according to a fourth embodiment of the fourth example of the present disclosure.

FIG. 27 is a block diagram illustrating a function approximation unit according to a fourth embodiment of the fourth example of the present disclosure. A function approximation unit FuncApx according to the fourth embodiment of the fourth example of the present disclosure will be described with reference to FIG. 5, FIG. 6, FIG. 24, FIG. 25, and FIG. 27.

Referring to FIG. 27, the function approximation unit FuncApx according to the fourth embodiment of the fourth example of the present disclosure comprises a programmable function approximation circuit PAF, a reciprocal function circuit RECIP, a reciprocal square root function circuit RSQRT, and a negative exponential function circuit NEXP. The circuits are individual circuits configured to independently process the operations of the functions for the attention score operation of an artificial intelligence model.

The function approximation unit FuncApx of FIG. 27 according to the fourth embodiment of the fourth example of the present disclosure corresponds to the vector function approximation unit V_FuncApx of FIG. 5 or the scalar function approximation unit S_FuncApx of FIG. 6. The programmable function approximation circuit PAF of FIG. 24 according to the fourth embodiment of the fourth example of the present disclosure may correspond to the programmable function approximation circuit PAF of FIG. 25 or the programmable function approximation circuit PAF of FIG. 27. The reciprocal function circuit RECIP of FIG. 27 according to the fourth embodiment of the fourth example of the present disclosure corresponds to the vector reciprocal function circuit V_RECIP of FIG. 5 or the scalar reciprocal function circuit S_RECIP of FIG. 6. The reciprocal square root function circuit RSQRT of FIG. 27 according to the fourth embodiment of the fourth example of the present disclosure corresponds to the vector reciprocal square root function circuit V_RSQRT of FIG. 5 or the scalar reciprocal square root function circuit S_RSQRT of FIG. 6. The negative exponential function circuit NEXP of FIG. 27 according to the fourth embodiment of the fourth example of the present disclosure corresponds to the vector negative exponential function circuit V_NEXP of FIG. 5 or the scalar negative exponential function circuit S_NEXP of FIG. 6.

Each of the programmable function approximation circuit PAF, the reciprocal function circuit RECIP, the reciprocal square root function circuit RSQRT, and the negative exponential function circuit NEXP is a respective hard-wired operation circuit. That is, when each of the circuits receives an input parameter, it can process the operation very quickly through the hard-wired operation circuit without complex instructions. That is, the function approximation unit FuncApx activates at least one circuit corresponding to the function to be processed. Subsequently, when the function approximation unit FuncApx provides an input parameter to the activated circuit, the output of the function is calculated along the pipeline of the calculation circuit without complex instruction control. That is, each of the programmable function approximation circuit PAF, the reciprocal function circuit RECIP, the reciprocal square root function circuit RSQRT, and the negative exponential function circuit NEXP is a dedicated operation circuit for the function corresponding to each circuit. To elaborate, a hard-wired operation circuit can only process a predefined operation, and since its versatility is low, it cannot process other operations. However, each of the programmable function approximation circuit PAF, the reciprocal function circuit RECIP, the reciprocal square root function circuit RSQRT, and the negative exponential function circuit NEXP can process a predefined operation quickly and with low power. In particular, since all of the operation circuits can be used for calculating the attention score, a transformer-based artificial intelligence model can be operated quickly.

For example, the function approximation unit FuncApx may be designed to process a function approximation operation by activating only the programmable function approximation circuit PAF. For example, the programmable function approximation circuit PAF can process at least one of Swish, Mish, Sigmoid, Hyperbolic Tangent (Tanh), Scaled Exponential Linear Unit (SELU), Gaussian Error Linear Unit (GELU), Softplus, Rectified Linear Unit (ReLU), Leaky ReLU, Maxout, Exponential Linear Unit (ELU), Hard Sigmoid, Hard Tanh, Bent Identity, ArcTan, Softsign, Sinusoidal Activation, S-shaped Rectified Linear Unit (SReLU), Parametric Rectified Linear Unit (PReLU), Logistic Activation, Radial Basis Function (RBF), Binary Step, Reciprocal, root mean square, and negative exponential by receiving programmable parameters.

Furthermore, the function approximation unit FuncApx may be designed to more precisely process a corresponding reciprocal function, square root function, and negative exponential function by activating one of the reciprocal function circuit RECIP, the reciprocal square root function circuit RSQRT, and the negative exponential function circuit NEXP while activating the programmable function approximation circuit PAF.

The feature of the function approximation unit FuncApx described above lies in a hybrid architecture for achieving both versatility and efficiency. That is, the function approximation unit FuncApx is equipped with both a programmable function approximation circuit PAF to flexibly respond to new nonlinear functions with various forms, such as GELU and Swish, or those that will appear in the future, and a dedicated function circuit for processing functions that are frequently used in neural network operations and whose forms are fixed, such as reciprocal RECIP, reciprocal square root RSQRT, and negative exponential NEXP, with the highest speed and efficiency.

When the controller 110 receives an instruction indicating the type of function to be processed, it selectively activates either the PAF circuit or a specific dedicated function circuit accordingly. Other circuit blocks that are not activated can be cut off from power supply through power gating or clock gating to reduce unnecessary power consumption.

In addition, instead of each dedicated function circuit (RECIP, RSQRT, NEXP) having its own approximation operation circuit, a single PAF circuit can be reused as a shared operation unit. Each dedicated function circuit preprocesses an input value according to its own function characteristics (e.g., mantissa normalization), and then delivers the result to the shared PAF circuit to delegate the approximation operation. The control unit may provide a pre-learned set of programmable parameters (P_PARA-1, P_PARA-2, etc.) to the PAF circuit according to the corresponding function.

This structure can provide the core effect of the present disclosure of maintaining high accuracy and performance through a preprocessing circuit and parameters improved for each function, while dramatically reducing the hardware area compared to a method of implementing a separate complex approximation circuit for each function.

Figure 28:
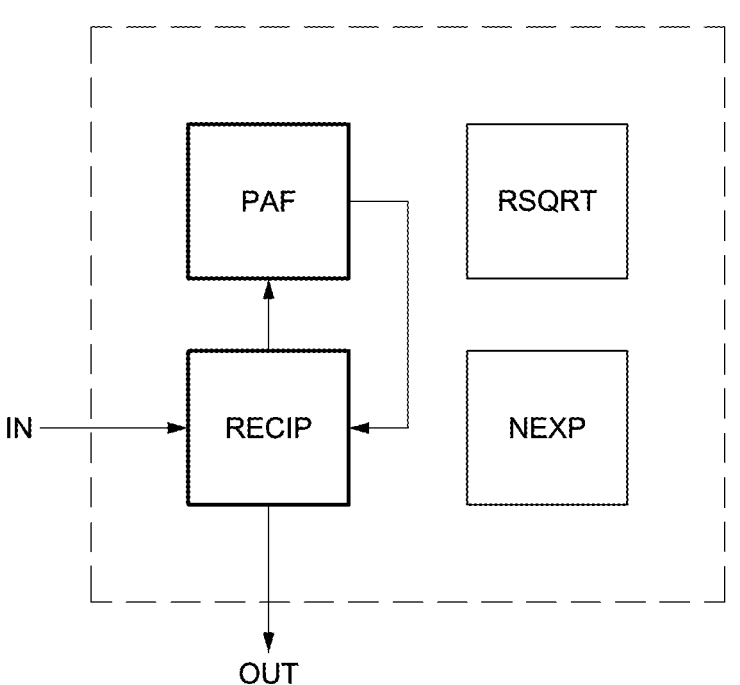
FIG. 28 is a block diagram illustrating a reciprocal function processing circuit according to a fifth embodiment of the fourth example of the present disclosure.
Figure 29:
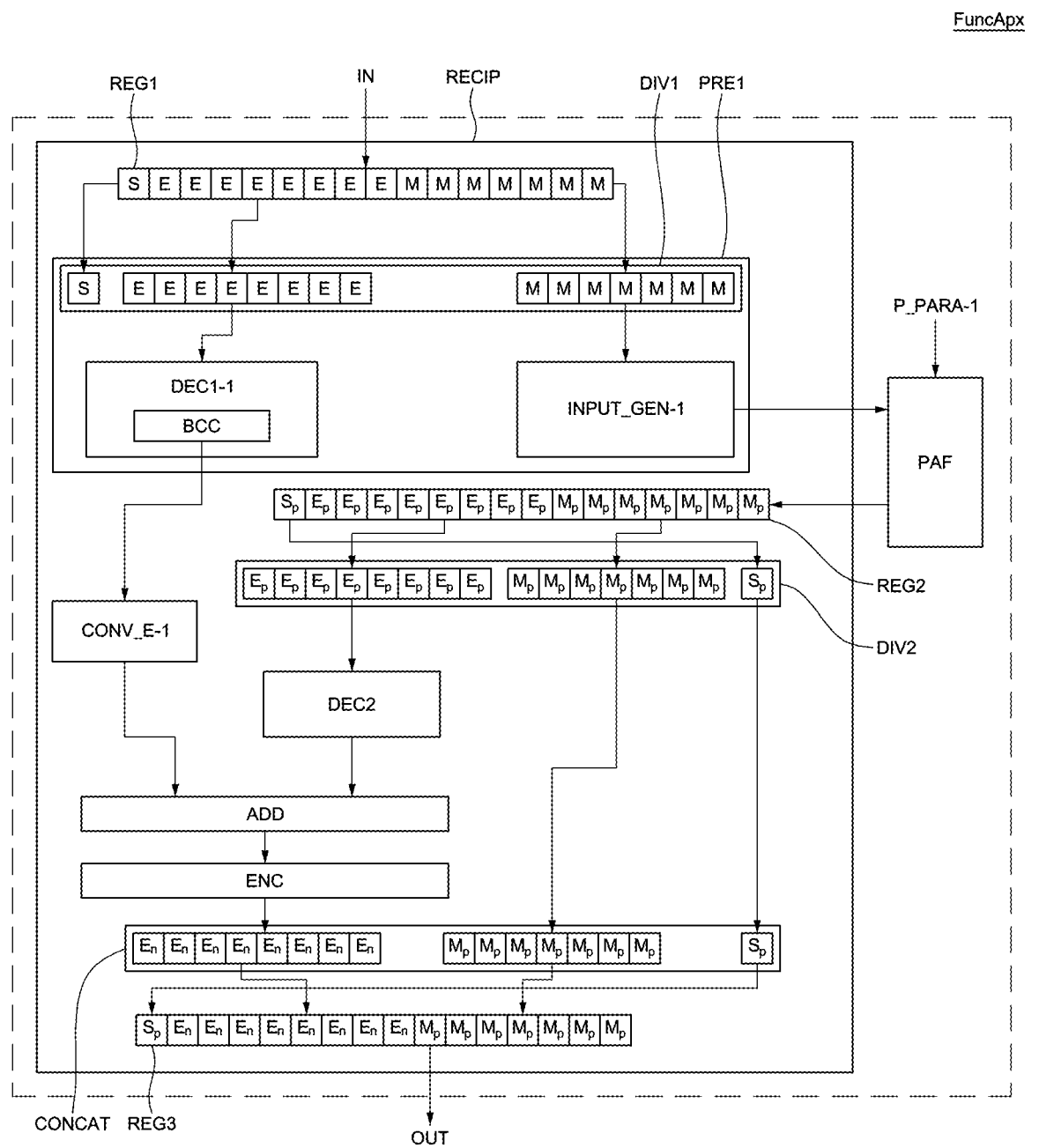
FIG. 29 is a diagram illustrating a detailed configuration of the reciprocal function processing circuit according to the fifth embodiment of the fourth example of the present disclosure.

FIG. 28 is a block diagram illustrating a reciprocal function processing circuit according to a fifth embodiment of the fourth example of the present disclosure. The reciprocal function processing circuit according to the fifth embodiment of the fourth example of the present disclosure is a hardware circuit configuration for a reciprocal operation implemented within the function approximation unit FuncApx of the NPU. The reciprocal function processing circuit uses the reciprocal function circuit RECIP and the programmable function approximation circuit PAF within the function approximation unit FuncApx to perform a reciprocal operation. FIG. 28 illustrates the overall configuration of the function approximation unit FuncApx including the reciprocal function processing circuit RECIP, and FIG. 29 illustrates the detailed configuration of the reciprocal function processing circuit RECIP.

Referring to FIG. 28, the NPU activates the programmable function approximation circuit PAF and the reciprocal function circuit RECIP within the function approximation unit FuncApx to perform a reciprocal function process. The function approximation unit FuncApx is configured such that the input and output terminals of each circuit are electrically connected so that the programmable function approximation circuit PAF and the reciprocal function circuit RECIP can communicate with each other.

As shown in FIG. 28, the data path for the reciprocal function process is connected to pass input from the input value IN to the reciprocal function circuit RECIP. The output of the reciprocal function circuit RECIP is connected to the programmable function approximation circuit PAF. The output of the programmable function approximation circuit PAF sent back to one of the input terminals of the reciprocal function circuit RECIP. In this way, the reciprocal function processing circuit is set to process a reciprocal function calculation by performing a repetitive process between the reciprocal function circuit RECIP and the programmable function approximation circuit PAF. The final output of the reciprocal function circuit RECIP output as an output value OUT.

In an embodiment, when the reciprocal function circuit RECIP and the programmable function approximation circuit PAF are activated, other dedicated operation circuits within the function approximation unit FuncApx, such as the reciprocal square root function circuit RSQRT and the negative exponential function circuit NEXP, may be deactivated. The function approximation unit FuncApx is configured to reduce the power consumption of the deactivated circuit using at least one of a power gating function, a clock gating function, and a register retention function.

Embodiments overcome the inefficiency of a method of approximating a function by sequentially executing a plurality of instructions. Unlike the prior art, which causes latency by involving a separate instruction for each step such as preprocessing, approximation, and post-processing, the dedicated function circuits of the present disclosure (see FIG. 29, 31, 33) are implemented as a hard-wired pipeline that is triggered by a single instruction and operates autonomously.

Specifically, the controller 110, for example, delivers a single instruction "perform a reciprocal operation on input value A" to the function approximation unit FuncApx. The control logic of the function approximation unit interprets the corresponding instruction and activates the reciprocal function circuit RECIP. Once the input value A enters the pipeline of the reciprocal function circuit, all subsequent multi-stage operations proceed sequentially and autonomously according to the hard-wired connection of the internal circuit and the pipeline registers (REG1, REG2, REG3), without receiving further instructions from the control unit. The multi-stage operation may include, among others, (1) a preprocessing step of decomposing the input value into an exponent part and a mantissa part, (2) an approximation operation step using a shared PAF circuit, and (3) a post-processing step of recombining the results.

When all pipeline stages are completed, the final result value is output, and this entire process is completed based on a single instruction. This reduces the overhead associated with instruction fetch and decode, and enables the completion of complex function operations within a few clock cycles, thereby dramatically improving the throughput and performance of the neural processing unit.

FIG. 29 is a block diagram illustrating a detailed configuration of the reciprocal function processing circuit. The reciprocal function processing circuit is a combination of dedicated operation circuits designed to generate an output value OUT representing an approximate reciprocal value of an input value IN in a floating-point format. The input value IN has a floating-point format composed of a sign bit S, an exponent bit E, and a mantissa bit M, and may have a BF16 format as one example, but the present disclosure is not limited thereto. The reciprocal function processing circuit obtains a reciprocal value by separating and individually processing the exponent bit E and the mantissa bit M constituting the input value IN, and then combining the processed results.

The reciprocal function processing circuit is designed to have a pipeline structure for hardware acceleration, and for this purpose, it is configured to include registers (input register REG1, intermediate register REG2, output register REG3) for storing the intermediate results of each processing stage. Each of the registers (REG1, REG2, REG3) may be configured to accommodate the bit width of the corresponding number format of the input data. For example, if the input data is BF16, the corresponding register may be configured as a 16-bit buffer. This is in contrast to conventional approximation methods that are implemented by relying on the sequential execution of computer program instructions, thereby involving a large number of instructions and operation cycles.

The reciprocal function processing circuit is configured to include at least the following components. The input register REG1 is configured to function as an input buffer that temporarily stores an input value IN input from the outside. The input register REG1 is arranged to correspond to the input of the first stage of the pipeline.

The preprocessing circuit PRE1 is configured to convert the input value IN stored in the input register REG1 into a form suitable for reciprocal function calculation. The preprocessing circuit PRE1 is configured to include a first decomposition circuit DIV1, a first decoder DEC1-1, and an input value generation circuit INPUT_GEN-1. The first decomposition circuit DIV1 is configured to separate the sign bit S, the exponent bit E, and the mantissa bit M from the input value IN. The preprocessing circuit PRE1 is configured to convert the input value IN of the input register REG1 into a form suitable for reciprocal function approximation to reduce approximation error.

The first decoder DEC1-1 is configured to receive the exponent bit E separated from the first decomposition circuit DIV1, decode it into an integer data form, and subtract a pre-stored bias value from the exponent bit E using a built-in binary calculation circuit BCC. The binary calculation circuit BCC is configured to process at least binary subtraction. Through this process, the first decoder DEC1-1 is configured to prepare the actual value of the input exponent bit E (i.e., an integer-form exponent value with the bias removed) to be utilized in subsequent exponent conversion and scaling operations.

The input value generation circuit INPUT_GEN-1 is configured to receive the mantissa bit M separated from the first decomposition circuit DIV1 and generate a value in a floating-point format that can be processed by the programmable function approximation circuit PAF.

Specifically, the input value generation circuit INPUT_GEN-1 is configured to generate an input value in a floating-point number format by combining the mantissa bit M with a preset exponent bit and a sign bit (0), and this mantissa M is normalized to a 1.M form (e.g., BF16 standard) in a floating-point format (e.g., $x=(-1)^S\times M\times2^{(E-bias)}$) to represent the significant digits.

In this way, the input value generation circuit INPUT_GEN-1 uses the mantissa bit M extracted from the first decomposition circuit DIV1 to convert it into a floating-point value mapped to the range [1, 2), which the programmable function approximation circuit PAF can use for operation. The converted value is connected to the input of the programmable function approximation circuit PAF, and consequently, the mantissa bit M of the generated floating-point number is always placed in the range of $1 \leq M < 2$. This is to reduce the approximation error in the subsequent programmable function approximation circuit PAF by shifting the input range, which is the target of the function approximation, to a domain where the variation of the function value is small.

The exponent conversion circuit CONV_E-1 is configured to receive the decoded exponent bit E from the first decoder DEC1-1 and output a value with its sign converted to negative. The output of the exponent conversion circuit CONV_E-1 is connected to the first input of an adder ADD. Therefore, the exponent conversion circuit CONV_E-1 can efficiently implement the mathematical property of the reciprocal operation ($\frac{1}{2}^E=2^{-E}$) in hardware.

The programmable function approximation circuit PAF is configured to receive the value in the converted floating-point format from the input value generation circuit INPUT_GEN-1 and execute a programmed activation function to generate an approximate result of the reciprocal function. The programmable function approximation circuit PAF uses a programmable parameter P_PARA-1 that approximates the reciprocal function corresponding to a specific input section of 1 or more and less than 2.

Meanwhile, the programmable parameter P_PARA-1 may be a value derived through deep learning-based training, according to an embodiment of the present disclosure. Specifically, the programmable parameter P_PARA-1 may be a coefficient derived by training a small-scale artificial neural network improved for expressing a piecewise linear function to approximate a target function. In the case of the reciprocal function circuit RECIP, since the mantissa of the input is always normalized to a narrow range of [1, 2) during the preprocessing process, the target function for training can be set as f(x)=1/x, and its domain of definition as x∈[1, 2).

The artificial neural network is trained to reduce the error with the target function within such a predictable section with small variation. Once training is complete, an desirable set of programmable parameters, including a segment boundary, the width of each segment, and the slope A and offset B of the corresponding section, in a form that can be used by the programmable function approximation circuit PAF in hardware, can be generated from the learned weights and biases of the corresponding neural network. In this way, it is possible to derive effective parameters that reduces the approximation error of the reciprocal function within limited hardware resources.

Among others, this process has the advantage of being able to derive a programmable parameter P_PARA-3 that performs the most precise approximation within a given hardware resource by enabling hardware-software co-optimization that reflects the hardware constraints of the programmable function approximation circuit PAF (e.g., the maximum number of comparators) in the learning process. That is, the programmable function approximation circuit PAF receives a programmable parameter P_PARA-1 that programs a reciprocal function. The programmable function approximation circuit PAF effectively reduces the approximation error compared to the case of approximating over a wide input range by performing function approximation in the range of 1 or more and less than 2, where the function value variation is small. The programmable function approximation circuit PAF may utilize fixed-point number operations to perform function approximation internally, and in this case, it may include a process of converting a floating-point input to fixed-point and converting it back to a floating-point format after the operation. The output of the programmable function approximation circuit PAF is connected to be transmitted to an intermediate register REG2. A detailed description of processing a programmed activation function using the programmable function approximation circuit PAF is described with reference to FIG. 21 to FIG. 25.

The second decomposition circuit DIV2 is configured to receive the output value (approximation result) of the programmable function approximation circuit PAF through the intermediate register REG2 and separate the sign bit $S_p$, exponent bit $E_p$, and mantissa bit $M_p$ of the operation result. The bits ($S_p$, $M_p$) separated from the second decomposition circuit DIV2 are transmitted to a concatenation circuit CONCAT via the intermediate register REG2, and the exponent bit $E_p$ is connected to be transmitted to a second decoder DEC2.

The second decoder DEC2 receives the exponent bit $E_p$ separated from the second decomposition circuit DIV2, decode it into an integer data form, and then subtract a bias. The integer value of the bias is 127. By decoding, the actual value of the exponent bit $E_p$ (i.e., an integer-form fixed-point exponent value with the bias removed) can be expressed. That is, the second decoder DEC2 decodes the exponent bit $E_p$ of the reciprocal square root function approximated in the programmable function approximation circuit PAF to its actual value by subtracting the bias. The output of the second decoder DEC2 may be connected to the second input unit of the adder ADD.

The adder ADD obtains an exponent bit of an integer value with the bias removed by adding the values received from the first input unit and the second input unit. The adder ADD is a circuit that receives two binary input values and performs a binary addition operation. That is, by adding the decoded exponent bits input to each of the first input unit and the second input unit of the adder ADD, the output of the adder ADD restores to the initial range of the input value IN. That is, the exponent of the final result can be determined by subtracting the offset (the difference between the input exponent and the bias) obtained from the initial input exponent from the exponent obtained through the reciprocal calculation of the mantissa part. The output of the adder ADD is connected to an encoder ENC, and the output of the adder ADD is configured to be transmitted to the encoder ENC.

The encoder ENC generates an encoded exponent bit $E_n$ by adding a predefined bias value (e.g., 127) back to the unbiased exponent value (Unbiased Exponent), which is the output of the adder ADD. That is, the encoder ENC performs the function of restoring the exponent bit to a format suitable for the floating-point system by adding back the bias that was removed during the decoding process. The output of the encoder ENC is connected to the concatenation circuit CONCAT.

The concatenation circuit CONCAT combines the encoded exponent bit $E_n$ input from the encoder ENC and the sign bit $S_p$ and mantissa bit $M_p$ of the second decomposition circuit DIV2 input through the intermediate register REG2 in a preset order. In this way, a bit string in a floating-point format corresponding to the final approximation value of the corresponding function is generated. The output of the concatenation circuit CONCAT is connected to an output register REG3.

The output register REG3 is functions as an output buffer that stores the output of the concatenation circuit CONCAT. The output register REG3 is arranged as the final stage of the pipeline.

The reciprocal function calculation process can be explained by three calculation paths. The first calculation path is configured to include circuits (e.g., the exponent extraction part of the first decomposition circuit DIV1, the first decoder DEC1-1) and the exponent conversion circuit CONV_E-1 of the preprocessing circuit PRE1 that decode the exponent bit E extracted from the input value IN and perform a reciprocal transformation on the decoded value. The output of this path is provided to the first input of the adder ADD.

The second calculation path includes circuits (e.g., the mantissa processing part of the preprocessing circuit PRE1 (e.g., the mantissa extraction part of the first decomposition circuit DIV1, the input value generation circuit INPUT_GEN-1), the programmable function approximation circuit PAF, the second decomposition circuit DIV2, and the second decoder DEC2) that convert the mantissa bit M of the input value IN into an input for the programmable function approximation circuit PAF, calculate an approximate value of the reciprocal function in the programmable function approximation circuit PAF, separate the exponent bit $E_p$ and mantissa bit $M_p$ of the approximate value, and decode the exponent bit $E_p$. The output of the second decoder DEC2 is provided to the second input of the adder ADD, and the output ($S_p$, $M_p$) of the second decomposition circuit DIV2 is provided to the concatenation circuit CONCAT via the intermediate register REG2.

The third calculation path includes circuits (e.g., the adder ADD, the encoder ENC, and the concatenation circuit CONCAT) arranged to calculate the output value OUT of the input value IN (i.e., the reciprocal value of the input value) by adding the output value of the first calculation path (i.e., the output value of the exponent conversion circuit CONV_E-1) and the output value of the second calculation path (i.e., the output value of the second decoder DEC2), and combining the encoded exponent bit $E_n$ of the added value, the mantissa bit $M_p$ of the linear function approximate value, and the sign bit $S_p$ in a preset order.

The reciprocal function processing circuit has a pipeline structure that arranges registers (input register REG1, intermediate register REG2, output register REG3) between each operation stage. The pipeline structure provides a hardware acceleration effect that greatly improves the total number of operations that can be processed per unit of time (throughput) while maintaining the completion time (latency) of individual operations, by allowing several reciprocal calculation tasks to be processed simultaneously in different stages of the circuit. This is in contrast to conventional approximation methods that are implemented by relying on the sequential execution of computer program instructions, thereby involving a large number of instructions and operation cycles. In the reciprocal function processing circuit of the present disclosure, when an input parameter for a function operation (e.g., an input value IN) is provided to the input register REG1, the necessary calculation is automatically performed in the dedicated hardware blocks corresponding to each operation stage (PRE1, DIV1, DEC1-1, INPUT_GEN-1, CONV_E-1, PAF, DIV2, DEC2, ADD, ENC, CONCAT, etc.), and does not involve a separate instruction to control the operation of the intermediate stage. That is, once the input data enters the pipeline, each operation stage proceeds sequentially according to the hard-wired connection of the hardware itself and the data flow by the registers, so that a high-speed pipeline operation is performed.

According to the configuration, a reciprocal function can be calculated at high speed by activating only the hard-wired dedicated operation circuits (the reciprocal function circuit RECIP and the programmable function approximation circuit PAF). In particular, when the reciprocal function circuit RECIP and the programmable function approximation circuit PAF are used together, it is configured to reduce the approximation error over a wider input range compared to the case of using only the programmable function approximation circuit PAF. According to the present disclosure, by configuring other dedicated circuits such as the reciprocal square root function circuit RSQRT or the negative exponential function circuit NEXP, which are not used in the reciprocal function calculation, to be deactivated, the power consumption of the NPU can be efficiently reduced.

The reciprocal function processing circuit according to the fifth embodiment of the fourth example of the present disclosure proposes a dedicated hardware accelerator to overcome the limitations of the operation cycle of the existing software instruction-based approximation method. In particular, a partitioned processing and pipeline structure based on the characteristics of the input data (exponent part and mantissa part) may be adopted to efficiently process complex floating-point operations.

The pipeline structure of the circuit is implemented with dedicated hardware for each stage of operation, so once data enters the pipeline, it is processed along a continuous hardware flow. This can dramatically improve the processing speed of the reciprocal function operation by eliminating the overhead of fetching, decoding, and executing a separate instruction for each arithmetic or logic operation in a conventional processor.

In addition, the reciprocal function processing circuit effectively reduces the approximation error that occurs in the piecewise approximation method by pre-mapping the input mantissa to a range advantageous for function approximation. This makes it possible to provide a high-accuracy reciprocal function approximate value even with limited hardware resources.

The reciprocal function processing circuit includes a power management function that selectively activates only the necessary dedicated operation circuits and deactivates the rest. This contributes to increasing the energy efficiency of the entire system by reducing unnecessary power consumption while providing high-performance operations.

Figure 30:
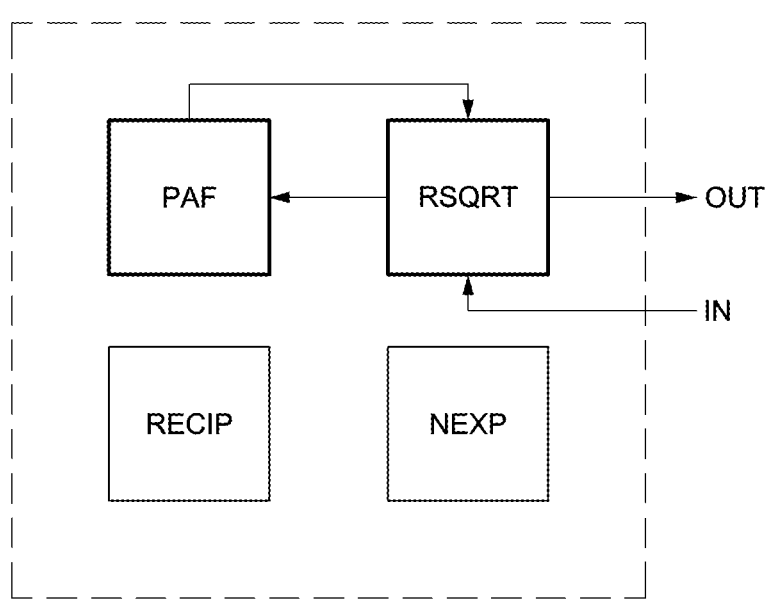
FIG. 30 is a block diagram illustrating a reciprocal square root function processing circuit according to a sixth embodiment of the fourth example of the present disclosure.

FIG. 30 is a block diagram illustrating a reciprocal square root function processing circuit according to a sixth embodiment of the fourth example of the present disclosure. The reciprocal square root function processing circuit according to the sixth embodiment of the fourth example of the present disclosure is also a hardware circuit configuration for a reciprocal square root operation implemented within the function approximation unit FuncApx of the NPU. The reciprocal square root function processing circuit is configured to utilize the programmable function approximation circuit PAF and the reciprocal square root function circuit RSQRT within the function approximation unit FuncApx to perform a reciprocal square root operation.

Figure 31:
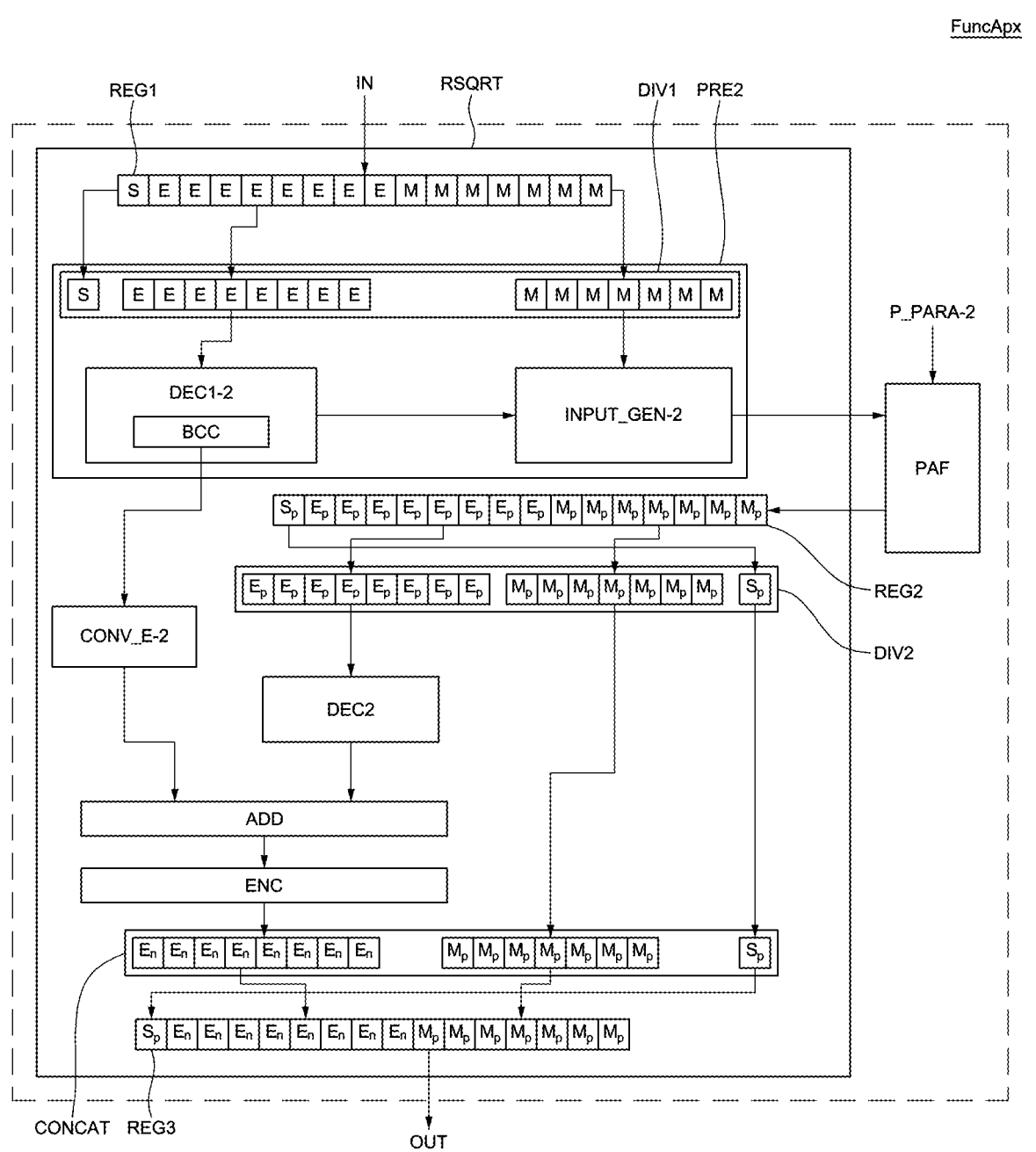
FIG. 31 is a diagram illustrating a detailed configuration of the reciprocal square root function processing circuit according to the sixth embodiment of the fourth example of the present disclosure.

FIG. 30 illustrates the overall configuration of the function approximation unit FuncApx including the reciprocal square root function processing circuit, and FIG. 31 illustrates the detailed configuration of the reciprocal square root function processing circuit. Referring to FIG. 30, the NPU is configured to activate the programmable function approximation circuit PAF and the reciprocal square root function circuit RSQRT within the function approximation unit FuncApx to perform a reciprocal square root function process. The function approximation unit FuncApx is configured such that the input and output terminals of each circuit are electrically connected so that the programmable function approximation circuit PAF and the reciprocal square root function circuit RSQRT can communicate with each other.

As shown in FIG. 30, the data path for the reciprocal square root function process includes input receiving the input value IN that is fed to the reciprocal square root function circuit RSQRT. The output of the reciprocal square root function circuit RSQRT is connected to the programmable function approximation circuit PAF. The output of the programmable function approximation circuit PAF is connected back to one of the input terminals of the reciprocal square root function circuit RSQRT. In this way, the reciprocal square root function processing circuit is set to process a reciprocal square root function calculation by performing an iterative process between the reciprocal square root function circuit RSQRT and the programmable function approximation circuit PAF. The final output of the reciprocal square root function circuit RSQRT is configured to be output as an output value OUT.

In an embodiment, when the reciprocal square root function circuit RSQRT and the programmable function approximation circuit PAF are activated, other dedicated operation circuits within the function approximation unit FuncApx, such as the reciprocal function circuit RECIP and the negative exponential function circuit NEXP, may be configured to be deactivated. The function approximation unit FuncApx is configured to reduce the power consumption of the deactivated circuit using at least one of a power gating function, a clock gating function, and a register retention function.

FIG. 31 is a diagram illustrating a detailed configuration of the reciprocal square root function processing circuit according to the sixth embodiment of the fourth example of the present disclosure. FIG. 31 is a block diagram illustrating a detailed configuration of the reciprocal square root function processing circuit. The reciprocal square root function processing circuit is a combination of dedicated operation circuits designed to generate an output value OUT representing an approximate reciprocal square root value for an input value IN in a floating-point format. The input value IN has a floating-point format composed of a sign bit S, an exponent bit E, and a mantissa bit M, and may have a BF16 format as one example, but the present disclosure is not limited thereto. The reciprocal square root function processing circuit is configured to obtain a reciprocal square root value by separating and individually processing the exponent bit E and the mantissa bit M constituting the input value IN, and then combining the processed results.

The reciprocal square root function processing circuit has a pipeline structure for hardware acceleration, and for this purpose, it is configured to include registers (input register REG1, intermediate register REG2, output register REG3) for storing the intermediate results of each processing stage. Each of the registers (REG1, REG2, REG3) may be configured to accommodate the bit width of the corresponding number format of the input data. For example, if the input data is BF16, the corresponding register may be configured as a 16-bit buffer. This is in contrast to conventional approximation methods that are implemented by relying on the sequential execution of computer program instructions, thereby involving a large number of instructions and operation cycles.

The reciprocal square root function processing circuit includes at least the following components. The input register REG1 functions as an input buffer that temporarily stores an input value IN input from the outside. The input register REG1 is arranged to correspond to the input of the first stage of the pipeline.

The preprocessing circuit PRE2 converts the input value IN stored in the input register REG1 into a form suitable for reciprocal square root function calculation. The preprocessing circuit PRE2 includes a first decomposition circuit DIVI, a first decoder DEC1-2, and an input value generation circuit INPUT_GEN-2. The first decomposition circuit DIV1 is configured to separate the sign bit S, the exponent bit E, and the mantissa bit M from the input value IN. The preprocessing circuit PRE2 is configured to convert the input value IN stored in the input register REG1 into a form suitable for reciprocal square root function calculation to reduce an approximation error.

The first decoder DEC1-2 receives the exponent bit E separated from the first decomposition circuit DIV1, decode it into an integer data form, and subtract a bias from the decoded exponent bit E using a built-in binary calculation circuit BCC. The binary calculation circuit BCC performs at least binary subtraction. The first decoder DEC1-2 may select a bias value (e.g., 127 for even, 126 for odd in the case of BF16) according to whether the decoded exponent bit E is even or odd. This conditional bias selection is performed to reduce the rounding error that may occur when processing a square root operation (division) as a bit shift operation in the subsequent exponent conversion circuit CONV_E-2.

Consequently, the first decoder DEC1-2 represents the actual value of the input exponent bit E (i.e., an exponent value with the bias removed), and is configured to prepare it to be utilized in operations by transmitting it to the subsequent exponent conversion circuit CONV_E-2 and input value generation circuit INPUT_GEN-2. The function approximation unit FuncApx may include a selector or a multiplexer for this conditional bias selection, and the bias value may be determined according to the number format of the input value IN and stored in a memory or a register.

The input value generation circuit INPUT_GEN-2 is configured to receive the mantissa bit M separated from the first decomposition circuit DIV1 and generate a value in a floating-point format that can be processed by the programmable function approximation circuit PAF.

Specifically, the input value generation circuit INPUT_GEN-2 generates an input value in a floating-point number format by combining the mantissa bit M with an exponent bit corresponding to whether the input exponent E received from the first decoder DEC1-2 is even or odd, and a sign bit set to 0. The value input to the exponent bit is 127 if the input exponent is even, and 128 if it is odd. This exponent bit setting is to effectively map the mantissa part to the range $1 \leq M < 4$ according to whether the original input exponent is odd or even. In particular, if the original exponent is odd, the mantissa is doubled (e.g., 2M) to make the effective range [2, 4], and through this, it is configured to reduce the rounding error that may occur when processing the division as a bit shift operation during the square root operation by converting the exponent to an even number.

In this way, the input value generation circuit INPUT_GEN-2 uses the mantissa bit M in a floating-point format to convert it into a floating-point value mapped to the range of 1 to 4, which the programmable function approximation circuit PAF can use for operation. The converted value is connected to the input of the programmable function approximation circuit PAF, and consequently, the mantissa bit M of the generated floating-point value is always placed in the range of 1 to 4. This is to reduce the approximation error in the subsequent programmable function approximation circuit PAF by shifting the input range, which is the target of the function approximation, to a domain where the variation of the function value is small.

The exponent conversion circuit CONV_E-2 receives the decoded exponent bit E from the first decoder DEC1-2 and output a value obtained by converting the sign of the corresponding value to negative and then dividing by 2. This is to calculate the reciprocal square root scaling value corresponding to the exponent part according to the mathematical property of the reciprocal square root function $(rsqrt(x))(rsqrt(2^E)=(2^{(-E/2)}$ or $2^{(-(E-1)/2)})$. Specifically, the exponent conversion circuit CONV_E-2 is configured to generate an output value by dividing the input exponent value by 2 and applying a minus sign. By using the improved bias selection according to whether the exponent bit E is even or odd in the first decoder DEC1-2, the CONV_E-2 may perform this division without rounding error through an efficient bit-shift operation. The output of the exponent conversion circuit CONV_E-2 is configured to be connected to the first input of the adder ADD.

The programmable function approximation circuit PAF receives the value in the converted floating-point format from the input value generation circuit INPUT_GEN-2 and execute a programmed activation function to generate an approximate result of the reciprocal square root function. The programmable function approximation circuit PAF uses a programmable parameter P_PARA-2 that approximates the reciprocal square root function corresponding to a specific input section of 1 to 4. The programmable parameter P_PARA-2 may be a value derived through deep learning-based training, according to an embodiment of the present disclosure. Specifically, the programmable parameter P_PARA-2 may be a coefficient derived by training a small-scale artificial neural network improved for expressing a piecewise linear function to approximate a target function. In the case of the reciprocal square root function circuit RSQRT, since the mantissa is normalized to the range [1, 4) according to whether the input exponent part is odd or even during the preprocessing process, the target function for training can be set as $f(x)=1\sqrt{x}$, and its domain of definition as $x \in [1, 4)$.

The artificial neural network is trained to reduce the error with the target function within a predictable section with small variation. Once training is complete, a set of programmable parameters, including a segment boundary, the width of each segment, and the slope A and offset B of the corresponding section, in a form that can be directly used by the programmable function approximation circuit PAF in hardware, can be generated from the learned weights and biases of the corresponding neural network. This method enables effective parameters that reduce the approximation error of the reciprocal function to be obtained within limited hardware resources.

In particular, this process has the advantage of enabling a programmable parameter P_PARA-3 to be obtained. The programmable parameter P_PARA-3 allows relatively accurate approximation within a given hardware resource by enabling hardware-software co-optimization that reflects the hardware constraints of the programmable function approximation circuit PAF (e.g., the maximum number of comparators) in the learning process.

That is, the programmable function approximation circuit PAF receives a programmable parameter P_PARA-2 that programs a reciprocal square root function. The programmable function approximation circuit PAF effectively reduces the approximation error compared to the case of approximating over a wide input range by performing function approximation in the range of 1 to 4, where the function value variation is small. The programmable function approximation circuit PAF may utilize fixed-point operations to perform function approximation internally, and in this case, it may be configured to include a process of converting a floating-point input to fixed-point and converting it back to a floating-point format after the operation. The output of the programmable function approximation circuit PAF is connected to be transmitted to an intermediate register REG2. A detailed description of processing a programmed activation function using the programmable function approximation circuit PAF refers to FIG. 21 to FIG. 25.

The second decomposition circuit DIV2 receives the output value (approximation result) of the programmable function approximation circuit PAF through the intermediate register REG2 and separate the sign bit $S_p$, exponent bit $E_p$, and mantissa bit $M_p$ of the operation result. The bits $(S_p, M_p)$ separated from the second decomposition circuit DIV2 are transmitted to a concatenation circuit CONCAT via the intermediate register REG2, and the exponent bit $E_p$ is connected to be transmitted to a second decoder DEC2.

The second decoder DEC2 receives the exponent bit $E_p$ separated from the second decomposition circuit DIV2, decode it into an integer data form, and then subtract a bias. The integer value of the bias is 127. By decoding, the actual value of the exponent bit $E_p$ (i.e., an integer-form fixed-point exponent value with the bias removed) can be expressed. That is, the second decoder DEC2 is configured to decode the exponent bit $E_p$ of the reciprocal square root function approximated in the programmable function approximation circuit PAF to its actual value by subtracting the bias. The output of the second decoder DEC2 may be connected to the second input unit of the adder ADD.

The adder ADD obtains an exponent bit of an integer value with the bias removed by adding the values received from the first input unit and the second input unit. The adder ADD is a circuit that receives two binary input values and process a binary addition operation. That is, by adding the decoded exponent bits input to each of the first input unit and the second input unit of the adder ADD, the output of the adder ADD is configured to be restored to the initial range of the input value IN. That is, the exponent of the final result can be determined by subtracting the offset (the difference between the input exponent and the bias) obtained from the initial input exponent from the exponent obtained through the reciprocal calculation of the mantissa part. The output of the adder ADD is connected to an encoder ENC, and the output of the adder ADD is configured to be transmitted to the encoder ENC.

The encoder ENC is configured to generate an encoded exponent bit $E_n$ by adding a predefined bias value (e.g., 127) back to the unbiased exponent value (unbiased exponent), which is the output of the adder ADD. That is, the encoder ENC performs the function of restoring the exponent bit to a format suitable for the floating-point system by adding back the bias that was removed during the decoding process. The output of the encoder ENC is connected to the concatenation circuit CONCAT.

The concatenation circuit CONCAT combines the encoded exponent bit $E_n$ input from the encoder ENC and the sign bit $S_p$ and mantissa bit $M_p$ of the second decomposition circuit DIV2 input through the intermediate register REG2 in a preset order. In this way, a bit string in a floating-point format corresponding to the final approximation value of the corresponding function is generated. The output of the concatenation circuit CONCAT is connected to be transmitted to an output register REG3.

The output register REG3 functions as an output buffer that stores the output of the concatenation circuit CONCAT. The output register REG3 is arranged as the final stage of the pipeline.

The reciprocal square root function calculation process can be explained by three calculation paths. The first calculation path includes circuits (e.g., the exponent processing part of the preprocessing circuit PRE2, and the exponent conversion circuit CONV_E-2) arranged to decode the exponent bit E extracted from the input value IN and perform a reciprocal square root transformation on the decoded value based on whether the exponent bit is odd or even. The output of this path is provided to the first input of the adder ADD.

The second calculation path includes circuits (e.g., the mantissa processing part of the preprocessing circuit PRE2, the programmable function approximation circuit PAF, the second decomposition circuit DIV2, and the second decoder DEC2) arranged to convert the mantissa bit M extracted from the input value IN into an input for the programmable function approximation circuit PAF based on whether it is odd or even, calculate a linear function approximate value of the reciprocal square root function in the programmable function approximation circuit PAF, and decode the exponent bit $E_p$ extracted from the linear function approximate value. The output of the second decoder DEC2 is provided to the second input of the adder ADD, and the output $(S_p, M_p)$ of the second decomposition circuit DIV2 is provided to the concatenation circuit CONCAT.

The third calculation path includes circuits (e.g., the adder ADD, the encoder ENC, and the concatenation circuit CONCAT) arranged to calculate the output value OUT of the input value IN (i.e., the reciprocal square root value of the input value) by adding the output value of the first calculation path (i.e., the output value of the exponent conversion circuit CONV_E-2) and the output value of the second calculation path (i.e., the output value of the second decoder DEC2), and combining the encoded exponent bit $E_n$ of the added value, the mantissa bit $M_p$ of the linear function approximate value, and the sign bit $S_p$ in a preset order.

The reciprocal square root function processing circuit has a pipeline structure arranging registers (input register REG1, intermediate register REG2, output register REG3) between each operation stage. The pipeline structure is configured to provide a hardware acceleration effect that greatly improves the total number of operations that can be processed per unit of time (throughput) while maintaining the completion time (latency) of individual operations, by allowing several reciprocal square root calculation tasks to be processed simultaneously in different stages of the circuit. This is differentiated from conventional approximation methods that are implemented by relying on the sequential execution of computer program instructions, thereby involving a large number of instructions and operation cycles. In the reciprocal square root function processing circuit of the present disclosure, when an input parameter for a function operation (e.g., an input value IN) is provided to the input register REG1, the necessary calculation is automatically performed in the dedicated hardware blocks corresponding to each operation stage (PRE2, DIV1, DEC1-2, INPUT_GEN-2, CONV_E-2, PAF, DIV2, DEC2, ADD, ENC, CONCAT, etc.), and does not involve a separate instruction to control the operation of the intermediate stage. That is, once the input data enters the pipeline, each operation stage proceeds sequentially according to the hard-wired connection of the hardware itself and the data flow by the registers, so that a high-speed pipeline operation is performed.

According to the configuration, a reciprocal square root function can be calculated at high speed by activating only the hard-wired dedicated operation circuits (the circuits including the reciprocal square root function circuit RSQRT and the programmable function approximation circuit PAF). In particular, when the reciprocal square root function processing circuit uses the programmable function approximation circuit PAF together, it is configured to reduce the approximation error over a wider input range compared to the case of using only the programmable function approximation circuit PAF. By configuring other dedicated circuits such as the reciprocal function circuit RECIP or the negative exponential function circuit NEXP, which are not used in the reciprocal square root function calculation, to be deactivated, the power consumption of the NPU can be efficiently reduced.

The reciprocal square root function processing circuit according to the sixth embodiment of the fourth example of the present disclosure proposes a dedicated hardware accelerator to overcome the limitations of the operation cycle of the existing software instruction-based approximation method. In particular, a partitioned processing and pipeline structure based on the characteristics of the input data (exponent part and mantissa part) is adopted to efficiently process complex floating-point operations.

The pipeline structure of the circuit is implemented with dedicated hardware for each stage of operation, so once data enters the pipeline, it is processed along a continuous hardware flow. Accordingly, the processing speed of the reciprocal function operation can be dramatically improved by eliminating the overhead of fetching, decoding, and executing a separate instruction for each arithmetic or logic operation in a conventional processor.

In addition, the reciprocal square root function processing circuit effectively reduces the approximation error that occurs in the piecewise approximation method by pre-mapping the input mantissa to a range advantageous for function approximation. This makes it possible to provide a high-accuracy reciprocal function approximate value even with limited hardware resources.

The reciprocal square root function processing circuit includes a power management function that selectively activates only the necessary dedicated operation circuits and deactivates the rest. This contributes to increasing the energy efficiency of the entire system by reducing unnecessary power consumption while providing high-performance operations.

Figure 32:
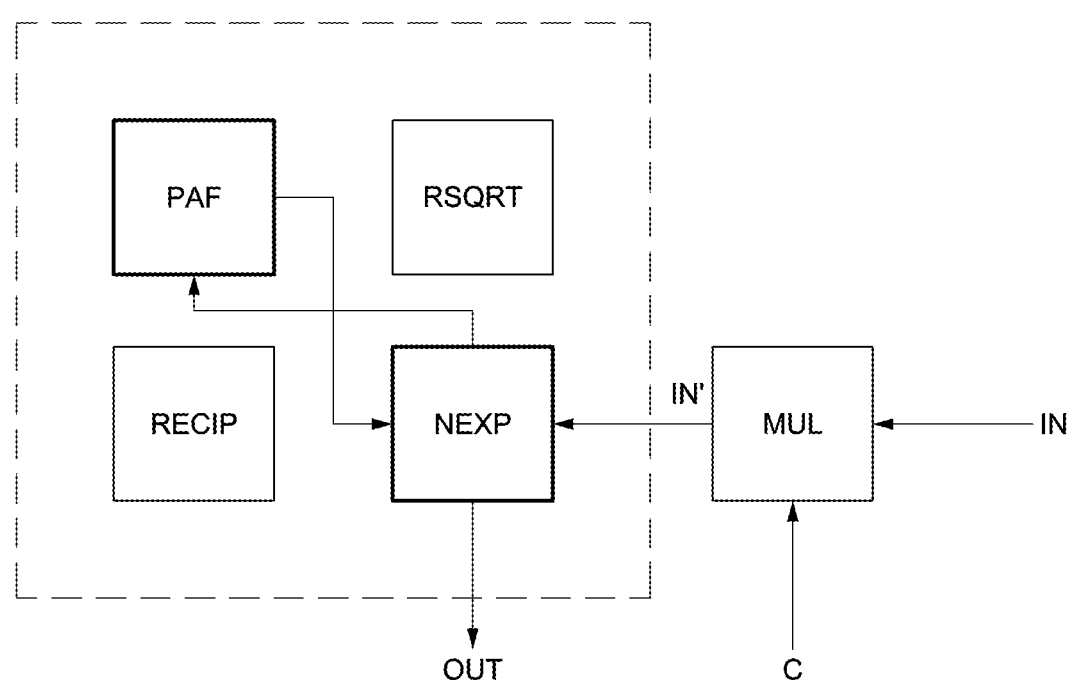
FIG. 32 is a block diagram illustrating a negative exponential function processing circuit according to a seventh embodiment of the fourth example of the present disclosure.

FIG. 32 is a block diagram illustrating a negative exponential function processing circuit according to a seventh embodiment of the fourth example of the present disclosure.

Figure 33:
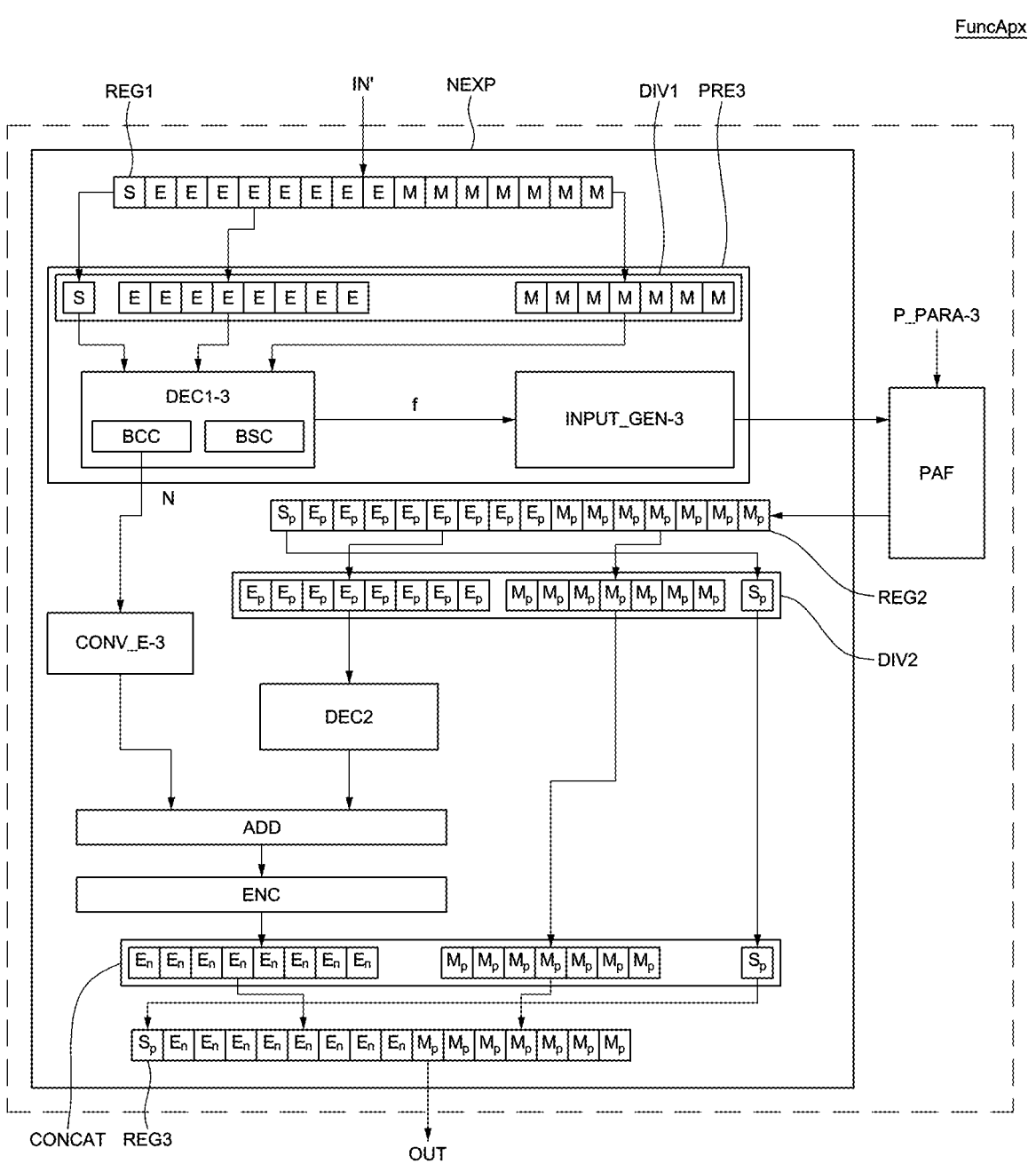
FIG. 33 is a diagram illustrating a detailed configuration of the negative exponential function processing circuit according to the seventh embodiment of the fourth example of the present disclosure.

The negative exponential function processing circuit according to the seventh embodiment of the fourth example of the present disclosure is, as described above, a hardware circuit configuration for a negative exponential operation implemented within the function approximation unit FuncApx of the NPU. The negative exponential function processing circuit is configured to utilize the programmable function approximation circuit PAF and the negative exponential function circuit NEXP within the function approximation unit FuncApx to perform a negative exponential operation. FIG. 32 illustrates the overall configuration of the function approximation unit FuncApx and a preprocessing device including the negative exponential function processing circuit, and FIG. 33 illustrates the detailed configuration of the negative exponential function processing circuit.

Referring to FIG. 32, the NPU is configured to activate the programmable function approximation circuit PAF and the negative exponential function circuit NEXP within the function approximation unit FuncApx to perform a negative exponential function process. The function approximation unit FuncApx is configured such that the input and output terminals of each circuit are electrically connected so that the programmable function approximation circuit PAF and the negative exponential function circuit NEXP can communicate with each other.

The negative exponential function processing circuit is further configured to include a multiplication unit MUL for preprocessing an input value IN. Here, the multiplication unit MUL may correspond to one of the multiplication unit V_MUL of the vector core V_CORE and the multiplication unit S_MUL of the scalar core S_CORE of the special function unit SFU, shown in FIG. 5 and FIG. 6. The multiplication unit MUL is configured to provide a preprocessed input value IN' calculated by multiplying the input value IN by a preset constant value (C, for example, $\log_2(e)$) to the negative exponential function circuit NEXP.

As shown in FIG. 32, the data path for the negative exponential function process is connected to be input from the preprocessed input value IN' to the negative exponential function circuit NEXP. The output of the negative exponential function circuit NEXP may be configured to be connected to the programmable function approximation circuit PAF. The output of the programmable function approximation circuit PAF may be configured to be connected back to one of the input terminals of the negative exponential function circuit NEXP. Through this, the negative exponential function processing circuit may be set to process a negative exponential function calculation by performing a repetitive process between the negative exponential function circuit NEXP and the programmable function approximation circuit PAF. The final output of the negative exponential function circuit NEXP may be configured to be output as an output value OUT.

In an embodiment, when the negative exponential function circuit NEXP and the programmable function approximation circuit PAF are activated, other dedicated operation circuits within the function approximation unit FuncApx, such as the reciprocal function circuit RECIP and the reciprocal square root function circuit RSQRT, may be configured to be deactivated. The function approximation unit FuncApx may be configured to reduce the power consumption of the deactivated circuit using at least one of a power gating function, a clock gating function, and a register retention function.

The negative exponential function utilized in the negative exponential function circuit NEXP can be expressed by an Equation as shown in Equation 7.

$$y = e^{-x} = 2^{-x*log_2 e} \approx 2^{-1.442695*x} = 2^{-c*x} = 2^{-x'} = 2^{-N} * 2^{-f} \qquad \text{Equation 7}$$

where x is the input value IN of the multiplication unit MUL, x' is the preprocessed input value IN' input to the negative exponential function circuit NEXP, y is the output value OUT of the negative exponential function circuit NEXP, $log_2(e)$ is the preset constant value C input to the multiplication unit MUL, N is the integer part of the preprocessed input value IN', and f is the fractional part of the preprocessed input value IN'. By applying the preset constant value C, the hardware implementation of the negative exponential function circuit NEXP can be facilitated because the preprocessed input value IN' can be separated into an integer part N and a fractional part f. Here, the preset constant value C is illustratively 1.442695, and the precision of the preset constant value C can be appropriately adjusted. For example, the preset constant value C may also be set to 1.443.

FIG. 33 is a diagram illustrating a detailed configuration of the negative exponential function processing circuit according to the seventh embodiment of the fourth example of the present disclosure. FIG. 33 is a block diagram illustrating a detailed configuration of the negative exponential function processing circuit. The negative exponential function processing circuit is a combination of dedicated operation circuits designed to generate an output value OUT representing an approximate value of a negative exponential function for an input value IN. The preprocessed input value IN', which is the preprocessed input value IN, has a floating-point format composed of a sign bit S, an exponent bit E, and a mantissa bit M, and may have a BF16 format as one example, but the present disclosure is not limited thereto. The negative exponential function processing circuit is configured to obtain a negative exponential function value by separating and individually processing the exponent bit E and the mantissa bit M constituting the preprocessed input value IN', and then combining the processed results.

The negative exponential function processing circuit is designed to have a pipeline structure for hardware acceleration, and for this purpose, it is configured to include registers (input register REG1, intermediate register REG2, output register REG3) for storing the intermediate results of each processing stage.

Each of the registers (REG1, REG2, REG3) may be configured to accommodate the bit width of the corresponding number format of the input data. For example, if the input data is BF16, the corresponding register may be configured as a 16-bit buffer. This is in contrast to conventional approximation methods that are implemented by relying on the sequential execution of computer program instructions, thereby involving a large number of instructions and operation cycles.

The negative exponential function processing circuit is configured to include at least the following components.

The input register REG1 is configured to function as an input buffer that temporarily stores a preprocessed input value IN' input from the outside. The input register REG1 is arranged to correspond to the input of the first stage of the pipeline.

The preprocessing circuit PRE3 is configured to efficiently calculate an approximate value of $e^{-x}$ for the input value IN. To this end, first, the input value IN is multiplied by a preset constant $log_2(e)$ through a multiplication unit MUL to generate a preprocessed input value IN' (i.e., $IN' = IN \cdot log_2 e$).

The preprocessing circuit PRE3 converts the preprocessed input value IN' into a form suitable for negative exponential function approximation. Specifically, $e^{-IN}$ is converted into an exponential form with a base of 2 and expressed as $e^{-IN} = 2^{-IN \cdot log_2 e}$, where the exponent part $x \cdot log_2 e$ is decomposed into an integer part N and a fractional part f. That is, it can be expressed as $x \cdot log_2 e = N + f$ (where $0 \leq f < 1$). In particular, the error in the subsequent approximation circuit can be effectively reduced by limiting the fractional part f to a specific range ($0 \leq f < 1$). Therefore, the Equation $e^{-x} = 2^{-x \cdot log_2 e}$ can be converted as $e^{-x} = 2^{-N+f} = 2^{-N} \cdot 2^{-f}$. Therefore, $2^{-N}$ is configured to be processed independently in the exponent conversion circuit CONV_E-3, and $2^{-f}$ is configured to be processed independently in the programmable function approximation circuit PAF.

That is, the preprocessing circuit PRE3 is configured to convert the preprocessed input value IN' stored in the input register REG1 into a form suitable for negative exponential function approximation, that is, a form for approximation by separating it into an integer part N and a fractional part f. This conversion facilitates the hardware implementation of the negative exponential function and is configured to effectively reduce the approximation error in the subsequent programmable function approximation circuit PAF by mapping the significant digits (fractional part f) of the preprocessed input value IN' to a fixed small range. The preprocessing circuit PRE3 is configured to include a first decomposition circuit DIV1, a first decoder DEC1-3, and an input value generation circuit INPUT_GEN-3.

The first decomposition circuit DIV1 is configured to separate the sign bit S, the exponent bit E, and the mantissa bit M from the preprocessed input value IN'.

The first decoder DEC1-3 is configured to receive the exponent bit E and the mantissa bit M separated from the first decomposition circuit DIV1, and separate the preprocessed input value IN' into an integer part N and a fractional part f by utilizing a built-in binary calculation circuit BCC and a bit shifter circuit BSC. The binary calculation circuit BCC processes at least a binary subtraction operation, and the bit shifter circuit BSC facilitates the extraction of the integer part N through bit left and right shift operations. That is, the first output of the first decoder DEC1-3 is configured to output the integer part N, and the second output is configured to output the fractional part f.

The preprocessed input value IN' can be expressed as shown in Equation 8.

$$x' = N + f \qquad \text{Equation 8}$$

where x' is the preprocessed input value IN', N is the integer part of the preprocessed input value IN', and f is the fractional part of the preprocessed input value IN'.

Integer part N calculation of the first decoder DEC1-3: The first decoder DEC1-3 is configured to calculate an exponent bit with the bias removed by processing a subtraction operation of the exponent bit E and a pre-stored bias. This operation is configured to be performed by the built-in binary calculation circuit BCC. For example, when the exponent bit E of the preprocessed input value IN' is $10000001_2$ ($129_{10}$) and the bias is $01111111_2$ ($127_{10}$), the exponent bit with the bias removed is calculated as $00000010_2$ ($2_{10}$). The exponent bit value is utilized to extract the integer part N in the bit shifter circuit BSC to be described later.

The calculation formula for the integer part N of the preprocessed input value IN' can utilize Equation 9.

$$N = (1 \ll E_u) + (M \gg (M_{width} - E_u)) \qquad \text{Equation 9}$$

where N is the integer part of the preprocessed input value IN', Eu is the exponent bit with the bias removed, $\ll$ is a bit left shift operation, $\gg$ is a bit right shift operation, M is the mantissa bit M of the preprocessed input value IN', and Mwidth is the bit width of the mantissa bit M.

To extract the integer part N, the first decoder DEC1-3 includes a bit shifter circuit BSC, and the bit shifter circuit BSC can efficiently multiply or divide by a power of 2 by processing bit left shift ($\ll$) and bit right shift ($\gg$) operations.

Fractional part f calculation of the first decoder DEC1-3: The first decoder DEC1-3 is configured to calculate the fractional part f by subtracting the calculated integer part N from the preprocessed input value IN'. The calculation formula for the fractional part f can utilize Equation 10.

$$f = x' - N \qquad \text{Equation 10}$$

where is the fractional part of the preprocessed input value IN', x' is the preprocessed input value IN', and N is the integer part of the preprocessed input value IN'. Here, the subtraction operation can be processed in the binary calculation circuit BCC.

For example, if the preprocessed input value IN' is 4.71875 and the integer part N is 4, the fractional part f becomes 0.71875. For calculation, the preprocessed input value IN' can be converted into a fixed-point format.

According to the above-described circuit configuration, it can be directly processed by a dedicated calculation circuit without software commands composed of a plurality of instructions.

The input value generation circuit INPUT_GEN-3 is configured to receive the fractional part f from the first decoder DEC1-3 and generate a value in a floating-point format that can be processed by the programmable function approximation circuit PAF. This is to reduce the approximation error in the subsequent programmable function approximation circuit PAF by shifting the input range, which is the target of the function approximation, to a domain where the variation of the function value is small.

The exponent conversion circuit CONV_E-3 is configured to receive the integer part N separated from the first decoder DEC1-3 and output a value related to the negative power of 2 for the value ($2^{-N}$). The output of the exponent conversion circuit CONV_E-3 is configured to be connected to the adder ADD.

The programmable function approximation circuit PAF is configured to receive the value in the converted floating-point format (related to the fractional part f) from the input value generation circuit INPUT_GEN-3 and execute a programmed activation function to generate an approximate result ($2^{-f}$) for the fractional part of the negative exponential function. The programmable function approximation circuit PAF is configured to utilize a programmable parameter P_PARA-3 to approximate the negative exponential function of 2 ($2^{-x}$) corresponding to a specific input section of 0 or more and less than 1.

The programmable parameter P_PARA-3 may be a value derived through deep learning-based training, according to an embodiment of the present disclosure.

Specifically, the programmable parameter P_PARA-3 may be a coefficient derived by training a small-scale artificial neural network improved for expressing a piecewise linear function to approximate a target function. In the case of the negative exponential function circuit NEXP, since the fractional part f of the input value x is extracted after being converted into an exponential form with a base of 2 during the preprocessing process, and this fractional part f always belongs to a stable range of [0, 1), the target function for training can be set as $f(x) = 2^{-x}$, and its domain of definition as $x \in [0, 1)$.

The artificial neural network is trained to reduce the error with the target function within such a predictable section with small variation. Once training is complete, an optimal set of programmable parameters, including a segment boundary, the width of each segment, and the slope A and offset B of the corresponding section, in a form that can be directly used by the programmable function approximation circuit PAF in hardware, can be generated from the learned weights and biases of the corresponding neural network. This method makes it possible to derive the most effective parameters that reduces the approximation error of the reciprocal function within limited hardware resources.

In particular, this process has the advantage of being able to derive a programmable parameter P_PARA-3 that performs the most precise approximation within a given hardware resource by enabling hardware-software co-optimization that reflects the hardware constraints of the programmable function approximation circuit PAF (e.g., the maximum number of comparators) in the learning process.

The programmable function approximation circuit PAF is configured to effectively reduce the approximation error compared to the case of approximating over a wide input range by performing function approximation in the range of 0 or more and less than 1, where the function value variation is small. The programmable function approximation circuit PAF may utilize fixed-point operations to perform function approximation internally, and in this case, it may be configured to include a process of converting a floating-point input to fixed-point and converting it back to a floating-point format after the operation. The output of the programmable function approximation circuit PAF may be connected to be transmitted to an intermediate register REG2. A detailed description of processing a programmed activation function using the programmable function approximation circuit PAF refers to FIG. 21 to FIG. 25.

The second decomposition circuit DIV2 is configured to receive the output value of the programmable function approximation circuit PAF (approximation result $2^{-f}$) through the intermediate register REG2 and separate the sign bit $S_p$, exponent bit $E_p$, and mantissa bit $M_p$ of the operation result. The bits ($S_p$, $M_p$) separated from the second decomposition circuit DIV2 are configured to be transmitted to a concatenation circuit CONCAT via the intermediate register REG2, and the exponent bit $E_p$ is connected to be transmitted to a second decoder DEC2.

The second decoder DEC2 is configured to receive the exponent bit $E_p$ separated from the second decomposition circuit DIV2, decode it into an integer data form, and then subtract a bias (e.g., 127). By decoding, the actual value of the exponent bit $E_p$ (i.e., an integer-form fixed-point exponent value with the bias removed) can be expressed. The output of the second decoder DEC2 may be configured to be connected to the adder ADD.

The intermediate register REG2 is configured to function as a register group that stores intermediate results including the output of the programmable function approximation circuit PAF and the output of the second decomposition circuit DIV2. The intermediate register REG2 is arranged to perform the role of buffering data that does not go through the exponent operation path (CONV_E-3, ADD, ENC) (e.g., the function approximation result itself and the sign/mantissa bits separated therefrom) before being delivered to the subsequent stage (concatenation circuit CONCAT).

The adder ADD is configured to obtain an exponent bit of an integer value with the bias removed by adding the values received from the first input unit and the second input unit. The adder ADD is a circuit configured to receive two binary input values and process a binary addition operation. That is, by adding the decoded exponent bits input to each of the first input unit and the second input unit of the adder ADD, the output of the adder ADD is configured to be restored to the initial range of the input value IN. That is, the adder ADD is configured to generate a final exponent scaling value corresponding to the negative exponential value by adding the value related to the integer part N $(2^{-N})$ from the exponent conversion circuit CONV_E-3 and the exponent bit $E_p$ with the bias removed (the value related to the fractional part f) from the second decoder DEC2. The output of the adder ADD is connected to an encoder ENC, and the output of the adder ADD is configured to be transmitted to the encoder ENC.

The encoder ENC is configured to generate an encoded exponent bit $E_n$ by adding a predefined bias value (e.g., 127) back to the unbiased exponent value (unbiased exponent), which is the output of the adder ADD. That is, the encoder ENC is configured to perform the role of restoring the exponent bit to a format suitable for the floating-point system by adding back the bias that was removed during the decoding process. The output of the encoder ENC is configured to be connected to the concatenation circuit CONCAT.

The concatenation circuit CONCAT is configured to combine the encoded exponent bit $E_n$ input from the encoder ENC and the sign bit $S_p$ and mantissa bit $M_p$ of the second decomposition circuit DIV2 input through the intermediate register REG2 in a preset order. Through this, a bit string in a floating-point format corresponding to the final approximation value of the corresponding function is processed to be generated. The output of the concatenation circuit CONCAT is connected to be transmitted to an output register REG3.

The output register REG3 is configured to function as an output buffer that stores the output of the concatenation circuit CONCAT. The output register REG3 is arranged as the final stage of the pipeline.

The negative exponential function calculation process can be explained by three calculation paths.

The first calculation path is configured to include circuits (e.g., the exponent processing part of the preprocessing circuit PRE3, and the exponent conversion circuit CONV_E-3) arranged to receive the integer part N extracted from the preprocessed input value IN' and output a value related to the negative power of 2 for the value $(2^{-N})$. The output of this path is provided to the first input of the adder ADD.

The second calculation path is configured to include circuits (e.g., the mantissa processing part of the preprocessing circuit PRE3, the programmable function approximation circuit PAF, the second decomposition circuit DIV2, and the second decoder DEC2) arranged to convert the fractional part f extracted from the preprocessed input value IN' into an input for the programmable function approximation circuit PAF, calculate an approximate result $(2^{-f})$ for the fractional part of the negative exponential function in the programmable function approximation circuit PAF, separate the exponent bit $E_p$ and mantissa bit $M_p$ extracted from the approximate result, and decode the exponent bit $E_p$. The output of the second decoder DEC2 is provided to the second input of the adder ADD, and the output $(S_p, M_p)$ of the second decomposition circuit DIV2 is provided to the concatenation circuit CONCAT via the intermediate register REG2.

The third calculation path is configured to include circuits (e.g., the adder ADD, the encoder ENC, and the concatenation circuit CONCAT) arranged to calculate the output value OUT corresponding to the negative exponential function value of the input value IN by adding the output value of the first calculation path (i.e., the output value of the exponent conversion circuit CONV_E-3) and the output value of the second calculation path (i.e., the output value of the second decoder DEC2), and combining the encoded final exponent bit $E_n$ of the added value, the mantissa bit $M_p$ of the approximate result, and the sign bit $S_p$ in a preset order.

The negative exponential function processing circuit is designed to have a pipeline structure by arranging registers (input register REG1, intermediate register REG2, output register REG3) between each operation stage. The pipeline structure is configured to provide a hardware acceleration effect that greatly improves the total number of operations that can be processed per unit of time (throughput) while maintaining the completion time (latency) of individual operations, by allowing several negative exponential function calculation tasks to be processed simultaneously in different stages of the circuit. This is differentiated from conventional approximation methods that are implemented by relying on the sequential execution of computer program instructions, thereby involving a large number of instructions and operation cycles. In the negative exponential function processing circuit of the present disclosure, when an input parameter for a function operation (e.g., a preprocessed input value IN') is provided to the input register REG1, the necessary calculation is automatically performed in the dedicated hardware blocks corresponding to each operation stage (PRE3, DIV1, DEC1-3, INPUT_GEN-3, CONV_E-3, PAF, DIV2, DEC2, ADD, ENC, CONCAT, etc.), and does not involve a separate instruction to control the operation of the intermediate stage. That is, once the input data enters the pipeline, each operation stage proceeds sequentially according to the hard-wired connection of the hardware itself and the data flow by the registers, so that a high-speed pipeline operation is performed.

According to the configuration, a negative exponential function can be calculated at high speed by activating only the hard-wired dedicated operation circuits (the circuits including the negative exponential function circuit NEXP and the programmable function approximation circuit PAF). In particular, when the negative exponential function processing circuit uses the programmable function approximation circuit PAF together, it is configured to reduce the approximation error over a wider input range compared to the case of using only the programmable function approximation circuit PAF. By configuring other dedicated circuits such as the reciprocal function circuit RECIP or the recip-
rocal square root function circuit RSQRT, which are not
used in the negative exponential function calculation, to be
deactivated, the power consumption of the NPU can be
efficiently reduced.

The technical features of the examples of the present
disclosure can be described as follows. According to an
embodiment of the present disclosure, a function approxi-
mation unit may be provided. The function approximation
unit may comprise a programmable function approximation
circuit PAF configured to directly compute a piecewise
function according to a pre-stored coefficient; one or more
dedicated function circuits configured to process at least one
specific function among a reciprocal, a reciprocal square
root, and a negative exponential function through a fixed
hard-wired operation pipeline; and control logic configured
to selectively activate either the PAF circuit or the dedicated
function circuit according to the type of the nonlinear
function to be processed.

According to an embodiment of the present disclosure,
the PAF circuit may be configured to perform a piecewise
linear function or a piecewise polynomial function operation
having a degree of one or higher as the piecewise function
using the coefficient.

According to an embodiment of the present disclosure,
the dedicated function circuit may be configured to process
a floating-point representation of an input value by decom-
posing it into an exponent part and a mantissa part. The PAF
circuit may be configured to be used as a shared operation
unit that performs an approximation operation for a specific
normalized range of the decomposed mantissa part.

According to an embodiment of the present disclosure,
the coefficient used by the PAF circuit may be a constant
value pre-optimized through artificial neural network train-
ing to approximate the specific function within the specific
normalized range.

According to an embodiment of the present disclosure,
the control logic may be configured to perform power gating
or clock gating to cut off power consumption of an inactive
circuit.

According to an embodiment of the present disclosure,
the function approximation unit may be configured to load
the coefficient from an on-chip shared memory of the neural
processing unit or from a register included in the function
approximation unit.

According to an embodiment of the present disclosure,
the neural processing unit may comprise a special function
unit, and the function approximation unit may be configured
to be included in the special function unit.

According to an embodiment of the present disclosure, a
circuit for approximating a programmable function may be
provided. The programmable function approximation circuit
is configured to process an input value X in a floating-point
format comprising a sign bit, an exponent, and a mantissa,
and may comprise a plurality of comparators configured to
compare the input value X with a plurality of segment
boundary values SB to determine a segment to which the
input value belongs; a selector configured to select a set of
programmable operation coefficients corresponding to the
determined segment from among a plurality of stored coef-
ficient sets; and a hard-wired operation unit configured to
directly perform a predefined arithmetic operation using the
selected set of operation coefficients and the input value X.
The hard-wired operation unit may comprise a multiplier
and an adder. The arithmetic operation may be a piecewise
linear function or a piecewise polynomial function having a
degree of one or higher.

According to an embodiment of the present disclosure,
the circuit may be configured to dynamically change the
degree of the polynomial function by deactivating a part of
the circuit of the operation unit through an enable signal.

According to an embodiment of the present disclosure,
the floating-point format may be any one of brain floating-
point 16 (BF16), tensorfloat-32 (TF32), 8-bit floating-point
(FP8), or block floating-point (BFP).

According to an embodiment of the present disclosure,
the set of programmable operation coefficients may be
configured to be pre-optimized through artificial neural
network training to approximate a specific section of a target
function, and stored as a constant value that does not change
at runtime.

According to an embodiment of the present disclosure,
the artificial neural network training may be configured to
perform hardware-software co-optimization considering the
number of comparators included in the circuit.

According to an embodiment of the present disclosure, a
neural processing unit may be provided. The neural pro-
cessing unit may comprise a control unit for controlling the
operation of the neural processing unit; and a function
approximation unit that operates upon receiving a single
instruction from the control unit. The function approxima-
tion unit, in response to the single instruction, may comprise
a hard-wired pipeline including a preprocessing circuit for
preprocessing an input value, an approximation operation
circuit for performing an approximation operation on the
preprocessed value, and a post-processing circuit for post-
processing the result of the approximation operation. The
pipeline may be configured to autonomously perform a
multi-stage operation after receiving the single instruction
without further instruction intervention from the control unit
to output a final approximation value.

According to an embodiment of the present disclosure,
the approximation operation circuit is a programmable func-
tion approximation circuit.

According to an embodiment of the present disclosure,
the function approximation unit may be configured to per-
form the multi-stage operation by selectively activating
either the programmable function approximation circuit of
claim 1 or the dedicated function circuit of claim 1, accord-
ing to a target function specified by the single instruction.

According to an embodiment of the present disclosure,
the preprocessing circuit may be configured to decompose a
floating-point representation of an input value into an expo-
nent part and a mantissa part, and the post-processing circuit
may be configured to combine the output of the approxima-
tion operation circuit with the exponent part.

According to an embodiment of the present disclosure,
the function approximation unit may be included within a
Vector Core. The single instruction may be configured to
simultaneously trigger an autonomous pipeline operation for
each element of vector data.

According to an embodiment of the present disclosure,
the function approximation unit may be included within a
scalar core. The single instruction may be configured to
trigger an autonomous pipeline operation for scalar data.

According to an embodiment of the present disclosure,
the neural processing unit may further comprise means for
pre-storing operation coefficients, improved through offline
training, in a coefficient register within the pipeline before
executing the single instruction.

The examples of the present disclosure disclosed in this
specification and drawings are presented as specific
examples to easily explain the technical content of the
present disclosure and to aid in understanding the present disclosure, and are not intended to limit the scope of the present disclosure. It is apparent to those of ordinary skill in the art to which the present disclosure belongs that other modified examples based on the technical idea of the invention can be implemented in addition to the examples disclosed herein.

[National R&D Project Supporting This Invention]
[Project Identification Number]2710007843
[Task Number]00228938
[Name of Ministry] Ministry of Science and ICT
[Name of Task Management (Specialized) Institution] Institute of Information & Communications Technology Planning & Evaluation
[Research Project Title] AI Semiconductor Software Integrated Platform Technology Development
[Research Task Name] Commercial Edge AI SoC Semiconductor Software Development Platform Technology Development
[Name of the Organization Performing the Task] DEEPX CO., LTD.
[Research Period]2024 Jan. 1~2024 Dec. 31

What is claimed is:

1. An approximation circuit for approximating a nonlinear function in a neural processing unit, the approximation circuit comprising:
   a first circuit configured to apply a piecewise function of a segmented approximation of the nonlinear function according to one or more pre-stored coefficients;
   one or more second circuits comprising a plurality of hardware stages pipelined to process at least one a reciprocal, a reciprocal square root, or a negative exponential function; and
   a control logic circuit coupled to the first circuit and the one or more second circuits, the control logic circuit configured to selectively activate the first circuit or the one or more second circuits according to a type of the nonlinear function to be processed.

2. The approximation circuit of claim 1, wherein the first circuit is configured to perform a piecewise linear function or a piecewise polynomial function having a degree higher than the piecewise linear function.

3. The approximation circuit of claim 1, wherein the one or more second circuits are configured to process a floating-point representation of an input value by decomposing the input value into an exponent part and a mantissa part, and the first circuit is configured to approximate the decomposed mantissa part for a specific normalized range in a share manner.

4. The approximation circuit of claim 3, wherein the one or more coefficients of the first circuit are constant values pre-optimized through artificial neural network training to approximate a specific function within the specific normalized range.

5. The approximation circuit of claim 1, wherein the control logic circuit is configured to perform power gating or clock gating to cut off power consumption of the unselected one of the first circuit or the one or more second circuits.

6. The approximation circuit of claim 1, wherein the one or more coefficients are loaded from an on-chip shared memory of the neural processing unit.

7. The approximation circuit of claim 1, wherein the approximation circuit is part of a special function unit in the neural processing unit, the special function unit configured to perform nonlinear and number-conversion operations.

8. The approximation circuit of claim 1, wherein the first circuit is configured to approximate a programmable function and comprises:
   a plurality of comparators configured to:
      receive an input value in a floating-point format comprising a sign bit, an exponent, and a mantissa, and
      compare the received input value with a plurality of segment boundary values to determine a segment corresponding to the received input value;
   a selector configured to select a set of programmable operation coefficients corresponding to the determined segment from a plurality sets of programmable operation coefficients; and
   an arithmetic circuit configured to perform a predefined arithmetic operation on the received input value using the selected set of operation coefficients.

9. The approximation circuit of claim 8, wherein the arithmetic circuit comprises a multiplier and an adder, and the arithmetic operation is a piecewise linear function or a piecewise polynomial function of a degree higher than the piecewise linear function.

10. The approximation circuit of claim 9, wherein the approximation circuit is configured to dynamically change the degree of the polynomial function by deactivating a part of the approximation circuit through an enable signal.

11. The approximation circuit of claim 8, wherein the floating-point format is one of Brain Floating-Point 16 (BF16), TensorFloat-32 (TF32), 8-bit floating point (FP8), or Block floating point (BFP).

12. The approximation circuit of claim 8, wherein the plurality sets of programmable operation coefficients are pre-optimized through an artificial neural network training to approximate a specific section of a target function, and remains unchanged during runtime.

13. The approximation circuit of claim 12, wherein the artificial neural network training is configured to perform hardware-software co-optimization considering a number of comparators included in the circuit.

14. The approximation circuit of claim 1,
   wherein the approximation circuit is configured to operate in response to receiving a single instruction from a control circuit of the neural processing unit, and is pipelined with a plurality of hardware stages including:
      a preprocessing circuit configured to preprocess an input value;
      an approximation operation circuit configured to perform an approximation operation on the preprocessed input value to generate an intermediate approximation value; and
      a post-processing circuit configured to perform post-processing on the intermediate approximation value to generate a final approximation value,
   wherein the approximation circuit is configured to autonomously operate the plurality of hardware stages in response to receiving the single instruction.

15. The approximation circuit of claim 14, wherein the approximation circuit is configured to autonomously operate the plurality of hardware stages to generate the final approximation value without receiving one or more additional instructions from the control unit.

16. The approximation circuit of claim 15, wherein the preprocessing circuit is configured to:
   decompose a floating-point representation of an input value into an exponent part and a mantissa part, and
   combine the intermediate approximation from the approximation operation circuit with the exponent part.

17. The approximation circuit of claim 14, wherein the approximation operation circuit is programmable, and wherein the approximation circuit comprises:

a plurality of comparators configured to:

receive an input value in a floating-point format comprising a sign bit, an exponent, and a mantissa, and compare the received input value with a plurality of segment boundary values to determine a segment corresponding to the received input value;

a selector configured to select a set of programmable operation coefficients corresponding to the determined segment from a plurality sets of coefficients; and an arithmetic circuit configured to perform a predefined arithmetic operation on the received input value using the selected set of operation coefficients.

18. The approximation circuit of claim 17, wherein the approximation circuit is configured to selectively activate one of the approximation operation circuit or a dedicated function circuit according to a target function specified by the single instruction, and the dedicated function circuit configured to process at least one of a reciprocal, a reciprocal square root, and a negative exponential function.

19. The approximation circuit of claim 14, wherein the approximation circuit is included in a vector core and the single instruction is configured to simultaneously trigger an autonomous pipeline operation for each element of vector data, or the approximation unit is included in a scalar core and the single instruction is configured to trigger an autonomous pipeline operation for scalar data.

20. The approximation circuit of claim 14, further comprising a memory circuit configured to store operation coefficients generated by offline training for executing the single instruction.

\* \* \* \* \*